US012586119B1

(12) United States Patent
Agarwal et al.

(10) Patent No.: US 12,586,119 B1
(45) Date of Patent: Mar. 24, 2026

(54) AUTONOMOUS MULTIFACTOR GENERATIVE ARTIFICIAL INTELLIGENCE FRAMEWORK

(71) Applicant: U.S. BANK NATIONAL ASSOCIATION, Minneapolis, MN (US)

(72) Inventors: Shubham Agarwal, Los Angeles, CA (US); Joseph Bakke, Seattle, WA (US)

(73) Assignee: U.S. Bank National Association, Minneapolis, MN (US)

( * ) Notice: Subject to any disclaimer, the term of this patent is extended or adjusted under 35 U.S.C. 154(b) by 0 days.

(21) Appl. No.: 19/083,031

(22) Filed: Mar. 18, 2025

(51) Int. Cl.
| | |
|---|---|
| *G06Q 30/00* | (2023.01) |
| *G06N 20/00* | (2019.01) |
| *G06Q 30/0601* | (2023.01) |
| *G06V 10/778* | (2022.01) |

(52) U.S. Cl.
CPC ......... *G06Q 30/0631* (2013.01); *G06N 20/00* (2019.01); *G06V 10/7788* (2022.01)

(58) Field of Classification Search
CPC ............................................... G06Q 30/06–08
See application file for complete search history.

(56) References Cited

U.S. PATENT DOCUMENTS

| | | | | |
|---|---|---|---|---|
| 12,293,414 | B1 * | 5/2025 | VanNess | ................ G06Q 40/06 |
| 2021/0365514 | A1 | 11/2021 | Huet et al. | |
| 2022/0253613 | A1 | 8/2022 | Lin et al. | |

| | | | | |
|---|---|---|---|---|
| 2022/0414737 | A1 | 12/2022 | Wang et al. | |
| 2023/0027530 | A1 | 1/2023 | Jeganathan | |
| 2023/0259692 | A1 | 8/2023 | Wright | |
| 2023/0306201 | A1 * | 9/2023 | Bayomi | ............... G06N 3/0442 |
| 2024/0249331 | A1 | 7/2024 | Jain et al. | |
| 2024/0311643 | A1 * | 9/2024 | Wang | ..................... G06N 20/20 |
| 2024/0320432 | A1 | 9/2024 | Maschmeyer et al. | |
| 2025/0156637 | A1 * | 5/2025 | Bernardis | ............. G06F 40/284 |

FOREIGN PATENT DOCUMENTS

KR          10-2652934  B1          4/2024

OTHER PUBLICATIONS

Shukla, T. et al., "Revolutionizing Athletic Training with Machine Learning: Injury Prediction Using Predictive Analytics and Customized Workouts Through Personalization Algorithms", 2025 3rd Int'l Conf. on Intelligent Systems (Year: 2025).*

(Continued)

*Primary Examiner* — Ethan D Civan
(74) *Attorney, Agent, or Firm* — Alston & Bird LLP

(57) ABSTRACT

Various embodiments are directed to apparatuses, methods, computer-readable media, computer program products, and systems related to detecting a process trigger that identifies a target entity; identifying, entity data associated with the target entity; generating, using a machine learning based prediction model, a predictive asset output based at least in part on the entity data, wherein the predictive asset output comprises at least one predicted asset; generating, using a dynamic contextualization model, a multifactor contextualized asset representation for the at least one predicted asset based at least in part on the at least one predicted asset and the entity data; and transmitting the multifactor contextualized asset representation to one or more computing devices via one or more communication channels.

20 Claims, 14 Drawing Sheets

(56)     References Cited

OTHER PUBLICATIONS

Dimple Patil et al., "Future directions for ChatGPT and generative artificial intelligence in various business sectors,"Deep Science Publishing, 294-346, (2024). [Retrieved from the Internet Jul. 29, 2025: URL: <https://www.researchgate.net/profile/Nitin-Rane-2/publication/385358213_Future_directions_for_ChatGPT_and_generative_artificial_intelligence_in_various_business_sectors/links/6721f1acdb208342dedd5d4d/Future-directions-for-ChatGPT-andgenerative-artificial-intelligence-in-.

Vikas Kumar et al., "Generative AI for Retail: Intelligent Product Recommendation and Description Generation," 90-95, (Apr. 2024). [Retrieved from the Internet Jul. 29, 2025: URL: <https://www.researchgate.net/publication/385053361_Generative_AI_for_Retail_Intelligent_Product_Recommendation_and_Description_Generation >].

* cited by examiner

600

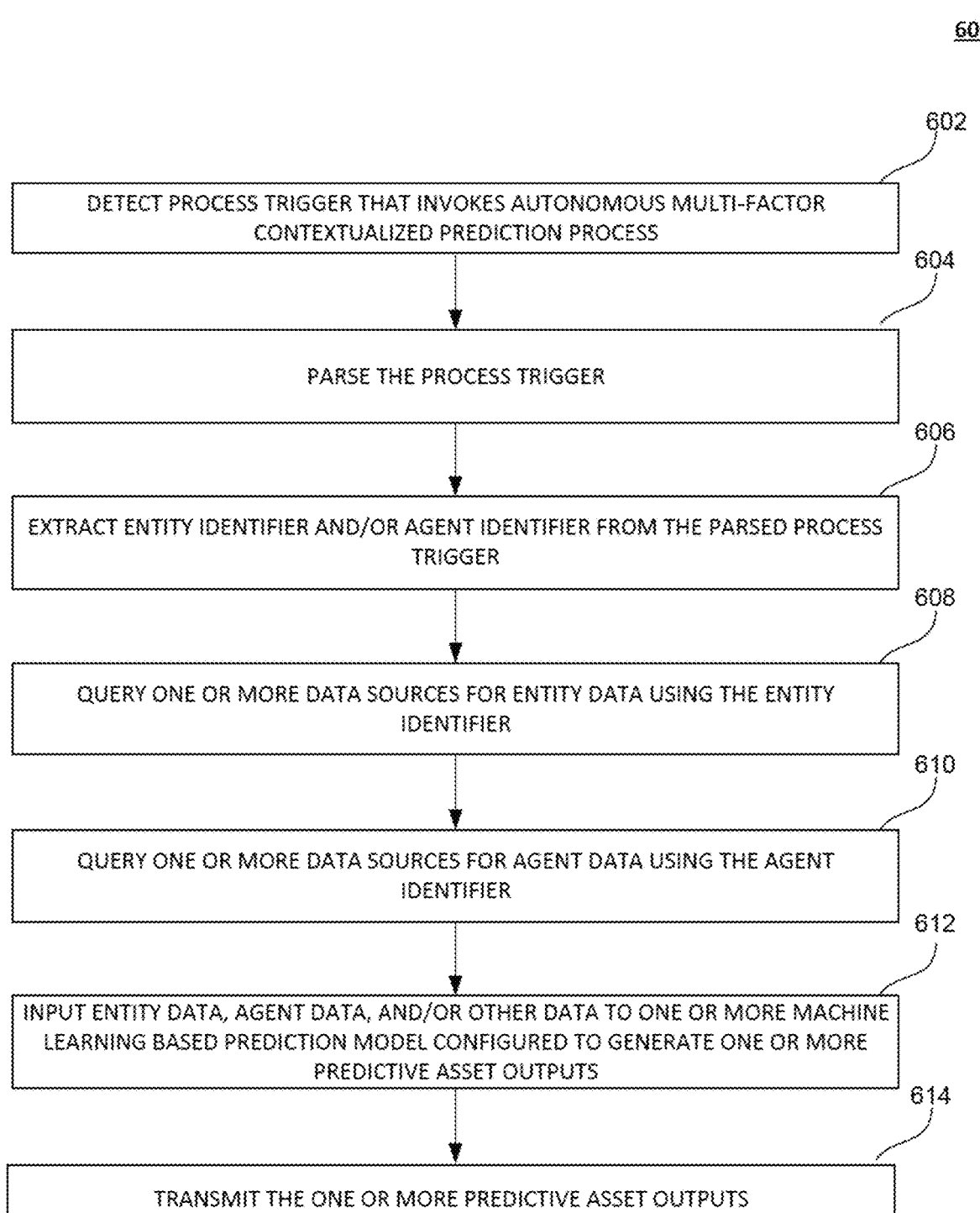

602

DETECT PROCESS TRIGGER THAT INVOKES AUTONOMOUS MULTI-FACTOR CONTEXTUALIZED PREDICTION PROCESS

604

PARSE THE PROCESS TRIGGER

606

EXTRACT ENTITY IDENTIFIER AND/OR AGENT IDENTIFIER FROM THE PARSED PROCESS TRIGGER

608

QUERY ONE OR MORE DATA SOURCES FOR ENTITY DATA USING THE ENTITY IDENTIFIER

610

QUERY ONE OR MORE DATA SOURCES FOR AGENT DATA USING THE AGENT IDENTIFIER

612

INPUT ENTITY DATA, AGENT DATA, AND/OR OTHER DATA TO ONE OR MORE MACHINE LEARNING BASED PREDICTION MODEL CONFIGURED TO GENERATE ONE OR MORE PREDICTIVE ASSET OUTPUTS

614

TRANSMIT THE ONE OR MORE PREDICTIVE ASSET OUTPUTS

FIG. 6

AUTONOMOUS MULTIFACTOR GENERATIVE ARTIFICIAL INTELLIGENCE FRAMEWORK

BACKGROUND

Applicant has identified challenges associated with conventional artificial intelligence ("AI") systems. Through applied effort, ingenuity, and innovation many deficiencies of existing systems have been solved by developing solutions that are in accordance with the embodiments as discussed herein, many examples of which are described in detail herein.

BRIEF SUMMARY

In general, embodiments of the present disclosure provided herein may relate to autonomous multifactor contextualized prediction framework. Other implementations relating to the framework will be, or will become, apparent to one with skill in the art upon examination of the following figures and detailed description. It is intended that all such additional implementations be included within this description, be within the scope of the disclosure, and be protected by the following claims.

Various embodiments are directed to apparatuses, methods, computer readable media, computer program products, and systems related to autonomous multifactor contextualized prediction framework. Various embodiments may include a computer-implemented method comprising detecting, by one or more processors, a process trigger that identifies a target entity; identifying, by the one or more processors, entity data associated with the target entity; generating, by the one or more processors and using a machine learning based prediction model, a predictive asset output based at least in part on the entity data, wherein the predictive asset output comprises at least one predicted asset; generating, by the one or more processors and using a dynamic contextualization model, a multifactor contextualized asset representation for the at least one predicted asset based at least in part on the at least one predicted asset and the entity data; and transmitting, by the one or more processors, the multifactor contextualized asset representation to one or more computing devices via one or more communication channels. In various embodiments, generating a predictive asset output comprises inputting the entity data to the machine learning based prediction model to cause the machine learning based prediction model to analyze the entity data and generate the predictive asset output based on the analysis of the entity data. In various embodiments, the machine learning based prediction model is configured to generate the predictive asset output further based at least in part on one or more optimization parameters, and wherein the one or more optimization parameters comprise one or more predefined configuration metrics. In various embodiments, the machine learning based prediction model is configured to generate the predictive asset output further by analyzing agent data for an agent associated with the target entity. In various embodiments, the process trigger comprises an API request transmitted from a client computing device. In various embodiments, generating the multifactor contextualized asset representation comprises predicting one or more contextually relevant asset features associated with the at least one predicted asset; and modifying the predictive asset output to include the one or more contextually relevant asset features. In various embodiments, the entity data comprises a plurality of entity data segments that comprise one or more of: (i) historical transactions data, (ii) demographic data, (iii) behavioral data, or (iv) interaction data. In various embodiments, the interaction data comprises one or more of text data, audio data, or video data associated with the target entity. In various embodiments, generating the predictive asset output based on the entity data comprises analyzing at least a first set of entity data segments from the plurality of entity data segments and generating the multifactor contextualized asset representation comprises analyzing a second set of entity data segments from the plurality of entity data segments. In various embodiments, the first set of entity data segments and the second set of entity data segments are same. In various embodiments, the first set of entity data segments comprise at least one entity data segment that is different from the second set of entity data segments. In various embodiments, generating the multifactor contextualized asset representation comprises generating a prompt for the dynamic contextualization model; and autonomously inputting the prompt to the dynamic contextualization model. In various embodiments, generating the multifactor contextualized asset representation using the dynamic contextualization model further comprises the generating the multifactor contextualized asset representation based at least in part by analyzing gent data for an agent associated with the target entity. In various embodiments, the dynamic contextualization model is a large language model. In various embodiments, the machine learning based prediction model comprises one or more of: (i) a decision tree machine learning or (ii) a deep learning neural network machine learning model. In various embodiments, the computer-implemented method further comprises storing the multifactor contextualized asset representation. In various embodiments, the computer-implemented method further comprises receiving, via a user interface, feedback data associated with the multifactor contextualized asset representation; and providing the feedback data to the dynamic contextualization model. In various embodiments, the machine learning based prediction model and the dynamic contextualization model are connected models, and the predictive asset output is autonomously input to the dynamic contextualization model via a prompt.

Various embodiments may include a system comprising one or more processors and at least one non-transitory memory comprising instructions that, with the one or more processors, cause the system to detect a process trigger that identifies a target entity; identify, entity data associated with the target entity; generate, using a machine learning based prediction model, a predictive asset output based at least in part on the entity data, wherein the predictive asset output comprises at least one predicted asset; generate, using a dynamic contextualization model, a multifactor contextualized asset representation for the at least one predicted asset based at least in part on the at least one predicted asset and the entity data; and transmit, the multifactor contextualized asset representation to one or more computing devices via one or more communication channels.

Various embodiments may include one or more nontransitory computer-readable media storing processor-executable instructions that, when executed by one or more processors, cause the one or more processors to perform operations comprising detecting a process trigger that identifies a target entity; identifying entity data associated with the target entity; generating, using a machine learning based prediction model, a predictive asset output based at least in part on the entity data, wherein the predictive asset output comprises at least one predicted asset; generating, using a dynamic contextualization model, a multifactor contextualized asset representation for the at least one predicted asset based at least in part on the at least one predicted asset and the entity data; and transmitting, the multifactor contextualized asset representation to one or more computing devices via one or more communication channels.

BRIEF DESCRIPTION OF THE DRAWINGS

Reference will now be made to the accompanying drawings, which are not necessarily drawn to scale, and wherein:

FIG. 6 illustrates an example flowchart depicting operations in accordance with at least some example embodiments of the present disclosure.

DETAILED DESCRIPTION

Figure 1:
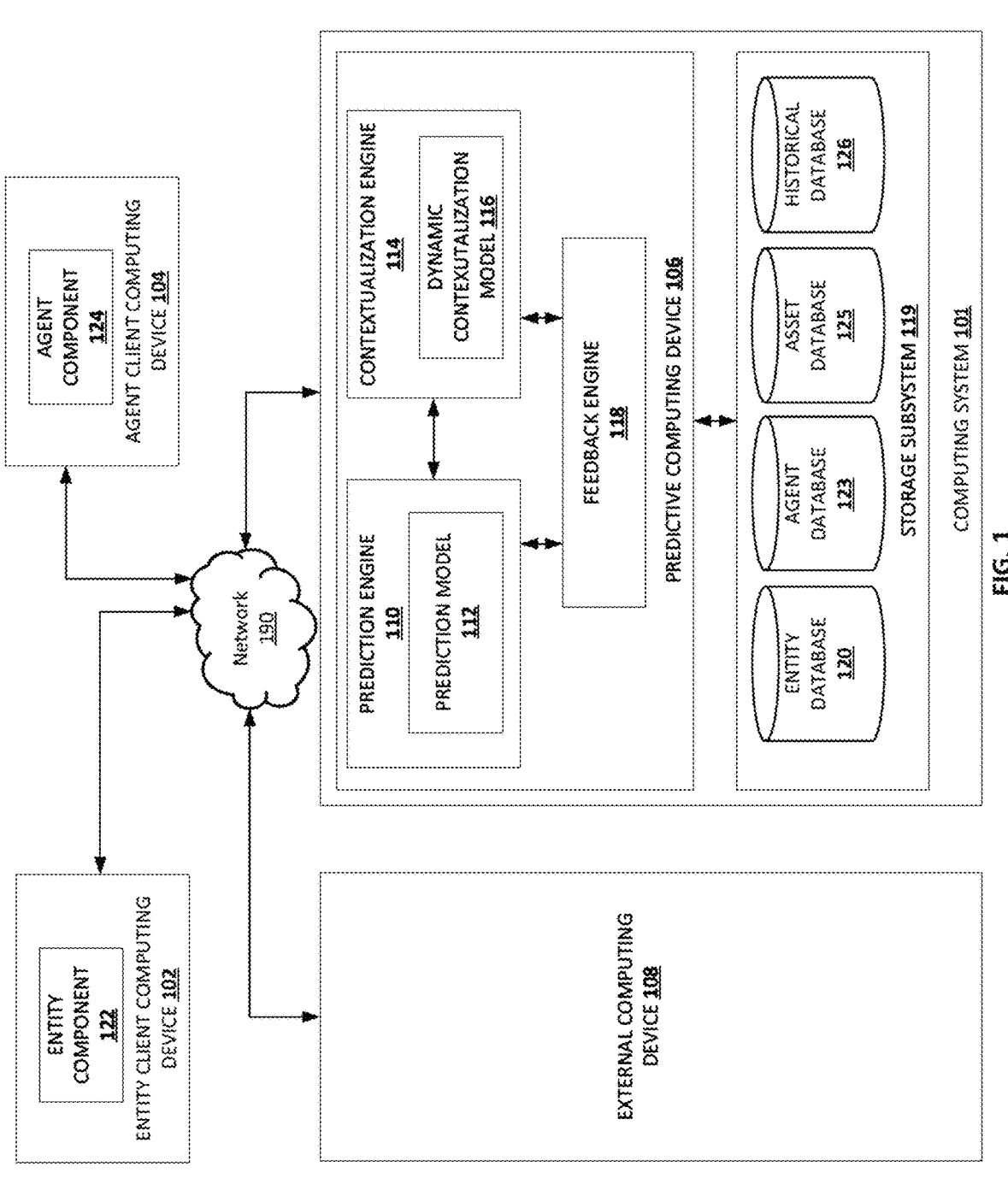
FIG. 1 illustrates an example system environment within which at least some embodiments of the present disclosure may operate.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example" or "exemplary," when used herein, are intended to mean "serving as an example, instance, or illustration." Any implementation described herein as an "example" or "exemplary embodiment" is not necessarily preferred or advantageous over other implementations. As used herein, the term "or" is intended to be used inclusively except where circumstances or express language of the disclosure require otherwise.

OVERVIEW

The present disclosure relates to autonomous multifactor generative AI framework that leverages integrated machine learning techniques and artificial intelligence techniques to generate a contextualized asset representations that are more accurate and precise than traditional generative AI and more contextually relevant than traditional machine learning. The framework described herein may output unique contextualization of a predicted assets along side the predictive asset outputs in a combined user experience. The various embodiments of the multifactor framework described herein solve technical problems associated with pure generative AI systems that may generate inconsistent, unclear, or irrelevant outputs while also improving the speed and reducing the processing load required for the framework over a pure generative AI system.

The contextualized prediction system of the present disclosure may be configured to generate personalized asset representations (e.g., personalized selling points associated with one or more products or other assets). For example, instead of generic asset information, users will receive dynamic, AI-generated representations that highlight relevant asset features and benefits, specific to a target entity's profile and current interests. Users (e.g., target entities, agents, or both) can also chat with the models and data to further refine the asset prediction to make it more powerful or otherwise improve the value of the output. A feedback system will enable these asset representations to continually evolve and improve.

Embodiments of the present disclosure may further provide a combined user experience. For example, by providing both predictive asset outputs (e.g., machine learning based recommendations generated by a prediction model) and contextualization around the asset outputs (e.g., selling points and other characterizations of the predicted assets and features associated therewith) in a single, unified interface, users (e.g., target entities, agents, or both) can be engaged more effectively and efficiently, enhancing the asset management process. The system may, in some examples, optimize asset representations for their effect on other assets or asset categories (e.g., cross-selling or upselling opportunities).

The contextualized prediction system may include numerous integrations with one or more other computing systems and devices. For example, the contextualized prediction framework may be accessible from or embedded into third party platforms, such as CRM platforms, or integrated into various operational touch points such as interface automation or support systems.

Example embodiments may detect a process trigger configured to initiate the contextualized prediction process. The process trigger may take one of several forms. For example, in some instances, the process trigger may be an API request received at an API endpoint. For example, some embodiments, may receive an API request that invokes the multifactor contextualized prediction process. The API request may be received from a client computing device associated with a target entity (e.g., a target for which/whom the predictive asset output is generated by a machine learning based prediction model) or an agent of an enterprise. In some example embodiments, the API request may comprise an entity identifier and one or more datum or indication representative of a request for a recommendation (e.g., a request for a contextualized asset prediction).

In some examples, the process trigger may include detecting an input, change in an underlying data value, or other direct or indirect data value or signal (e.g., an indication of a recent transaction associated with a target entity). For example, some embodiments may include a computing system with one or more processors to monitor or detect electronic transactions (e.g., exchanges between computing devices, values stored in memory, or the like) associated with a target entity and invoke an autonomous multifactor contextualized prediction process in response to the detected transaction. For example, the computing system 101 may be configured to monitor a transaction feed; detect cross-category asset prediction opportunities or complementary or related asset prediction opportunities based on recent transactions associated with a target entity; and execute a multifactor contextualized prediction process in response to such cross-category asset prediction opportunities or complementary or related asset prediction opportunities. In some embodiments, the multifactor contextualized asset representation may have a primary asset representation and secondary asset focus for facilitating such cross-category asset prediction opportunities or complementary or related asset prediction opportunities. For example, the dynamic contextualization model may be prompted (e.g., via primary and secondary corresponding outputs of a prediction model) to generate the multifactor contextualized asset representation with content about the primary asset while also being prompted to suggest one or more features or other information related to or complementary of a second asset.

In some embodiments, the multifactor contextualized prediction process may be triggered manually or directly (e.g., by selecting an interface icon or other input to cause the process to begin) or indirectly by detecting a triggering condition (e.g., the transactions monitoring discussed above). The multifactor contextualized prediction process may be triggered in real time with the triggering condition (e.g., immediately in response to the condition) or at a later time (e.g., when a target entity is detected in or in proximity to an enterprise location or otherwise in communication with an enterprise). Some embodiments generate the process trigger or otherwise invoke the multifactor contextualized prediction process during real-time interaction session with a target entity (e.g., during an audio call, chat conversation, or other communication channels).

Example embodiments, in response to detecting the process trigger, may include identifying a target entity and target entity data or other data (e.g., agent data, historical asset data, asset data, etc.) for input into the multifactor contextualized prediction process. In some embodiments, entity data may be received from one or more data sources. In some embodiments, the system may query one or more data sources for entity data using the entity identifier, which identifier may be retrieved from memory or received in association with the initial input. The entity data may include a plurality of entity data segments including, but not limited to entity characteristics, operational data, related third-party data, historical transactions data, demographic data, behavioral data, interaction data, or conversion data.

Example embodiments leverage the various entity data to generate a tailored multifactor contextualized asset representation for the target entity, which may represent a combined user experience including a predictive asset output and autonomously generated multifactor contextualized asset representation associated with the predictive asset output. Some embodiments of the system may additionally or alternatively use agent data associated with an agent to generate the predictive asset output or the multifactor contextualized asset representation. The system may query one or more data sources for agent data using agent identifier associated with an agent of the enterprise. Such some embodiments may leverage the agent data to tailor the output of the autonomous multifactor contextualized prediction process to the agent with or without the target entity tailoring.

Example embodiments apply input data comprising at least the entity data to one or more prediction models comprising machine learning to generate one or more predictive asset outputs. The one or more prediction models may comprise one or more machine learning algorithms such as but not limited to decision tree machine learning algorithms or deep learning neural network algorithms. The predictive asset output may represent one or more recommended or otherwise relevant assets identified for delivery or targeting towards the target entity. In some instances, the input data may be pre-processed for input into the prediction model, and the input data may include one or more of several different data types as discussed herein.

In some embodiments, the prediction model output comprises data representative of one or more assets selected (e.g., via a highest predicted relevance) from one or more candidate assets. For example, the one or more machine learning models may be configured to analyze the input data with respect to a prediction space that comprises the one or more candidate assets (e.g., assets available to the target entity or agent). In some embodiments, a predictive asset output may comprise one or more predicted assets. Such predictive asset output may comprise an asset identifier for a selected asset(s) (e.g., recommended asset) from the one or more candidate assets. In some examples, the predictive asset output may identify a selected communication channel (e.g., mobile interface, web interface, email, chat, audio, or the like) for transmitting the output of the multifactor contextualized prediction process to a client computing device or the channel may be pre-selected. For example, some embodiments may determine an optimal communication channel for transmitting the output of the multifactor contextualized prediction process to a client computing. In some embodiments, the prediction model or dynamic contextualization model discussed herein may be specially trained for one or more specific communication channels or trained to take the communication channel(s) as an input for adjusting the respective output(s) of either model.

In some embodiments, the predictive asset output of by the machine learning based prediction model is autonomously fed into a dynamic contextualization model (e.g., via autonomous prompt engineering) that is configured to generate a multifactor contextualized asset representation that is tailored to at least the target entity. The system may be configured to configure the predictive asset output for input into the dynamic contextualization model (e.g., via prompt engineering, data formatting, or the like). Example embodiments may tailor the multifactor contextualized asset representation to the target entity or agent.

The system may, in some embodiments, generate a prompt for the dynamic contextualization model by transforming the predictive asset output into a natural language generative AI prompt. For example, the prompt generation process may comprise formatting one or more data values (e.g., the asset identifier, asset features, etc. from the predicted asset output data object into a natural language. The data may, in some embodiments, insert the data values (with or without natural language conversion) into a predefined template prompt. The prompt may comprise prompt instructions configured to guide the dynamic contextualization model to generate a tailored multifactor contextualized asset representation based on input data comprising one or more of the predictive asset output (e.g., an asset identifier, asset features, etc.), entity data, agent data, historical data, or optimization data.

In some embodiments, a dynamic contextualization model may be configured to generate a multifactor contextualized asset representation using a generative AI to generate natural language outputs associated with the predictive asset output. In some embodiments, the dynamic contextualization model may use retrieval augmented generation (RAG) techniques or other techniques. For example, the prompt may be configured to direct the dynamic contextualization model to one or more databases or other knowledge sources to retrieve data/information that may be leveraged by the dynamic contextualization model to elicit the desired output from the dynamic contextualization model and to reduce hallucination by the dynamic contextualization model. For example, the input to the dynamic contextualization model may be grounded on the data from the one or more databases or other knowledge sources. The one or more databases or other knowledge sources may comprise real-word examples or context. In some embodiments, the one or more databases or other knowledge sources comprise data indicative of assets (e.g., associated with an enterprise), asset features including benefits, third-party landscape including competitor landscape, and/or asset representation templates.

The dynamic contextualization model may be trained and/or configured using the asset representation templates and/or other data from the one or more databases or other knowledge sources. In some embodiments, reinforcement learning from human feedback (RLHF) technique may be leveraged to improve the performance of the dynamic contextualization model, and thus the improve the performance of the system. Such RLHF technique may combine reinforcement learning algorithm with user input including feedback from one or more agents to align the behavior of the dynamic contextualization model to the one or more agents (e.g., preferences thereof). The RLHF technique may be applied during configuration of the dynamic contextualization model (e.g., prior to deployment) and/or on ongoing basis (e.g., periodically or in response to one or more events). As described herein, the system may comprise a feedback mechanism for receiving feedback associated with an agent such that the implementation/application of the RLHF technique may be facilitated via live interactions and/or such feedback. In some examples, the prompt may be a few shot prompt that includes one or more prompt examples.

In some embodiments, the one or more dynamic contextualization models may be configured to output a multifactor contextualized asset representation that is further tailored based on the communication channel selected for transmitting or otherwise presenting the multifactor contextualized asset representation to a client computing device or user. The narrower tailoring may be accomplished via several means, including but not limited to further prompt engineering (e.g., modifying the prompt with additional contextual information, such as the channel information or channel configuration requirements like length, tone, or format) or dedicated models trained for the specific communication channel or a subset of channels. For example, some embodiments, may configure or direct a dynamic contextualization model to optimize the multifactor contextualized asset representation for the particular communication channel (e.g., via selection of a narrower, focused model specific to the identified channel or prompt engineering of the dynamic contextualization model to target the channel). In particular, some embodiments, may optimize the multifactor contextualized asset representation output for the particular type of physical device (e.g., the particular client computing device make, model, or form factor) or graphical user interface (e.g., screen size, representation placement, operating system, or underlying application). Non-limiting example factors that may be used to tailor the multifactor contextualized asset representation for the particular channel may include the viewer (e.g., a target entity or agent), an interface type, an interface layout, or one or more pre-defined output parameters (e.g., text size, length, etc.). By doing so, example embodiments improve the efficacy of the output and provide for scalability and utilization across various types of communication channels.

Accordingly, various technical improvements will be appreciated from the present disclosure including, but not limited to, autonomously generating and providing personalized predictions that is tailored to the user or optimized for the communication channel. For example, by leveraging connected machine learning model and dynamic contextualization model to generate an output that comprises a representation of a recommend asset tailored to the user and optimized for the communication channel, example embodiments improve various technical fields and technology including, but not limited to contextualized prediction systems, machine learning models and dynamic contextualization models.

Further by optimizing a representation of the predicted asset or the particular communication channel (e.g., particular physical device or graphical user interface) for transmitting or rendering a representation of the predicted asset that is contextualized to a user, example embodiments improve the efficacy of the output and provide for scalability and utilization across various types of communication channels. Moreover, embodiments of the present disclosure provide for a combined user experience. For example, various embodiments include a multifactor contextualized asset representation defining both an indication of a predicted asset and a contextualized description of the predicted asset. For example, a non-limiting use case of the contextualized prediction system may include generating representations as recommendations and descriptions (e.g., selling points) tailored to a particular target entity and informed by the various contextual data described herein. In some embodiments, the models may be tuned to multiple users (e.g., both an agent and target entity).

Embodiments of the present disclosure further improve the field of graphical user interfaces by providing real-time, intuitive operation of the contextualized prediction system described herein via an interface positioned along side a management interface associated with one or more assets, including the predicted asset. The contextualized prediction system may thereby facilitate real-time, more efficient, more accurate, and more precise control of the asset(s).

Moreover, some embodiments may autonomously generate one or more interface elements with improvements over existing interface generation systems. For example, the contextualized prediction systems described herein may optimize the graphical user interface elements for a particular channel or aspects of a particular channel (e.g., size, placement on the screen, etc. as described herein) and generate a multifactor contextualized asset representation that is uniquely tailored for the interface via the multifactor modeling structure and interface generation structure described herein, thereby improving the usability and organization of the interface for multiple devices and interface types autonomously. The generated multifactor contextualized asset representation may include a modular interface element configured to be inserted into a larger interface associated with the channel or to be transmitted for embedding in a larger interface (e.g., via an iframe element). The various graphical user interface improvements discussed herein may facilitate near infinite scalability and customizability of interfaces across a plurality of channels and devices. The system or graphical user interface elements may be embedded into other third party systems and interfaces, such as CRM platforms (e.g., SALESFORCE) or integrated into various touchpoints like marketing automation and customer support systems. The system's adaptability ensures its applicability across industries, from financial services to retail.

The present disclosure further includes technical improvements in the area of artificial intelligence. The multifactor contextualized prediction process described herein may combine two artificial intelligence processes sequentially and configure the respective model outputs to produce an output that is better than traditional models or either process independently. For example, the predictive asset output of a first model (e.g., machine learning based prediction model) may be transformed via the prompt engineering processes disclosed herein to configure the predictive asset output into an input for the subsequent dynamic contextualization model. The multifactor contextualized asset representation output from the dynamic contextualization model may be transformed (e.g., via the various graphical user interface configurations disclosed herein) to configure the output for display in the particular channel. The resulting multifactor contextualized asset representation may include the predictable output of a machine learning model (e.g., a decision tree, deep neural network, etc.) with the customization of a generative AI model. The combined modeling processes may also produce more explainable outputs resulting in more rapid training and more accurate customization.

Moreover, the processing power required by the process described herein may be reduced via limiting the generative AI to the dynamic contextualization process in some embodiments. In addition, either or both models may be modularly swappable for other models (e.g., multiple trained models for different use cases) independently of each other, allowing added customizability and improving accuracy and precision of the model multifactor asset representation. For example, two dynamic contextualization models may be trained in some instances, one for when the recipient of the representation is the agent and one for when the recipient is the customer. In some examples, context information may be provided as input to a dynamic contextualization model to facilitate improved tailoring of the output of the dynamic contextualization model to, for example, a target entity or agent. The context information may be input as a prompt or other data input for the model.

Further technical improvements include a real-time feedback mechanism allowing on-the-fly tuning of the multifactor contextualized asset representation via a chatbot like interface connecting the contextualized prediction system with one or more users. Moreover, the contextualized prediction process may be configured to intake and output various types of data (e.g., text, audio, video, etc.).

Definitions

As used herein, the terms "data," "content," "information," and similar terms may be used interchangeably to refer to data capable of being transmitted, received, or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, or the like.

As used herein, the term "circuitry" refers to particular hardware configured to perform the functions associated with the particular circuitry as described herein. In some embodiments, circuitry may be used as part of (a) hardware-only circuit implementations (e.g., implementations in analog circuitry or digital circuitry); (b) combinations of circuits and computer program product(s) comprising software or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. In some embodiments, "circuitry" may include processing circuitry, storage media, network interfaces, input/output devices, or the like. As a further example, as used herein, the term "circuitry" also includes an implementation comprising one or more processors or portion(s) thereof and accompanying software or firmware. As another example, the term "circuitry" as used herein also includes, for example, a baseband integrated circuit or applications processor integrated circuit for a mobile phone or a similar integrated circuit in a server, a cellular network device, other network device, or other computing device.

As used herein, a "computer-readable storage medium," refers to a physical storage medium (e.g., volatile, or non-volatile memory device), and may be differentiated from a "computer-readable transmission medium," which refers to an electromagnetic signal. A computer-readable storage medium may be a non-transitory medium.

As used herein, the terms "data structure," "data object," or "data set" refer interchangeably to data capable of being transmitted, received, or stored. For example, a predicted asset may be associated with one or more data elements or values in a computer-readable storage medium or computer-readable transmission medium, that represents content that is configured for use or display by one or more software applications, services, microservices, or the like.

As used herein, the terms "application," "software application," "app," "computer program," "service," or similar terms refer to a computer program or group of computer programs designed to perform coordinated functions, tasks, or activities. Such computer programs may be operated by or for the benefit of a user or group of users. An application may be configured to provide access to one or more services provided by an entity. For example, an application may be configured to provide access to services provided by visual media content provider systems. An application may run on a server or group of servers, such as, but not limited to, web servers and application servers. In some embodiments, an application may be run on or across one or more other computing devices (e.g., user devices). For example, an application may be configured to be accessed via a web browser (e.g., a website accessed via the Internet using a browser), a dedicated client running on a user device, or the like. In some examples, an application may be configured for use by and interaction with one or more local, networked or remote computing devices.

The term "client computing device," "client device" "client computing entity" and similar terms may be used interchangeably to refer to a computer comprising at least one processor and at least one memory. In some embodiments, the client computing device may further comprise one or more of: a display device for rendering one or more of a graphical user interface, a vibration motor for a haptic output, a speaker for an audible output, a mouse, a keyboard or touch screen, a global position system (GPS) transmitter and receiver, a radio transmitter and receiver, a microphone, a camera, a biometric scanner (e.g., a fingerprint scanner, an eye scanner, a facial scanner, etc.), or the like. Additionally, the term "client computing device" and the aforementioned similar terminology may refer to computer hardware or software that is configured to access a service or functionality offered by a system such as computing system 101 described herein, for example, a service or functionality that is made available by a server. Such a server may be in a different location or another computing system, in which case the client computing device may access the server by way of a network. Client computing devices may include, without limitation, smart phones, tablet computers, kiosk, terminal, laptop computers, wearables, personal computers, enterprise computers, or the like. Client computing devices, as described herein, may communicate with or otherwise access a computing system 101, via one or more networks. In some embodiments, the at least one processor and the at least one memory need not be physically co-located with other elements of the client computing device (e.g., in a terminal environment, in which a display may be separated from a server-based processor or memory).

In some embodiments, a client computing device may be associated with a particular operator. For example, a client computing device may be operated by a user of an enterprise and embodied by the user's computer, smartphone, or the like. In another example, a client computing device may be operated by an agent of an enterprise and embodied by an enterprise computer, enterprise terminal, or the like. In some embodiments, a client computing device may be a general purpose computing device having special purpose computer programming stored or executed thereon (e.g., a program, application, or web browser session running on a personal computer or smartphone). In some embodiments, a client computing device may be configured as a terminal or other remote viewing apparatus configured to display graphical user interfaces and associated information generated on a remote computing device. In some embodiments, a client computing device may be a special purpose computing device configured to perform the various functions described herein. Various embodiments of client computing devices may include, without limitation, smartphones, tablets, laptops, terminals, kiosks, personal computers, desktop computers, enterprise computers, or the like. Various embodiments of client computing devices may operate using different operating systems including, without limitation, IOS, ANDROID, WINDOWS, MACOS, LINUX, CHROME OS, or the like.

As used herein, the term "graphical user interface" refers to a representation of a software interface. For example, a graphical user interface may be the visual representation of a software such as a website, mobile application, desktop application, or the like, that may be used to generally interface with the software. By way of example, images, buttons, links, backgrounds, text fields, or the like, may be included within or make up a graphical user interface. In various examples, a graphical user interface may be configured for display on one or more screens (e.g., a screen of a mobile phone, a personal computer, or the like).

As used herein, the term "application programming interface" and "API" refers to a computing interface that defines indication inputs between applications, services, microservices, computing devices, repositories, or the like. An API may define formatting for one or more of a programming code call, request, function, procedure, notification, data object, data structure, or the like. Non-limiting examples of an application programming interface may include JavaScript Object Notation (JSON), Extensible Markup Language (XML), Simple Object Access Protocol (SOAP), Hypertext Markup Language (HTML), the like, or combinations thereof.

As used herein, the term "repository," "database," and similar terms may be used interchangeably to refer to a computing location associated with a system where data is stored, accessed, modified, and otherwise maintained by the system. A repository may be used to store data in association with a data storage protocol or a query language. In certain embodiments, a repository may embody a data storage device or devices, a separate database server or servers, or as a combination of data storage devices and separate database servers. Further, in some embodiments, a repository may be embodied as a distributed repository such that some of the stored data is stored centrally in a location within the repository and other data stored in a single remote location or a plurality of remote locations. Alternatively, in some embodiments, a repository may be distributed over a plurality of remote storage locations only such as in a cloud storage environment.

As used herein, the term "target entity" refers an entity that is the subject of a multifactor contextualized prediction process, as described herein. For example, a target entity may comprise an entity for which a multifactor contextualized prediction process may be performed to generate a tailored predictive asset output or representation (e.g., a multifactor contextualized asset representation). In some embodiments, the target entity need not be the direct recipient of the multifactor contextualized asset representation (e.g., an agent may be presented with the representation which may be targeted towards the target entity). As used herein an "entity" refers to a distinct object, unit, or concept within a system or context. For example, an entity may represent any object, unit, or concept including, but not limited to, an individual, an organization, a device, or the like. In one example implementation, a target entity may be an individual, business, organization, or the like that is a customer or prospective customer of an enterprise.

As used herein, the term "enterprise" refers to a business, organization, corporation, or the like. In some examples, an enterprise may be associated with entities such as customers, prospective customers of the enterprise. Alternatively, or additionally, an enterprise may be associated with agents (e.g., employees of the enterprise, devices or applications associated with the enterprise and configured to perform interactive functions, such as chatbots, or the like). In some embodiments, an enterprise may be associated with a computing system such as one or more computing devices embodied in hardware, software, firmware, or a combination thereof, operated by or otherwise controlled by the enterprise or an agent thereof for purposes of supporting one or more actions performed by the enterprise. In certain embodiments, the computing system may be defined by a collection of computing devices or software programs including one or more servers, repositories, client computing devices, components, or the like. For example, the computing system may include a software program, component, application, platform, service, or the like, that is configured to communicate with one or more client computing devices for purposes of performing one or more actions, including various digital transmissions between client computing devices or servers of the computing system (e.g., to facilitate optimized contextualized predictions for external entities such as target entities, as described herein).

As used herein, the term "process trigger" refers to any signal, data, computer readable instructions, messages (e.g., an interservice message, intra-service message, network message, etc.), occurrences, action, conditions, or request that invokes or otherwise initiates, whether directly or indirectly and whether actively or passively, a process such as a multifactor contextualized prediction process, described herein. Non-limiting examples of such process trigger include an API request (or any other form of request indicative of a recommendation request), certain interactions (e.g., certain communication, exchange, or action associated with a target entity deemed as a process trigger), certain transaction events, or the like. In some embodiments, the term "transaction" refers to a set of related tasks or operations that represent a single action or unit of work. For example, a transaction may comprise execution of multiple tasks or operations as a unit of work. A non-limiting example of a transaction includes an exchange of an asset between two parties (e.g., between a target entity and an enterprise). Other example process triggers include manual input or prompts (e.g., requesting asset representations associated with a particular asset or targeted towards a specific target entity). In some embodiments, the process trigger may include a physical trigger, such as detecting a GPS location of a target entity computing device being within a predetermined range of an enterprise location (e.g., within a geofence, inside a building, etc.). For example, the process trigger may include a user entering information into a form or other electronic interface, may include audio or video data associated with the target entity or agent, or other signals upon which a machine learning or generative AI model may be initiated.

As used herein, the term "API request" refers to a structured communication sent to an API to request data or functionality. For example, the API request may be sent to an API associated with a computing system to initiate a multifactor contextualized prediction process, as described herein. The API request may identify a target entity. For example, the API request may comprise an entity name or other identifier that identifies a target entity. Alternatively, or additionally, the API request may identify a prediction task. For example, the API request may comprise text indicative of a request for an optimized, contextualized predicted asset for a target entity. The API request may be generated by a client application hosted by a client computing device. For example, the computing system may expose a web service which the client application may leverage to pass the API request. In some examples, the API request may originate from a client computing device associated with the target entity identified in the API request. For example, an entity such as, for example, a customer of an enterprise associated with the computing system may cause a client application hosted by the client computing device to transmit an API request (e.g., identifying the entity and indicating a recommendation request) to an API associated with the computing system. For example, certain interactions by the entity with a user interface, mobile applications, web applications, or the like (e.g., clicking on certain user interface elements, scrolling though a website, inputting text in a user interface, or other actions). In some examples, the API request may originate from a client computing device associated with an agent such as, for example, an agent of the enterprise. For example, the agent may cause a client application hosted by the client computing device to transmit an API request in response to interaction between the target entity and the agent. Such interaction between the target entity and the agent may occur via the respective client computing device associated with the target entity and the agent or via one or more communication channels (e.g., text message, electronic mail (email), instant message, video conference, phone, in-person communication, or the like). In some examples, the API request may be formatted (e.g., by an entity component or agent component, as described herein) according to a predefined schema, using, for example, a standard data interchange format such as JSON, XML, or the like.

As used herein, the term "entity data" refers to data associated with an entity such as a target entity, including data generated by the entity, data generated about the entity, and data related to the entity. In some embodiments, entity data may be gathered in real-time or near real-time. Entity data may additionally or alternatively include stored data (e.g., data from prior transactions involving the entity, entity preferences, or other data). Entity data may be analyzed to generate a predicted asset or multifactor contextualized asset representation. For example, entity data (or a portion thereof) may be input to a prediction model or dynamic contextualization model configured to perform one or more stages of a multifactor contextualized prediction process, as described herein. Entity data may include one or more entity data segments. In some examples, at least a portion of entity data may be stored in an entity database which may be implemented as a relational database that allows for efficient retrieval of the entity data, a graphical database that represent complex relationships within the entity data, or other database architectures. In some examples, the entity database may be a dynamic database in that the database may be updated in real-time or near real-time. In some examples, the entity data may include a plurality of entity data segments.

As used herein, the term "entity data segment" refers to a unit of entity data comprising at least a portion of entity data associated an entity. Entity data may encompass a wide range depending on the context. Non-limiting examples of entity data segments include "entity characteristics" (e.g., entity type, entity size, entity location, entity geographic region of service, entity capacity, affiliated industry, services or products offered, resources utilized including third-party assets, or the like), "operational data" (e.g., operations, resource levels, resource usage rate, inventory level, number of employees, operating plan, or the like), "related third-party data" (e.g., industry trend data, benchmark data, current utilized asset data including third party asset data-such as a current third party asset for which a related asset prediction opportunity may be identified, or the like), "historical transactions data" (e.g., past transactions, time stamp for past transaction, value associated with past transactions, or the like, including target entity specific historical transactions data and aggregated historical transactions data across a plurality of entities, classes, assets, or the like), "demographic data (e.g., age, location, or the like), "behavioral data" (e.g., web behavior, mobile behavior, impressions, observations, servicing data, chat insights, or the like), "interaction data" (e.g., content of conversation with an agent, a chatbot, or the like, which may be text-based conversation, audio conversation, video conversation, or other forms of conversation), "conversion data" (e.g., converted predictions and associated data, prediction conversion rate, timestamps for past predictions, agents associated with past predictions, or the like) or other data associated with an entity. In some embodiments, entity data may be retrieved from and stored in an entity database. Entity data may be generated locally at a client computing device (e.g., a same client computing device that facilitates the multifactor contextualization process or a separate device transmitting entity data). In some embodiments, an application associated with the enterprise may be configured to track user behaviors (e.g., agent or target entity behavior), such as transaction data, device or application interaction data, or the like for building any of the foregoing data sets. In some embodiments, an enterprise system may separately gather the entity data (e.g., retrieving transaction information from a backend system). In one non-limiting example, a prediction model or dynamic contextualization model may receive at least asset information, agent profile, target entity profile, and interaction data as inputs data segments. The term "converted prediction" and similar terms may be used interchangeably to refer to a predicted asset or contextualized predicted asset provided to an entity and that is accepted or otherwise acted on by the entity. For example, a converted prediction may comprise a predictive asset output or multifactor contextualized asset representation that resulted in a successful transaction such as, for example, where an asset identified in the predictive asset output is obtained by the entity based on the representation.

As used herein, the term "entity identifier" refers to one or more datum by which an entity may be identified. An asset identifier may be configured to uniquely identify an entity or group of entities from other entities. In some examples, the entity identifier may be in the form of text string(s), numerical character(s), alphabetical character(s), alphanumeric code(s), American Standard Code for information Interchange (ASCII) character(s), a pointer, a memory address, or other data.

As used herein, the term "machine learning model" refers to one or more processes, algorithms, or other data entity that describes parameters, hyper-parameters, defined operations, or defined mappings of a model that is configured to process one or more inputs in accordance with one or more trained parameters of the machine learning models in order to generate a prediction. An example of a machine learning model is a mathematically derived algorithm (MDA). An MDA may comprise any algorithm trained using training data to predict one or more outcome variables. Without limitation, an MDA, as used herein, may comprise machine learning frameworks including neural networks, deep neural networks, generative adversarial networks, convolutional neural networks, recurrent neural networks, large language models, generative pre-trained transformers (GPT), support vector machines, gradient boosts, decision trees, random forests, Markov models, adaptive Bayesian techniques, and statistical models (e.g., timeseries-based forecast models such as autoregressive models, autoregressive moving average models, or an autoregressive integrating moving average models). Additionally, and without limitation, an MDA, as used in the singular, may include ensembles using multiple machine learning or statistical techniques.

As used herein, the terms "prediction model" and "machine learning based prediction model" refer to a machine learning model configured, trained, or the like to generate one or more predictive asset outputs. The predictive asset outputs may be generated in association with, targeted towards, or otherwise for an entity, such as a target entity. In some embodiments, the predictive asset outputs generated by the prediction model may comprise recommendations or other predictive analyses resulting in the output of indications of one or more of a plurality of assets. The predictive asset outputs may be generated by the prediction model based at least in part on entity data associated with the entity. For example, a prediction model may be configured, trained, or the like to receive entity data (or portion thereof) alone or with other data, analyze the received data, and output a prediction based on the analysis of the received data. In some examples, a prediction model may include multiple models configured to perform one or more different stages of a contextualized prediction analysis. In some embodiments, a prediction model may be used to identify one or more relevant features or attributes associated with a target entity, which may additionally or alternatively be used to prompt a downstream generative AI model to generate asset representations targeted towards the one or more relevant features or attributes. For example, the prediction model may output a predicted asset along with one or more features or attributes calculated as being the most relevant to the target entity. Such embodiments may identify the relevant features or attributes concurrently in a single modeling operation or via sequential machine learning models or layers of a machine learning model. A prediction model may include one or more of any type of machine learning models including one or more supervised, unsupervised, semi-supervised, reinforcement learning models, or the like. In some examples, the prediction model may comprise one or more artificial neural networks (e.g., deep neural networks). In some examples, the prediction model may comprise one or more decision trees algorithms or other machine learning algorithms. In some embodiments, a prediction model may be controlled, in part, by one or more predetermined configurations (e.g., via loading a configuration file) that define optimization parameters, goals, guardrails, or the like for directing or constraining the model output, which may further ensure reliability of the model performance.

As used herein, the term "predicted asset" comprises an output of a prediction model associated with an asset. The predictive asset output may include various data such as, but not limited to, an asset identifier (e.g., an asset name) or asset features or attributes.

As used herein, the terms "predictive asset output" and "predicted asset data object" refer to electronically managed data representative of a predicted asset or storing information associated with a predicted asset. A predictive asset output may take the structural form of a vector or other appropriate data structure for representing data. A predictive asset output may include metadata (e.g., a description, a category, a price, availability status, or the like) and may be stored via computer-readable storage medium (e.g., with a repository associated with a server). In some embodiments, a predictive asset output may comprise one or more data fields for storing information associated with the asset including but not limited to asset features. In some examples, the asset feature(s) may be stored in the data field(s) as natural language text, vector representations (e.g., embeddings) of the issue feature(s), or other representation of the asset features. A predictive asset output (or information thereof) may be transmittable between services, microservices, applications, modules, computing devices, or systems by way of a computer-readable transmission medium (e.g., telecommunication signals, wired/wireless electrical signals, or the like). In some examples, a predictive asset output may comprise a plurality of data objects. In some examples, the predictive asset output may be configured to follow a predefined format. A predictive asset output may be stored or maintained in a storage location associated with or otherwise accessible to a computing system, such as asset database. A predictive asset output maybe organized in manner that makes it processable, storable, interpretable, or transmissible by a computing system. A predictive asset output may be input to a dynamic contextualization model to generate a representation of the asset in a manner that optimizes one or more predefined configuration metrics such as, for example, conversion rate.

As used herein, the term "asset identifier" refers to one or more datum by which an asset may be identified. An asset identifier may be configured to uniquely identify an asset or group of assets from other assets. In some examples, the asset identifier may be in the form of text string(s), numerical character(s), alphabetical character(s), alphanumeric code(s), American Standard Code for information Interchange (ASCII) character(s), a pointer, a memory address, or other data.

As used herein, the term "asset" refers to an article, object, entity, feature, service, product, program, offering, or any other item configured to be described via a multifactor contextualized asset representation. In some embodiments, an asset may be designed to perform or facilitate performance of one or more tasks, operations, activities, functions or the like. For example, an asset may be designed for the use or benefit of a user. An asset may encompass, but is not limited to tangible assets, intangible assets, real-world assets, virtual assets, or the like. Non-limiting examples of an asset include a software application, a computer, a resource, a component, equipment (e.g., a point of sale (POS) terminal, a mobile scanner, or other equipment), a service (e.g., a payment service, a loan service, data storage service, or the like), an offering, a product, or the like. In some examples, an asset may represent a fundamental unit of a transaction or interaction within a system or environment. In some examples, an asset may be associated with an asset identifier, one or more asset features, or metadata. In some examples, an asset may be represented as a data object within a database system (e.g., relational database, graph database, SQL database, or the like).

As used herein, an "asset feature" refers to a characteristic or attribute of an asset. The one or more asset features of an asset may comprise specific properties of the asset that differentiate the asset from other assets. Non-limiting examples of asset features include color, weight, style, type, manufacturer, model, SKU/serial number, year of production, functions, industry-driven features such as, for example, popularity, or like. In some examples, dynamic asset features such as industry-driven features may be dynamically calculated and updated in real-time or near real-time based on industry data or other data. In some embodiments, an asset feature may include one or more sub-assets within the asset (e.g., the individual constituent assets of an asset package or schema, or features or attributes thereof). In some examples, asset feature(s) associated with an asset may be leveraged with other data to generate a contextualized prediction for an asset. Alternatively, or additionally, in some examples, asset feature(s) associated with an asset may be leveraged with other data to generate a representation of asset selected for recommending to an entity. In some examples, a multifactor contextualized asset representation output by a dynamic contextualization model may comprise one or more contextually relevant asset features selected from the asset feature(s) associated with the asset based at least in part on the entity data or agent data such that the multifactor contextualized asset representation is customized for the entity or agent or such that the multifactor contextualized asset representation is optimized with respect to one or more predefined configuration metrics. In some examples, the asset features associated with an asset may be encoded as vectors in a machine learning model such as a prediction model or dynamic contextualization models, allowing for efficient comparison and analysis of assets for recommendation to an entity (e.g., via a multifactor contextualized asset representation).

As used herein, the term "agent" refers an entity that associated with an enterprise or otherwise associated with a multifactor contextualized asset representation other than a target entity. For example, an agent may be an individual, a device, or other entity associated with interacting or interfacing with an entity to facilitate conversion of a prediction. In some examples, the output of a multifactor contextualized prediction process as described herein may be based at least in part on data (e.g., agent data) associated with the agent.

As used herein, the term "agent data" refers to data associated with an agent, including data generated by the agent, data generated about the agent, and data related to the agent. In some examples, agent data may be analyzed along with other data to generate a predictive asset output or multifactor contextualized asset representation based on the predictive asset output. For example, agent data (or a portion thereof) may be input to a prediction model or dynamic contextualization model configured to perform one or more stages of a multifactor contextualized prediction process, as described herein. In some examples, at least a portion of agent data may be stored in an entity database which may be implemented as a relational database that allows for efficient retrieval of the agent data, a graphical database that represent complex relationships within the agent data, or other database architectures. In some examples, the agent database may be a dynamic database in that the database may be updated in real-time or near real-time. In some examples, the agent data may include a plurality of agent data segments.

As used herein, the term "agent identifier" refers to one or more datum by which an agent may be identified. An agent identifier may be configured to uniquely identify an agent or group of agents from other agents. In some examples, the agent identifier may be in the form of text string(s), numerical character(s), alphabetical character(s), alphanumeric code(s), American Standard Code for information Interchange (ASCII) character(s), a pointer, a memory address, or other data.

The term "generative artificial intelligence model," "generative AI model", and similar terms may be used interchangeably to refer to one or more artificial intelligence models, including but not limited to some example machine learning models, configured to generate new outputs in response to a prompt or other input data. A "dynamic contextualization model" may refer to a generative AI model configured to generate a multifactor contextualized asset representation output, as described herein. In some embodiments, a dynamic contextualization model may include any type of model configured, trained, or the like to generate a natural language text, images, video, widgets, or the like in response to a prompt. For example, the dynamic contextualization model may include a large language model such as a generative pre-trained transformer (GPT) model. Some embodiments of the dynamic contextualization model may include large language models. The dynamic contextualization model may be updated, in some embodiments, via reinforcement learning by providing short segments of data generated based on a particular topic (e.g., asset) and updating the model based on the new data. In some embodiments, a dynamic contextualization model may be controlled, in part, by one or more predetermined configurations (e.g., via loading a configuration file) that define optimization parameters, goals, guardrails, or the like for directing or constraining the model output, which may further ensure reliability of the model performance. In some embodiments, the dynamic contextualization model may be configured to operate independently of the predictive model, for example, in instances in which the predicted asset is already determined (e.g., in response to some example feedback or other input requesting additional contextualization for a particular asset) or instances in which prediction is otherwise unnecessary. For example, the dynamic contextualization model may be configured to generate a "playbook" or other cumulative or global document providing contextualization for a plurality of assets without requiring, although not precluding prediction of a predicted asset first.

As used herein a "prompt" refers to instructions or context provided to a generative AI model (e.g., a dynamic contextualization model) to guide the generative AI model's output generation. A prompt may serve as the starting point for interaction with the generative AI model, setting the stage for the type of output expected from the generative AI model or to elicit a customized and optimized multifactor contextualized asset representation from the generative AI model. The prompt may be a carefully engineered input to the generative AI model that encapsulates the specific requirements of an optimization task of the multifactor contextualized prediction process. For example, the prompt may be designed to elicit a multifactor contextualized asset representation output from the generative AI model that accounts for the preferences of an agent associated with the multifactor contextualized asset representation and that increases the likelihood of conversion. The prompt may be implemented as text that is sent to the generative AI model. For example, the prompt may be implemented as a string of text that is sent to the generative AI model via an API associated with the generative AI model.

As used herein, the term "component" refers to a system unit configured to facilitate one or more functionalities of an enterprise system. In some embodiments, a component may refer to software functionality executed by one or more particular hardware elements, including a software program application or aspect of a software program application executed by one or more processors. The processors may be part of a client computing device, a predictive computing device, or a third party computing device (e.g., local, remote, cloud based, or similar processing configurations). For example, a component may include a unit of software that facilitates one or more functionalities of a software program of an enterprise system, which unit may be executed by one or more corresponding units of hardware. For example, in some embodiments, a component may include one or more software development kits (SDKs), libraries, software packages, APIs, or the like, that may be included within or as an add-on to a software program application (e.g., a mobile application, computer program, or the like), web site, web browser (e.g., software executed through a web browser), or the like. In various embodiments, a component may be stored on a remote server and accessed remotely, such as through a web browser, downloaded to an on-device memory and accessed locally, such as a software program application, combinations thereof, or the like. In various embodiments, a component may be configured for a particular operating system such as IOS, ANDROID, WINDOWS, MACOS, LINUX, CHROME OS, or the like.

In various embodiments, a component may include one or more other components (also referred to as sub-components) comprising any one or more of the various functionalities described herein. For example, a component may include one or more specialized components configured to perform one or more functionalities of the component such as, for example, a library configured for managing connections (e.g., establishing connections, transmitting and receiving data via established connections, terminating connections, monitoring bandwidth, etc.), managing images (e.g., capturing images, preprocessing images, encrypting images, decrypting images, etc.), managing image playback (e.g., playing images received as video), managing agent feedback data (e.g., capturing and transmitting agent feedback data), managing graphical user interfaces (e.g., indicating screen sharing is ongoing, rendering agent feedback data, detecting changes in graphical user interfaces, etc.) or the like.

In some examples, a component may be associated with a client computing device, functionality, software program, or the like, and be referred to using corresponding terminology. Examples of such include, but are not limited to, an entity component associated with a client computing device operated by a user, an agent component associated with a client computing device operated by an agent, or the like. In some examples, a component or portion thereof associated with a particular client computing device may be stored and executed locally on the client computing device (e.g., via a processor and memory of the client computing device). In some examples, a component or portion thereof associated with a particular client computing device may be stored or executed remotely. In some examples, a component or portion thereof may cause display of a graphical user interface or one or more portions of a graphical user interface on the client computing device.

In some embodiments, a component may be designed to be interactive or facilitate interactivity such as by causing client computing devices to transmit and receive data to and from the predictive computing device or other computing device, and by extension, each other (e.g., programmatically instructing one or more components of the client computing device or otherwise associated with the client computing device to transmit or receive information).

As used herein, the term "entity feedback data" refers to data captured or provided by a component (e.g., an entity component) representative of inputs by a target entity. Entity feedback data may include or otherwise may be associated with input or action data (e.g., certain buttons or navigational actions with respect to a graphical user interface), text data (e.g., a message), audio data (e.g., recorded audio of a target entity speaking), image data (e.g., images of annotated text, annotated images, or the like.), or the like.

In some examples, entity feedback data may be indicative of feedback a target entity wishes to provide regarding output(s) of a multifactor contextualized prediction process executed by the computing system. In some examples, an entity component may be configured to capture entity feedback data based on one or more inputs or actions detected at a client computing device operated by a target entity and transmit the entity feedback data to the computing system. In some examples, the computing system may transmit the entity feedback data to one or more prediction models or dynamic contextualization models to improve the accuracy of the prediction models or dynamic contextualization models associated with the multifactor contextualized prediction process, and thus improve the multifactor contextualized prediction process. For example, the prediction models or dynamic contextualization models may be re-trained, fine-tuned or the like based at least in part on the entity feedback data. In some examples, the entity feedback data may serve as context data leveraged by the prediction models or dynamic contextualization models to generate respective outputs (e.g., predicted assets, multifactor contextualized asset representations). For example, the entity feedback data may comprise a prompt or other input to a contextualized prediction framework including one or more artificial intelligence models configured to trigger the one or more models (e.g., a predictive model or dynamic contextualization model) to generate an output or update a previous output. Feedback data, in some instances, may include a rating, like or dislike indication, or other indication that a contextualized asset representation was viewed favorably or unfavorably.

In some examples, entity feedback data may be captured via a dedicated feedback engine of the computing system. For example, the computing system may provide a feedback user interface configured to receive, from target entities, inputs representative of entity feedback data. In some examples, the feedback user interface may be automatically rendered on a client computing device of a target entity in response to or simultaneously with rendering on a user interface rendered on the client computing device that comprises one or more outputs of the multifactor contextualized prediction process. In some examples, entity feedback data may be captured by the entity component during interaction between the client computing device of the agent and a client computing device of the target device such as during live calls, video conferencing, face-to-face interaction, chat sessions, or other the like involving the agent and the target entity. In some examples, entity feedback may include implicit feedback. A non-limiting example of such implicit feedback associated with an entity includes indication of engagement by the entity with an asset recommendation or multifactor contextualized asset representation (e.g., indication that the entity initiated or completed a transaction based on the asset recommendation or multifactor contextualized asset representation), indication of lack of engagement by the entity with an asset recommendation or multifactor contextualized asset representation (e.g., indication that the entity did not initiate a transaction in response to receiving an asset recommendation or multifactor contextualized asset representation), or the like.

As used herein, the term "agent feedback data" refers to data captured or provided by a component (e.g., an agent component) representative of inputs by an agent. Agent feedback data may include or otherwise be associated with input or action data (e.g., certain buttons or navigational actions with respect to a graphical user interface), text data (e.g., a message), audio data (e.g., recorded audio of an agent speaking), image data (e.g., images of annotated text, annotated images, etc.), or the like.

In some examples, agent feedback data may be indicative of feedback an agent wishes to provide regarding output(s) of a multifactor contextualized prediction process executed by the computing system. In some examples, an agent component may be configured to capture agent feedback data based on one or more inputs or actions detected at a client computing device operated by an agent and transmit the agent feedback data to the computing system. The computing system may transmit the agent feedback data to one or more prediction models or dynamic contextualization models to improve the accuracy of the prediction models or dynamic contextualization models associated with the multifactor contextualized prediction process, and thus improve multifactor contextualized prediction process. For example, the prediction models or dynamic contextualization models may be re-trained, fine-tuned or the like based at least in part on the agent feedback data. In some examples, the agent feedback data may serve as context data leveraged by the prediction models or dynamic contextualization models to generate respective outputs (e.g., predicted assets, multifactor contextualized asset representations). For example, the agent feedback data may comprise a prompt or other input to a contextualized prediction framework including one or more artificial intelligence models configured to trigger the one or more models (e.g., a predictive model or dynamic contextualization model) to generate an output or update a previous output. Feedback data, in some instances, may include a rating, like or dislike indication, or other indication that a contextualized asset representation was viewed favorably or unfavorably.

In some examples, agent feedback data may be captured via a dedicated feedback engine of the computing system. For example, the computing system may provide a feedback user interface configured to receive, from agents, inputs representative of agent feedback data. In some examples, the feedback user interface may be automatically rendered on a client computing device of an agent in response to or simultaneously with rendering on a user interface rendered on the client computing device that comprises one or more outputs of the multifactor contextualized prediction process. In some examples, agent feedback data may be captured by the agent component during interaction between the client computing device of the agent and a client computing device of the target device such as during live calls, video conferencing, face-to-face interaction, chat sessions, or other the like involving the agent and the target entity.

In some embodiments, agent feedback data may include text, images, or other media. For example, an agent may edit or annotate text or image(s) within a predictive asset output or a multifactor contextualized asset representation via one or more input devices or processes associated with a client computing device (e.g., touch screen input, stylus input, keyboard input, cursor input, etc.). In some embodiments, agent feedback data may facilitate various remote control functionalities associated with the client computing device of an agent with respect to a client computing device of a target entity. For example, in some example implementations, agent feedback data may include modification of one or more configurations of a user interface rendered on a client computing device of a target entity for displaying a predictive asset output or multifactor contextualized asset representation. For example, the agent component may be configured to modify size, position, or other configuration parameters of one or more interface elements of the user interface based on agent feedback data. In some examples, agent feedback may include implicit feedback. A non-limiting example of such implicit feedback associated with an agent includes indication of engagement by the agent with an asset recommendation or multifactor contextualized asset representation (e.g., indication that the agent adopted/utilized the asset recommendation or multifactor contextualized asset representation), indication of lack of engagement by the agent with an asset recommendation or multifactor contextualized asset representation (e.g., indication that the agent did not adopt/utilize the asset recommendation or contextualized asset representation), or the like. As used herein, "feedback data" may refer to any feedback data regardless of its source.

In some examples, a computing system, as described herein, may provide for synchronized applications accessed by an agent component and entity component. For example, an agent, via a client application associated with the computing system, may access a first graphical user interface representative of and synched to a second graphical user interface displayed at a client computing device of a target entity such that the agent may, alter configurations of the second graphical user interface via the client application in response to configuration changes to the first graphic user interface.

System Architecture

Various embodiments of the present disclosure may be implemented as methods, apparatus, systems, computing devices, computer program products, or the like. As such, embodiments of the present disclosure may take the form of an apparatus, system, computing device, computing entity, or the like executing instructions stored on a computer-readable storage medium to perform certain steps or operations. Thus, embodiments of the present disclosure may take the form of an entirely hardware embodiment, an entirely computer program product embodiment, or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, or apparatus, systems, computing devices, computing devices, or the like carrying out instructions, operations, steps, and similar words used interchangeably (e.g., the executable instructions, instructions for execution, program code, or the like) on a computer-readable storage medium for execution. For example, retrieval, loading, and execution of code may be performed sequentially such that one instruction is retrieved, loaded, and executed at a time. In some example embodiments, retrieval, loading, or execution may be performed in parallel such that multiple instructions are retrieved, loaded, or executed together. Thus, such embodiments may produce specifically configured machines performing the steps or operations specified in the block diagrams and flowchart illustrations. Accordingly, the block diagrams and flowchart illustrations support various combinations of embodiments for performing the specified instructions, operations, or steps.

In this regard, FIG. 1 shows an example system environment 100 within which at least some embodiments of the present disclosure may operate. The depiction of the example system environment 100 is not intended to limit or otherwise confine the embodiments described and contemplated herein to any particular configuration of elements or systems, nor is it intended to exclude any alternative configurations or systems for the set of configurations and systems that can be used in connection with embodiments of the present disclosure. Rather, FIG. 1 and the system environment 100 disclosed therein is merely presented to provide an example basis and context for the facilitation of some of the features, aspects, and uses of the methods, apparatuses, computer readable media, and computer program products disclosed and contemplated herein.

The system environment 100 comprises a computing system 101 configured to receive a request from client computing devices (such as entity client computing devices 102 or agent client computing devices 104), process the request to generate an output, and provide the output to the client computing devices. The example system environment 100 may be used in a plurality of domains and not limited to any specific application as disclosed herewith. The plurality of domains may comprise healthcare, industrial, manufacturing, computer security, or the like to name a few.

In accordance with various embodiments of the present disclosure, one or more machine learned models may be trained or configured to generate predictive asset outputs (e.g., identifying one or more assets) or other machine learning outputs. Alternatively, or additionally, in various embodiments of the present disclosure, one or more generative AI models may be trained or configured to generate multifactor contextualized asset representations or other generative AI outputs. The models may be adapted to an autonomous multifactor contextualized prediction framework comprising data retrieval techniques, data analysis techniques, prompt engineering techniques, data transformation techniques, and optimization techniques. Some techniques of the present disclosure may adapt traditional models to a cohesive framework, such as the autonomous multifactor contextualized prediction framework for more efficiently handling portions of a contextualized prediction process.

In some embodiments, the computing system 101 may communicate with at least one of the client computing devices 102, 104 using one or more communication networks. Examples of communication networks comprise any wired or wireless communication network including, for example, a wired or wireless local area network (LAN), personal area network (PAN), metropolitan area network (MAN), wide area network (WAN), or the like, as well as any hardware, software, or firmware required to implement it (such as, e.g., network routers, or the like).

In some embodiments, the computing system 101 comprises a predictive computing device 106 (e.g., one or more servers) configured to perform various functions of the computing system 101. The predictive computing device 106 may be configured to communicate with one or more entity client computing devices 102, one or more agent client computing devices 104, or one or more external computing devices 108. In some embodiments, the predictive computing device 106, one or more entity client computing devices 102, one or more agent client computing devices 104, or one or more external computing devices 108 may communicate using one or more wired or wireless communication techniques such as for example network 190.

In some embodiments, a computing device, such as a predictive computing device 106 or external computing device 108 may comprise one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, or any combination of devices or entities adapted to perform the functions, operations, or processes described herein. Such functions, operations, or processes may comprise, for example, transmitting, receiving, operating on, processing, displaying, storing, determining, creating/generating, training one or more machine learning models or generative AI models, monitoring, evaluating, comparing, or similar terms used herein interchangeably. In some embodiments, these functions, operations, or processes may be performed on data, content, information, or similar terms used herein interchangeably. In various embodiments, the predictive computing device 106 is configured to perform an autonomous multifactor contextualized prediction process, as described herein.

The predictive computing device 106 or one or more external computing devices 108 may comprise or otherwise associated with storage subsystems that may be configured to store input data, training data, or the like that may be used by the respective computing devices to perform predictive data analysis or training operations of the present disclosure. In addition, the storage subsystems may be configured to store model definition data used by the respective computing devices to perform various predictive data processing or training tasks. The storage subsystem may comprise one or more storage units, such as multiple distributed storage units that are connected through a computer network. A storage unit in the respective computing devices may store at least one of one or more data assets or a set of data about the computed properties of one or more data assets. Moreover, each storage unit in the storage subsystems may comprise one or more non-volatile storage or volatile storage media similar to or different than the non-volatile or volatile computer-readable storage media discussed above.

The respective computing devices may be configured according to the techniques described herein to perform one or more operations of one or more techniques described herein. By way of example, the predictive computing device 106 may be configured to train, implement, use (e.g., execute an inference operation(s)), update (e.g., fine-tune), and evaluate machine learning models (e.g., prediction models) or generative AI models (e.g., dynamic contextualization models) in accordance with one or more training or inference operations of the present disclosure. In some examples, the external computing devices 108 may be configured to train, implement, use, update, and evaluate machine learning models or generative AI models in accordance with one or more training or inference operations of the present disclosure. In some embodiments, one or both of the prediction model and dynamic contextualization model may be stored and executed locally on a client computing device. In such examples, the local models may be trained centrally and deployed to the client computing devices. In some examples, a federated learning protocol may be used to collaboratively train the local models using decentralized data. In some examples, the local models may be trained using distillation techniques (e.g., training smaller models that may, for example, fit into local machines with larger models being deployed remotely, such as in the cloud). In some embodiments, a local model may be deployed for use by a target entity, which may allow greater portability and robustness by not requiring a network connection for localized processing. Any of the foregoing devices and systems may use such a localized model.

In some example embodiments, the predictive computing device 106 may be configured to receive or transmit one or more datasets, objects, or the like from or to the external computing devices 108 to perform one or more steps/operations of one or more techniques (e.g., data retrieval techniques, data analysis techniques, prompt engineering techniques, data transformation techniques, or optimization techniques) described herein. The external computing devices 108, for example, may comprise or be associated with one or more devices that may be configured to receive, transmit, store, manage, or facilitate datasets, or the like. The external computing devices 108, for example, may comprise data sources that may provide such datasets, or the like to the predictive computing device 106 which may leverage the datasets, such as entity data (or portion thereof), agent data (or portion thereof), model data, training data, or the like to perform one or more steps/operations of the present disclosure, as described herein. In some examples, the datasets may comprise an aggregation of data from across a plurality of external computing devices 108 into one or more aggregated datasets. The external computing devices 108, for example, may be associated with one or more data repositories, cloud platforms, compute nodes, organizations, or the like, which may be individually or collectively leveraged by the predictive computing device 106 to obtain and aggregate data which may be used in one or more steps/operations of the autonomous multifactor contextualized prediction process. In some examples, the datasets received from the external computing devices 108 may be stored in one or more databases of a storage subsystem 119 associated with the predictive computing device 106. In the depicted example of FIG. 1, the one or more databases may include an entity database 120 configured to store data associated with one or more entities, an agent database 123 configured to store data associated with one or more agents, an asset database 125 configured to store data associated with one or more assets, or an historical database 126 database configured to store data associated with historical outputs of past executions of the autonomous multifactor contextualized prediction process, including outputs at various stages of the autonomous multifactor contextualized prediction process.

In some example embodiments, the predictive computing device 106 may be configured to receive one or more generative AI models or machine learning models trained/configured and subsequently provided by the one or more external computing devices 108. For example, the one or more external computing devices 108 may be configured to perform one or more training steps/operations of the present disclosure to train or configure one or more machine learning models or one or more generative AI models, as described herein. In such a case, the trained machine learning model(s) or generative AI model(s) may be provided to the predictive computing device 106, which may leverage the trained machine learning model(s) or generative AI model(s) to perform one or more inference steps/operations of the present disclosure. In some examples, feedback (e.g., evaluation data, ground truth data) from the use of the machine learning model(s) or generative AI model(s) may be received or stored by the predictive computing device 106. In some examples, the feedback may be provided to the one or more external computing devices 108 to continuously train the machine learning model(s) or generative AI model(s) over time. In some examples, the feedback may be leveraged by the predictive computing device 106 to continuously train the machine learning model, generative AI model, or both over time. In this manner, the computing system 101 may perform, via one or more combinations of computing devices, one or more prediction, training, or any other machine learning-based techniques or generative AI learning-based techniques of the present disclosure.

In some example embodiments, the predictive computing device 106 includes a prediction engine 110, a contextualization engine 114, and a feedback engine 118. Each of the prediction engine 110, contextualization engine 114, and feedback engine 118 may be configured to perform one or more functionalities of the predictive computing device 106.

The prediction engine 110 may include one or more prediction models 112 trained or configured to support or perform one or more functionalities of the predictive computing device 106 including, but not limited to, predictive data analysis tasks for generating tailored recommendations (e.g., multifactor contextualized asset predictions) for target entities. Such predictive data analysis tasks may include utilization of various techniques as described herein, including, but not limited to, data retrieval techniques and data analyzing techniques.

The contextualization engine 114 may include one or more dynamic contextualization models 116 trained or configured to support or perform one or more functionalities of the predictive computing device 106 including, but not limited to, performing summarization tasks for generating tailored and contextually relevant multifactor contextualized asset representations for target entities. Such data transformation tasks may include utilization of various techniques as described herein, including but not limited to, retrieval augmentation techniques, prompt engineering techniques, and data transformation techniques.

An entity client computing device 102 may include an entity component 122 configured to perform one or more functions of the entity client computing device 102. Such functions may include one or more of establishing connection with the predictive computing device 106, establishing connection with an agent client computing device 104, transmitting or receiving data from the predictive computing device 106, or transmitting or receiving data from an agent computing device 104. In some embodiments, the entity component 122 or one or more components thereof may be a computer executable program and installed at the entity client computing device 102. In some embodiments, the entity component 122 or one or more components thereof may be a computer executable program and accessed via a network (e.g., a cloud-based computer executable program).

An agent client computing device 104 may include an agent component 124 configured to support or perform one or more functions of the agent client computing device 104. Such functions may include one or more of establishing connection with the predictive computing device 106, establishing connection with an entity client computing device 102, transmitting or receiving data from the predictive computing device 106, or transmitting or receiving data from an entity client computing device 102. In some embodiments, the entity component 122 or one or more components thereof may be a computer executable program and installed at the entity client computing device 102. In some embodiments, the entity component 122 or one or more components thereof may be a computer executable program and accessed via a network (e.g., a cloud-based computer executable program).

It will be understood that while many of the aspects and elements presented in FIG. 1 are shown as discrete, separate elements, other configurations may be used in connection with the methods, apparatuses, computer readable media, and computer programs described herein, including configurations that combine, omit, separate, or add aspects or elements. For example, in some embodiments, the functions of one or more of the illustrated elements in FIG. 1 may be performed by a single computing device or by multiple computing devices, which devices may be local or cloud based. It will be appreciated that the various functions performed by two or more of the predictive computing device 106, the entity client computing devices 102, or the agent client computing devices 104 may be embodied by a single apparatus, subsystem, or system comprising one or more sets of computing hardware (e.g., processor(s) and memory) configured to perform various functions thereof. In some embodiments, one or more intermediary devices may be positioned in electrical communication between the depicted system elements (e.g., connection between computing devices may be facilitated by various intermediary networking hardware or software elements).

In some embodiments, the entity component 122 or agent component 124 may be associated with or accessed via a platform, such as a mobile application platform or a web application platform for access by an operator of a respective entity client computing device 102 or agent client computing device 104. For example, the entity component 122 or agent component 124 may be available as a software unit of an application (e.g., a mobile application, web based application, etc.) installed at a respective client computing device 102 or 104, as an extension of a website, as an individual component accessed via the predictive computing device 106 (e.g., as software units available for download, software units accessible through a network, etc.). In this regard, the mobile application platform may be accessed by an entity client computing device 102 or agent client computing device 104 via an application installed in the entity client computing device 102 or agent client computing device 104. Further, the web application platform may be accessed by an entity client computing device 102 or agent client computer device 104 via a web browser, mobile browser application (e.g., a Wireless Application Protocol browser), or the like.

In some embodiments, the entity component 122 (or portions thereof such as one or more subcomponents) or agent component 124 (or portions thereof such as one or more subcomponents) may be embodied by or executed via a respective entity client computing device 102 or agent client computing device 104. For example, one or more software packages may be downloaded to a respective entity client computing device 102 or agent client computing device 104 and configured to perform the functions of one or more components of the entity component 122 or agent component 124 via a memory or processor of the respective entity client computing device 102 or agent client computing device 104. In some embodiments, the entity component 122 (or portions thereof) or agent component 124 (or portions thereof) may be embodied by one or more portable data storage devices, one or more platforms (e.g., mobile application platform, web application platform, or the like), or some combination thereof.

In some embodiments, an entity client computing device 102 or agent client computing device 104 is an electronic computing device that may be used by an operator for any of a variety of purposes including, but not limited to, one or more of sending or receiving signals, storing data, displaying data, viewing data, transmitting data, receiving data, or the like. For example, an entity client computing device 102 or agent client computing device 104 may be capable of, but not limited to, one or more of displaying graphical user interfaces and other graphical representations on the screens of the respective entity client computing device 102 or agent client computing device 104, receiving operator input, or receiving operator feedback.

An entity client computing device 102 or agent client computing device 104 may include computer hardware or software configured to perform one or more functionalities associated with the respective entity client computing device 102 or agent client computing device 104. In some embodiments, the entity client computing device 102 or agent client computing device 104 may be a mobile device. The mobile device may be a client computing device that is capable of being held and transported by an operator. Example mobile devices include, but not limited to, smart phones, tablet computers, laptop computers, wearables, laptop computers, elements or devices interacting with such devices (e.g., web cams, microphones, etc.), or the like. In some embodiments, an entity client computing device 102 or agent client computing device 104 may be a personal computer, terminal, or enterprise computer usable for interacting with the predictive computing device 106 or other client computing devices (e.g., via the predictive computing device 106 or direct communication). In various embodiments, an entity client computing device 102 or agent client computing device 104 may be a device owned by or otherwise assigned to the operator (e.g., a personal mobile phone, tablet, laptop, desktop computer, elements or other related devices, etc.). The entity client computing device 102 or agent client computing device 104 may use (e.g., access or install) one or more computer program products (e.g., a mobile application platform, desktop computer application platform) configured to provide one or more functionalities of the entity component 122 or agent component 124, respectively.

The various functions of the system environment 100 may be performed by other arrangements of one or more computing devices or computing systems without departing from the scope of the present disclosure. For example, in an embodiment, one or more functions of the computing system 101 or predictive computing device 106 may be performed by a single computing device or computing system, or by multiple computing devices, which devices may be local or cloud based. In some embodiments, two or more of the depicted computing devices or computing systems may be part of a single system or device. For example, the entity client computing device 102 and predictive computing device 106 may be part of the same local networked system or part of the same computing system (e.g., predictive computing device 106 may be a terminal or other front end portion associated with the computing system 101 or a larger system that includes both the predictive computing device 106 and the entity client computing device 102). In some embodiments, two or more of the depicted devices or computing systems may be physically or electronically remote from each other (e.g., connected via the Internet). It will be appreciated that the various functions performed by two or more of the prediction engine 110, contextualization engine 114, or feedback engine 118 may be performed by a single apparatus, subsystem, or system. For example, two or more of the prediction engine 110, contextualization engine 114, or feedback engine 118 may be embodied by a single apparatus, subsystem, or system comprising one or more sets of computing hardware (e.g., processor(s) and memory) configured to perform various functions thereof.

The various elements illustrated in the system environment 100 may be configured to communicate via one or more communication mechanisms, including wired or wireless connections, such as over a network (e.g., network 190), bus, or similar connection. For example, a network may include any wired or wireless communication network including, for example, a wired or wireless local area network (LAN), personal area network (PAN), metropolitan area network (MAN), wide area network (WAN), or the like, as well as any hardware, software or firmware required to implement it (such as, e.g., network routers, etc.). For example, the network may include a cellular telephone, an 802.11, 802.16, 802.20, or WiMAX network. Further, a network may include a public network, such as the Internet, a private network, such as an intranet, or combinations thereof, and may utilize a variety of networking protocols now available or later developed including, but not limited to TCP/IP based networking protocols.

In various embodiments, the elements depicted in FIG. 1 as being included in the computing system 101, the predictive computing device 106, the entity client computing device 102, or the agent client computing device 104, although not required to be an integral system, may be connected via one or more networks. In some embodiments, one or more APIs may be leveraged to communicate with or facilitate communication between one or more of the elements illustrated in the predictive computing device 106, the entity client computing device 102, or the agent client computing device 104, and system environment 100.

Example System Operation

Using the various elements and techniques described herein, the computing system 101 (e.g., predictive computing device 106 thereof) may be configured to execute an autonomous multifactor contextualized prediction process configured to generate a predictive asset output (e.g., identifying at least one asset) at a first stage of the multifactor contextualized prediction process and transform the predictive asset output to a multifactor contextualized asset representation at a second stage of the autonomous multifactor contextualized prediction process. In some embodiments, the computing system 101 may be configured to detect a process trigger that invokes the autonomous multifactor contextualized prediction process.

In some embodiments, the process trigger may comprise an API request. For example, the computing system 101 (e.g., the predictive computing device 106 thereof) may receive an API request from a client computing device (e.g., entity client computing device 102 or agent client computing device 104). The computing system 101 (e.g., the predictive computing device 106 thereof) may receive the API request at an API endpoint associated with the computing system 101. In some embodiments, the computing system 101 may authenticate the API request in response to receiving the API request to, for example, verify the transmitter of the API request.

In some embodiments, the client computing device transmitting the API request may establish a connection with the predictive computing device 106 via the component (e.g., entity component 122 or agent component 124) of the transmitting client computing device. For example, in some embodiments, an electronic connection may be made between an entity client computing device 102 and the predictive computing device 106 or between an agent client computing device 104 and the predictive computing device 106 prior to transmission of an API request. In some examples, such electronic connection may include a support session, a transaction session, or other electronic connection via one or more communication channels (e.g., mobile interface, web interface, voice communication, or the like).

In some embodiments, the process trigger may be generated during such electronic connection. For example, an entity component 122 of an entity client computing device 102 or an agent component 124 of an agent client computing device 104 may generate an API request (e.g., configured to invoke an autonomous multifactor contextualized prediction process, as described herein) during real-time interaction involving a target entity or an agent. By way of example, an entity client computing device 102 may transmit an API request during user interaction with a mobile application, web application, or other application. Such interaction may include, but not limited to, the target entity user scrolling through an electronic product catalog associated with an enterprise, browsing a website, or executing a query on a search engine. By way of another example, an agent client computing device 104 may transmit an API request to the predictive computing device during interaction, such as a sales pitch, between a customer of an enterprise and an employee (e.g., sales representative) of the enterprise.

In some embodiments, the process trigger may comprise an indication of a recent transaction associated with a target entity. For example, the computing system 101 may be configured to monitor or detect transactions associated with an entity client computing device 102 (or otherwise with the target entity). In some embodiments, the detection of such transactions may invoke an autonomous multifactor contextualized prediction process, as described herein. By way of example, in some example implementations, the computing system 101 may be configured to determine cross-category asset prediction opportunities or complementary or related asset prediction opportunities (e.g., cross-selling opportunities) by detecting such recent transactions, third party asset utilization, or the like and executing an autonomous multifactor contextualized prediction process based at least in part on the asset(s) in the recent transactions. The above examples of process trigger are not intended to be limiting. For example, the process trigger may comprise an indication of a recent interest activity associated with a target entity (e.g., a customer filing an application or visiting an enterprise location/site, or other trigger similar to cross-category asset prediction opportunities or complementary or related asset prediction opportunities); entity classification output indicative of a qualified entity (e.g., qualified customer in a sales context) based on, for example, entity interactions; or indication of a prospective transaction opportunity (e.g., including net new sales opportunity or recent purchases associated with an existing customer of the enterprise in a sales context).

In some embodiments, the computing system 101 (e.g., predictive computing device 106 thereof) may be configured to parse the process trigger to identify at least a target entity. For example, the computing system 101 may be configured to parse an API request, recent transaction data, or other process trigger to identify at least an entity identifier from the process trigger. Such entity identifier may uniquely identify an entity (e.g., target entity) from other entities. In some embodiments, the computing system 101 may be configured to apply the entity identifier to one or more data sources to obtain various data leveraged by the computing system 101 to perform one or more steps/operations of an autonomous multifactor contextualized prediction process, as described herein. In some embodiments, such data leveraged by the computing system 101 includes at least entity data associated with the target entity identified in the API request (or other process trigger).

The computing system 101 may be configured to utilize one or more data retrieval or ingestion techniques to obtain entity data. In some embodiments, the computing system 101, using one or more techniques may apply the entity identifier extracted from the parsed API request (or other process trigger) to an entity database (such as entity database 120 to retrieve entity data associated with the target entity (e.g., entity that is uniquely identified by the entity identifier). For example, in some embodiments, the computing system 101 may be configured to generate a search query based on the entity identifier and apply the search query to the entity database 120 to retrieve the entity data (or portion thereof).

Alternatively, or additionally, the computing system 101, using one or more techniques may apply the entity identifier to one or more external data sources (such as third-party data sources) to obtain entity data. For example, in some embodiments, the computing system 101 (e.g., predictive computing device 106) may be configured to apply an entity identifier (or portion thereof) to one or more websites to obtain entity data (or portion thereof) using one or more data retrieval techniques including, but not limited to, web scraping. In some examples, the computing system 101 may be configured to receive the entity data (or portion thereof) from one or more external computing devices (such as external computing devices 108) via one or more APIs, webhooks, wired or wireless communication network, or the like. In some examples, the computing system 101 may apply Optical Character Recognition techniques (e.g., OCR algorithms, data extraction models), or other image recognition techniques to one or more data sources to extract the entity data (or portion thereof) from the one or more data sources. For example, the computing system 101 may be configured to apply OCR techniques (or other techniques) to portable document format (PDF) or other image file formats to extract entity data (or portion thereof) for a target entity.

In this regard, in some embodiments, entity data (or portion thereof) may be previously obtained from one or more data sources and stored in the entity database 120. In some embodiments, entity data (or a portion thereof) may be received in real-time or near real-time relative to execution of the autonomous multifactor contextualized prediction process.

In some embodiments, the computing system 101 may be configured to identify other data from the parsed API request (or other parsed process trigger). In some embodiments, such other data include, but is not limited to, an agent identifier that uniquely identifies an agent. In some embodiments, the computing system 101 may be configured to apply a search query (or other data retrieval techniques) to a database such as agent database 123 or to one or more other data sources to obtain agent data associated with the agent (e.g., agent uniquely identified by the agent identifier extracted from the parsed API request or other process trigger). In some embodiments, the agent data may be previously obtained from one or more data sources and stored in the agent database 123. In some embodiments, the agent data (or a portion thereof) may be received in real-time or near real-time relative to execution of the autonomous multifactor contextualized prediction process.

In some embodiments, the prediction engine 110 may be configured to apply input data that comprises at least the entity data one or more prediction models. For example, the prediction engine may be configured to input the entity data or other input data into a prediction model 112. In some embodiments, the prediction model 112 may be previously trained or configured to analyze the input data to generate a predictive asset output. In some examples, analyzing the input data may comprise manipulating the input data, examining the input data, transforming the input data, performing statistical computing, identifying meaning insights from the input data, and/or performing other predictive analysis tasks with respect to the input data and using one or more machine learning algorithms (e.g., different models may be used for different use cases, different entities/agents, or the like). In some embodiments, the input data may comprise, in addition to the entity data (or portion thereof), one or more of asset data for one or more candidate assets, agent data for one or more agents, historical predictive asset outputs, one or more optimization parameters, communication channel data (e.g., channel for transmitting the output of the autonomous multifactor contextualized prediction process to a client computing device), or related asset identifier (e.g., asset identifier for an asset of a recent transaction).

In some embodiments at least a portion of the input data may be obtained from the storage subsystem 119. For example, the prediction engine 110 may be configured to apply a search query to one or more of the entity database 120, agent database 123, asset database 125, or historical database 126 to receive, respectively, one or more of the entity data, agent data, asset data, or historical predictive asset output.

In some embodiments, the computing system 101, using the prediction engine 110, may be configured to autonomously input the input data into a prediction model 112. For example, in some embodiments, the computing system, using the prediction engine 110, may be configured to autonomously input the input data into a prediction model 112 via an API associated with the prediction model. For example, in some embodiments, the prediction engine 110 may generate an API request comprising the input data and transmit the API request to an API associated with the prediction model. In some examples, the computing system 101 (e.g., using the prediction engine 110 thereof) may format the API request according to a predefined schema, using, for example, a standard data interchange format such as JSON, XML, or the like. In some embodiments, the predictive asset output may be tailored to the target entity. For example, a prediction model 112 may be configured to analyze the input data and tailor the predictive asset output to the target entity. Alternatively, or additionally, in some embodiments, the predictive asset output may be tailored to an agent. For example, a prediction model 112 may be configured to analyze the input data and tailor the predictive asset output to the agent. For example, the prediction model 112 may be configured to select one or more assets from a group of assets associated with the agent for recommendation to the target entity. By way of example, in an example implementation, such group of assets may comprise assets an agent (e.g., agent of an enterprise) is authorized to offer or otherwise assigned to offer.

In some embodiments, the predictive asset output identifies one or more assets selected from one or more candidate assets. For example, a prediction model 112 may be configured to analyze the input data with respect to a prediction space that comprises the one or more candidate assets, and select one or more assets from the one or more candidate assets that is contextually relevant and tailored to at least the target entity (as described above). In some embodiments, a predictive asset output may comprise one or more predicted assets. The one or more predicted assets may be configured to store data associated with an asset recommended for a target entity including but not limited to, an asset identifier for the asset.

In some embodiments, the computing system 101, using the prediction engine 110, may be configured to determine a communication channel for transmitting the output(s) of the multifactor contextualized prediction process. In some embodiments, the prediction engine 110 may leverage a prediction model 112 to determine the communication channel. For example, in some embodiments, a prediction model 112 may be configured to generate a predictive asset output that identifies an asset and a communication channel (e.g., mobile interface, web interface, voice chat, text chat, phone call, email, or the like) for transmitting the final output of the autonomous multifactor contextualized prediction process (e.g., output of a second stage of the autonomous multifactor contextualized prediction process).

In some embodiments, the prediction engine 110 may be configured to transmit the predictive asset output to the contextualization engine 114. The contextualization engine 114 may be configured to receive the predictive asset output from the prediction engine and generate a prompt for a generative AI model, such as dynamic contextualization model 116. In some embodiments, the contextualization engine 114 may perform one or more of data extraction, preprocessing (e.g., data cleaning, feature engineering, or dimensionality reduction), or data transformation on the predictive asset output to generate the prompt.

The dynamic contextualization model 116 may be configured to generate and output a multifactor contextualized asset representation based on the prompt. In some embodiments, the dynamic contextualization model 116 may be configured to generate a multifactor contextualized asset representation using one or more techniques. In some embodiments, such techniques include RAG. For example, in some embodiments, the computing system 101, using the contextualization engine 114, may be configured to generate a prompt configured to direct a dynamic contextualization model 116 to one or more databases or knowledge sources to retrieve data/information that may be leveraged by the dynamic contextualization model to, for example, improve the accuracy of the multifactor contextualized asset representation output and reduce hallucination by the dynamic contextualization model.

In some embodiments, the retrieved data (or portion thereof) may serve as context for the dynamic contextualization model 116. For example, in some embodiments, the contextualization engine 114 may be configured to engineer or otherwise generate a prompt that includes instructions that directs a dynamic contextualization model 116 to the asset database 125 to retrieve contextually-relevant asset features for a recommended asset (e.g., asset identified in a predictive asset output), and generate a representation of the asset that includes the retrieved contextually-relevant asset features. Alternatively, or additionally, the contextualization engine 114 may be configured to engineer or otherwise generate a prompt that includes instructions that directs a dynamic contextualization model 116 to the historical database 126 to retrieve historical multifactor contextualized asset representations for context or examples. In some embodiments, the historical database 126 may store the historical multifactor contextualized asset representations along with the historical input data or other data used in generating the historical multifactor contextualized asset representations. In some embodiments, a dynamic contextualization model 116 may be configured to analyze and modify the retrieved historical multifactor contextualized asset representations to generate the desired multifactor contextualized asset representation output for the particular use case.

In some embodiments, the prompt may include one or more prompt examples. For example, the contextualization engine 114 may be configured to generate the prompt to include one or more prompt examples to guide the dynamic contextualization model to generate desired output.

In some embodiments, the contextualization engine 114 may be configured to engineer or otherwise generate the prompt to elicit a multifactor contextualized asset representation optimized for the selected communication channel for transmitting the final output of the autonomous multifactor contextualized prediction process to a client computing device. In some examples, the contextualization engine 114 may be configured to generate the using different techniques or may comprise prompt-specific instructions (e.g., to achieve desired output or performance) based on the particular use case or the selected communication channel. As further described below, in some embodiments, a dynamic contextualization model 116 may be instructed or trained to configure the multifactor contextualized asset representation output at the second stage of the autonomous multifactor contextualized prediction process based on the selected communication channel. For example, the computing system 101, using a dynamic contextualization model 116, may be configured to generate a multifactor contextualized asset representation optimized for the selected communication channel. Alternatively, or additionally, the computing system 101, using a dynamic contextualization model 116, may be configured to optimize one or more optimization parameters.

In some embodiments, the feedback engine 118 is configured to receive feedback data (e.g., entity feedback data or agent feedback data) from a client computing device. In some embodiments, the feedback engine 118 may be configured to analyze the feedback data with respect to the prediction engine 110 and determine relevant portions of the feedback data with respect to the prediction engine 110. The feedback engine 118 may transmit such relevant portions of the feedback data to the prediction engine 110. In some embodiments, the prediction engine 110 may be configured to apply the received feedback data to a prediction model 112 to improve the accuracy of the prediction model 112.

Alternatively, or additionally, in some embodiments, the feedback engine 118 may be configured to analyze the feedback data with respect to the contextualization engine 114 and determine relevant portions of the feedback data with respect to the contextualization engine 114. The feedback engine 118 may be configured to transmit such relevant portions of the feedback data to the contextualization engine 114. In some embodiments, the contextualization engine 114 may apply the received feedback data to a dynamic contextualization model 116 to improve the accuracy of the dynamic contextualization model 116.

In some embodiments, the feedback engine 118 may transmit all the feedback data to the prediction engine 110 or the contextualization engine 114.

Example Apparatuses of the Disclosure

Having discussed example systems in accordance with the present disclosure, example apparatuses in accordance with the present disclosure will now be described.

Figure 2:
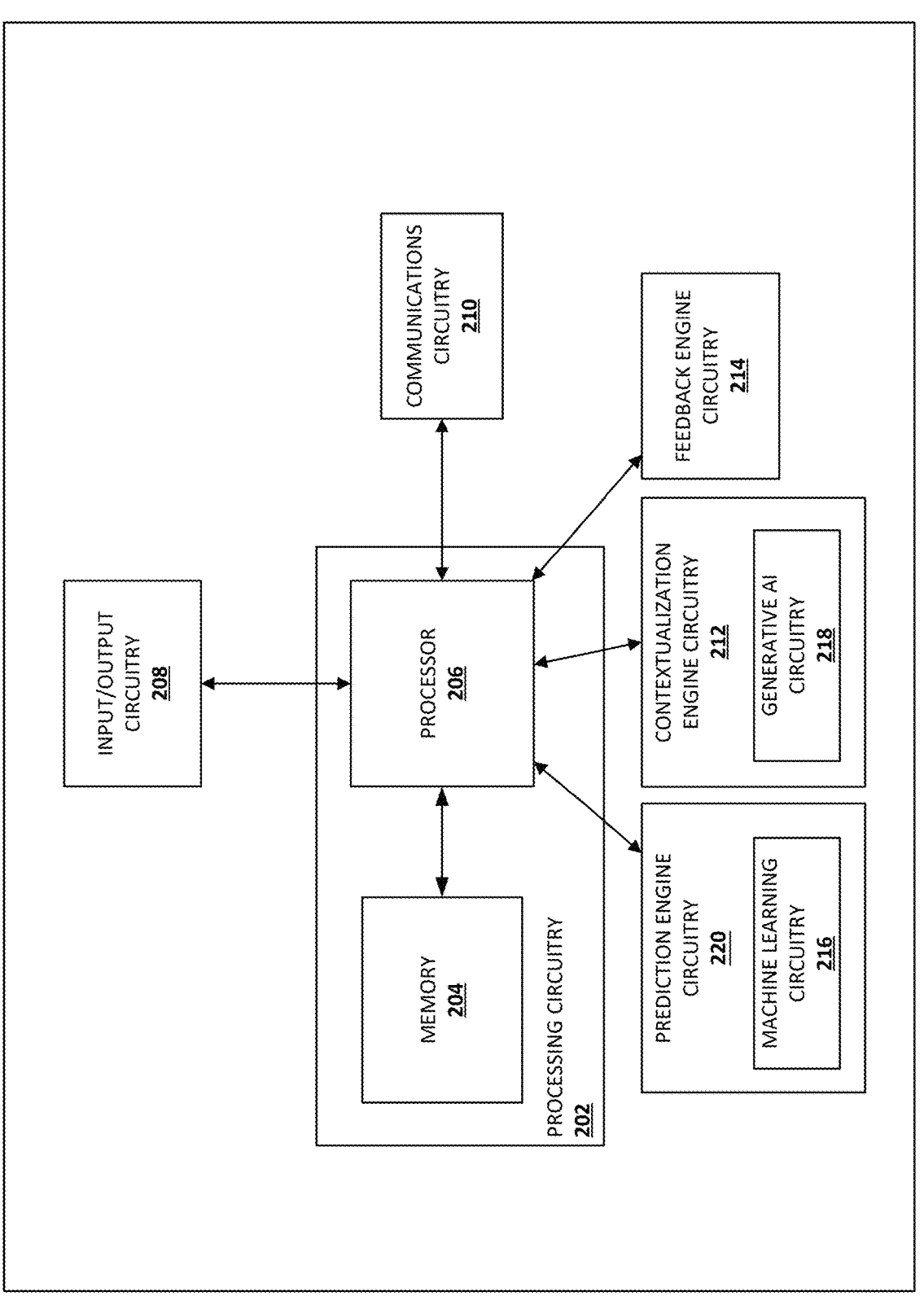
FIG. 2 illustrates a block diagram of an apparatus that may be specifically configured in accordance with various embodiments of the present disclosure and within which at least some embodiments of the present disclosure may operate.

FIG. 2 illustrates a block diagram of an apparatus 200 in accordance with some example embodiments. For example, in some embodiments, the computing system 101 may be embodied by one or more apparatuses 200. In this regard, in some embodiments, the computing system 101 or one or more portions (e.g., one or more individual elements) thereof, if embodied in a particular embodiment, may be embodied by one or more apparatuses 200.

In some embodiments, the apparatus 200 may include a processing circuitry 202 as shown in FIG. 2. In some embodiments, the elements illustrated in and described with reference to FIG. 2 below may not be mandatory and thus one or more may be omitted in certain embodiments. Additionally, some embodiments, may include further or different elements beyond those illustrated in and described with reference to FIG. 2. In some embodiments, the functionality of the computing system 101 or any subset thereof may be performed by a single apparatus 200 or multiple apparatuses 200. In some embodiments, the apparatus 200 may comprise one or a plurality of physical devices, including distributed, cloud-based, or local devices.

Although some elements are described with respect to functional limitations, it should be understood that the particular implementations necessarily include the use of particular computing hardware, such as the hardware shown in FIG. 2. It should also be understood that certain of the elements described herein may include similar or common hardware. For example, two sets of circuitries for example, may both leverage use of the same processor(s), network interface(s), storage medium(s), or the like, to perform their associated functions, such that duplicate hardware is not required for each set of circuitry and a single physical circuitry may be used to perform the functions of multiple circuitries described herein. The use of the term "circuitry" as used herein with respect to elements of the apparatuses described herein should therefore be understood to include particular hardware configured to perform the functions associated with the particular circuitry as described herein.

In some embodiments, "circuitry" may include processing circuitry, storage media, network interfaces, input/output devices, or the like. In some embodiments, other elements of the apparatus 200 may provide or supplement the functionality of another particular set of circuitry. For example, the processor 206 in some embodiments provides processing functionality to any of the sets of circuitries, the memory 204 provides storage functionality to any of the sets of circuitry, the communications circuitry 210 provide network interface functionality to any of the sets of circuitry, or the like.

The apparatus 200 may include or otherwise be in communication with processing circuitry 202 that is configurable to perform actions in accordance with one or more example embodiments disclosed herein. In this regard, the processing circuitry 202 may be configured to perform or control performance of one or more functionalities of the apparatus 200 in accordance with various example embodiments, and thus may provide means for performing functionalities of the apparatus 200 in accordance with various example embodiments. The processing circuitry 202 may be configured to perform data processing, application, and function execution, or other processing and management services according to one or more example embodiments. In some embodiments, the apparatus 200 or a portion(s) or elements(s) thereof, such as the processing circuitry 202, may be embodied as or comprise a chip or chip set. In other words, apparatus 200 or the processing circuitry 202 may comprise one or more physical packages (e.g., chips) including materials, elements or wires on a structural assembly (e.g., a baseboard). The structural assembly may provide physical strength, conservation of size, or limitation of electrical interaction for element circuitry included thereon. The apparatus 200 or the processing circuitry 202 may therefore, in some cases, be configured to implement an embodiment of the disclosure on a single chip or as a single "system on a chip." As such, in some cases, a chip or chipset may constitute means for performing one or more operations for providing the functionalities described herein.

In some embodiments, the processing circuitry 202 may include a processor 206 (or co-processor or any other processing circuitry assisting or otherwise associated with the processor) and, in some embodiments, such as that illustrated in FIG. 2, may further include memory 204. The processing circuitry 202 may be in communication with or otherwise control a user interface (e.g., embodied by input/output circuitry 208) or a communications circuitry 210. As such, the processing circuitry 202 may be embodied as a circuit chip (e.g., an integrated circuit chip) configured (e.g., with hardware, software or a combination of hardware and software) to perform operations described herein.

The processor 206 may be embodied in a number of different ways. For example, the processor 206 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 206 may comprise a plurality of processors. The plurality of processors may be in operative communication with each other and may be collectively configured to perform one or more functionalities of the apparatus 200 as described herein. In some example embodiments, the processor 206 may be configured to execute instructions stored in the memory 204 or otherwise accessible to the processor 206. As such, whether configured by hardware or by a combination of hardware and software, the processor 206 may represent an entity (e.g., physically embodied in circuitry—in the form of processing circuitry 202) capable of performing operations according to embodiments of the present disclosure while configured accordingly. Thus, for example, when the processor 206 is embodied as an ASIC, FPGA or the like, the processor 206 may be specifically configured hardware for conducting the operations described herein. Alternatively, as another example, when the processor 206 is embodied as an executor of software instructions, the instructions may specifically configure the processor 206 to perform one or more operations described herein. The use of the terms "processor" and "processing circuitry" may be understood to include a single core processor, a multi-core processor, multiple processors internal to the apparatus 200, or one or more remote or "cloud" processor(s) external to the apparatus 200.

In some example embodiments, the memory 204 may include one or more non-transitory memory devices such as, for example, volatile or non-volatile memory that may be either fixed or removable. In this regard, the memory 204 may comprise a non-transitory computer-readable storage medium. It will be appreciated that while the memory 204 is illustrated as a single memory, the memory 204 may comprise a plurality of memories. The memory 204 may be configured to store information, data, applications, instructions or the like for enabling the apparatus 200 to carry out various functions in accordance with one or more example embodiments. For example, the memory 204 may be configured to buffer input data for processing by the processor 206. Additionally, or alternatively, the memory 204 may be configured to store instructions for execution by the processor 206. The memory 204 may include one or more databases that may store a variety of files, contents, or data sets. Among the contents of the memory 204, applications may be stored for execution by the processor 206 in order to carry out the functionality associated with each respective application. In some cases, the memory 204 may be in communication with one or more of the processors 206, input/output circuitry 208 or communications circuitry 210, via a bus(es) for passing information among elements of the apparatus 200.

The input/output circuitry 208 may provide output to the user or an intermediary device and, in some embodiments, may receive one or more indication(s) of user input directly or indirectly. In some embodiments, the input/output circuitry 208 is in communication with processor 206 to provide such functionality. The input/output circuitry 208 may include one or more user interface(s) or include a display that may comprise the user interface(s) rendered as a web user interface, an application interface, or the like, to the display of a client computing device, a backend system, or the like. The input/output circuitry 208 may be in communication with the processing circuitry 202 to receive an indication of a user input at the user interface or to provide an audible, visual, mechanical, or other output to the user. As such, the input/output circuitry 208 may include, for example, a keyboard, a mouse, a joystick, a display, a touch screen display, a microphone, a speaker, or other input/output mechanisms. As such, the input/output circuitry 208 may, in some example embodiments, provide means for a user to access and interact with the apparatus 200. The processor 206 or input/output circuitry 208 comprising or otherwise interacting with the processor 206 may be configured to control one or more functions of one or more user interface elements through computer program instructions (e.g., software or firmware) stored on a memory accessible to the processor 206 (e.g., stored on memory 204, or the like).

The communications circuitry 210 may include one or more interface mechanisms for enabling communication with other devices or networks. In some cases, the communications circuitry 210 may comprise any means such as a device or circuitry embodied in either hardware, or a combination of hardware and software that is configured to receive or transmit data from/to a network or any other device or module in communication with the processing circuitry 202. The communications circuitry 210 may, for example, include an antenna (or multiple antennas) and supporting hardware or software for enabling communications with a wireless communication network (e.g., a wireless local area network, cellular network, global positioning system network, or the like) or a communication modem or other hardware/software for supporting communication via cable, digital subscriber line (DSL), universal serial bus (USB), Ethernet or other methods.

In some embodiments, the apparatus 200 may include a prediction engine circuitry 220 which may include hardware elements, with or without enabling software elements, firmware elements, or a combination thereof configured to, with the processing circuitry 202, input/output circuitry 208 or communications circuitry 210, perform one or more functions associated with the prediction engine 110 (as described above with reference to FIG. 1). For example, the prediction engine circuitry 220 may access, facilitate access, receive, process, manipulate, provide, or otherwise use, or make available for use, certain data (e.g., entity data, agent data, historical data, asset data, feedback data, training data, predicted assets, or other data) used by one or more other elements of the apparatus 200 through, for example, the use of hardware, software, applications, or APIs executed using a processor, such as the processor 206. In some embodiments, the prediction engine circuitry 220 may interact with the memory 204, which may store the aforementioned data. It should also be appreciated that, in some embodiments, the prediction engine circuitry 220 may include a separate processor, specially configured field programmable gate array (FPGA), or application specific interface circuit (ASIC) to receive such data utilized by the prediction engine circuitry 220. The prediction engine circuitry 220 may also provide for communication with other elements of the apparatus 200, system or external systems via a network interface provided by the communications circuitry 210. In some embodiments, one or more portions of the prediction engine circuitry 220 and processing circuitry 202 may be integrated into a single circuitry or group of circuitries, with or without various other circuitries discussed herein, configured to execute the respective functionalities thereof.

The prediction engine circuitry 220 may include a machine learning circuitry 216. The machine learning circuitry 216 may include software or a combination of hardware and software that supports various functionality associated with one or more prediction models 112. For example, in some embodiments, the machine learning circuitry 216 includes hardware, software, firmware, or a combination thereof, that performs a tailored prediction task to identify, for a target entity, one or more contextually relevant assets from a prediction space by utilizing one or more prediction models. The one or more prediction models may be trained or configured to perform such tailored prediction task by analyzing at least entity data associated with the target entity.

In some embodiments, the machine learning circuitry 216 additionally or alternatively includes hardware, software, firmware, or a combination thereof, that autonomously transmits the output (e.g., a predictive asset output) of the prediction task to one or more other circuitry of the apparatus 200 such as the contextualization engine circuitry 212 or feedback engine circuitry 214. In some embodiments, the machine learning circuitry 216 additionally or alternatively includes hardware, software, firmware, or a combination thereof, that autonomously transmits or otherwise feeds the output of the prediction task as input to a dynamic contextualization model 116.

In some embodiments, the one or more prediction models 112 are trained on a training dataset that includes entity data associated with one or more entities. In some examples, such entity data may comprise actual/real-world data of the entities or synthetic data that mimics real-world data. In some examples, the entity data may comprise comprehensive data about or related to the target entity such as, but not limited to, trend data (e.g., sales trends), revenue, historical record (e.g., including a record of past customer losses/churn history), features indicative of the likelihood of the entity qualifying for one or more assets such as, for example, lending assets. Alternatively, or additionally, in some examples, the entity data may comprise segment and individual information that may be leveraged by the system to rank entities based on relevance to, for example, select target entities with respect to which to perform autonomous multifactor contextualized prediction as described herein. For example, such ranking may indicate which entity is more valuable relative to other entities, wherein autonomous multifactor contextualized prediction process may be performed with respect to selected entities from one or more entities based on their respective rankings. In some embodiments, the machine learning circuitry 216 includes hardware, software, firmware, or a combination thereof configured to train the prediction model on the training dataset or other data.

In some embodiments, the apparatus 200 may include a contextualization engine circuitry 212 which may include hardware elements, with or without enabling software elements, firmware elements, or a combination thereof configured to, with the processing circuitry 202, input/output circuitry 208 or communications circuitry 210, perform one or more functions associated with the contextualization engine 114 (as described above with reference to FIG. 1). For example, the contextualization engine circuitry 212 may access, facilitate access, receive, process, manipulate, provide, or otherwise use, or make available for use, certain data (e.g., entity data, agent data, historical data, asset data, feedback data, training data, predicted assets, multifactor contextualized asset representations, or other data) used by one or more other elements of the apparatus 200 through, for example, the use of hardware, software, applications, or APIs executed using a processor, such as the processor 206. In some embodiments, the contextualization engine circuitry 212 may interact with the memory 204, which may store the aforementioned data. It should also be appreciated that, in some embodiments, the contextualization engine circuitry 212 may include a separate processor, specially configured field programmable gate array (FPGA), or application specific interface circuit (ASIC) to receive such data utilized by the contextualization engine circuitry 212. The contextualization engine circuitry 212 may also provide for communication with other elements of the apparatus 200, system or external systems via a network interface provided by the communications circuitry 210. In some embodiments, one or more portions of the prediction engine circuitry 220 and processing circuitry 202 may be integrated into a single circuitry or group of circuitries, with or without various other circuitries discussed herein, configured to execute the respective functionalities thereof.

The contextualization engine circuitry 212 may include a generative AI circuitry 218. The generative AI circuitry 218 may include software or a combination of hardware and software that supports various functionality associated with one or more dynamic contextualization models 116. For example, in some embodiments, the generative AI circuitry 218 includes hardware, software, firmware, or a combination thereof, that performs a data transformation task to transform predictive asset outputs from a prediction model to customized/personalized multifactor contextualized asset representations for the target entity or associated agent using a dynamic contextualization model. The multifactor contextualized asset representation may identify at least one or more contextually relevant asset features associated with the asset based at least in part on the entity data or the agent data.

The one or more dynamic contextualization models may be trained or configured to analyze entity data associated with the target entity to transform a predictive asset output from a prediction model into a multifactor contextualized asset representation that is tailored to the target entity based on behavioral data, interaction data, or other entity data. In some embodiments, the interaction data comprise one or more of text data, audio data, or video data associated with the target entity. In some embodiments, the audio data or video data may be parsed (e.g., sentiment analysis in response to certain triggers, gesture/facial expression analysis, etc.). In some embodiments where the interaction data includes audio data or video data, the computing system 101 may be configured to generate a transcript of the audio data or video data for use by one or more engines (e.g., prediction engine 110, contextualization engine 114, feedback engine 118) of the predictive computing device 106 at one or more steps/operations of the autonomous multifactor contextualized prediction process. For example, the computing system 101 may be configured to convert the audio data or video data to text data for use at one or more steps/operations of the autonomous multifactor contextualized prediction process. For example, in some embodiments, data may be collected passively during an interaction (e.g., collecting audio, video, or text data during an interaction between a target entity and an agent) and the autonomous multifactor contextualized prediction process may generate multifactor contextualized asset representations in real time during the interaction (e.g., pop-up recommendations) or following the interaction.

Alternatively, or additionally, the one or more dynamic contextualization models may be trained or configured to analyze agent data associated with an agent to transform the predictive asset output from a prediction model into a multifactor contextualized asset representation that is tailored to the agent based on agent performance data, agent configuration data, or other agent data. For example, the generative AI circuitry 218 may include hardware, software, firmware, or a combination thereof, that applies entity data, agent data, predictive asset output of a prediction model, or other data to one or more dynamic contextualization models to transform the predictive asset output into a customized/personalized multifactor contextualized asset representation with respect to the target entity or the agent.

Alternatively, or additionally, the one or more dynamic contextualization models may be trained or configured to optimize one or more configuration parameters associated with the data transformation task. Such configuration parameters may include, but not limited to, confidence level of the model output relative to desired output, predicted conversion rate, predicted success rate for downstream applications of the multifactor contextualized asset representation, or the like). For example, in some embodiments, the one or more dynamic contextualization models may be configured to maximize conversion rate and/or user engagement rate (e.g., engagement rate by a target entity and/or agent with an asset recommendation or contextualized asset representation) while minimizing hallucination, toxicity, bias, risks, and/or other deficiencies associated with conventional models. In some embodiments, the generative AI circuitry 218 includes hardware, software, firmware, or a combination thereof, for engineering one or more prompts for the dynamic contextualization model(s) configured to guide the dynamic contextualization model(s) to generate the desired output (e.g., tailored/personalized multifactor contextualized asset representations) or optimize the or more configuration parameters.

In some embodiments, the apparatus 200 may include a feedback engine circuitry 214 which may include hardware elements, with or without enabling software elements, firmware elements, or a combination thereof configured to, with the processing circuitry 202, input/output circuitry 208 or communications circuitry 210, perform one or more functions associated with the feedback engine 118 (as described above with reference to FIG. 1). For example, the feedback engine circuitry 214 may access, facilitate access, receive, process, manipulate, provide, or otherwise use, or make available for use, certain data (e.g., entity data, agent data, historical data, asset data, feedback data, training data, predicted assets, multifactor contextualized asset representations, or other data) used by one or more other elements of the apparatus 200 through, for example, the use of hardware, software, applications, or APIs executed using a processor, such as the processor 206. In some embodiments, the contextualization engine circuitry 212 may interact with the memory 204, which may store the aforementioned data. It should also be appreciated that, in some embodiments, the contextualization engine circuitry 212 may include a separate processor, specially configured field programmable gate array (FPGA), or application specific interface circuit (ASIC) to receive such data utilized by the contextualization engine circuitry 212. The contextualization engine circuitry 212 may also provide for communication with other elements of the apparatus 200, system or external systems via a network interface provided by the communications circuitry 210. In some embodiments, one or more portions of the prediction engine circuitry 220 and processing circuitry 202 may be integrated into a single circuitry or group of circuitries, with or without various other circuitries discussed herein, configured to execute the respective functionalities thereof.

In this regard, FIG. 1 shows an example system environment 100 within which at least some embodiments of the present disclosure, including apparatus(es) 200, may operate. The depictions of the example system environment 100 and apparatus 200 are not intended to limit or otherwise confine the embodiments described and contemplated herein to any particular configuration of elements or systems, nor are they intended to exclude any alternative configurations or systems for the set of configurations and systems that can be used in connection with embodiments of the present disclosure. Rather, FIGS. 1-2 and the system environment 100 and apparatus(es) 200 disclosed therein are merely presented to provide an example basis and context for the facilitation of some of the features, aspects, and uses of the methods, apparatuses, computer readable media, and computer program products disclosed and contemplated herein. As noted above, in some embodiments, the predictive computing device 106 may be embodied by one or more apparatuses 200 shown in FIG. 2 or portions thereof relevant to the functions of the respective devices.

Example Data Flows and Data Structures of the Disclosure

Figure 3:
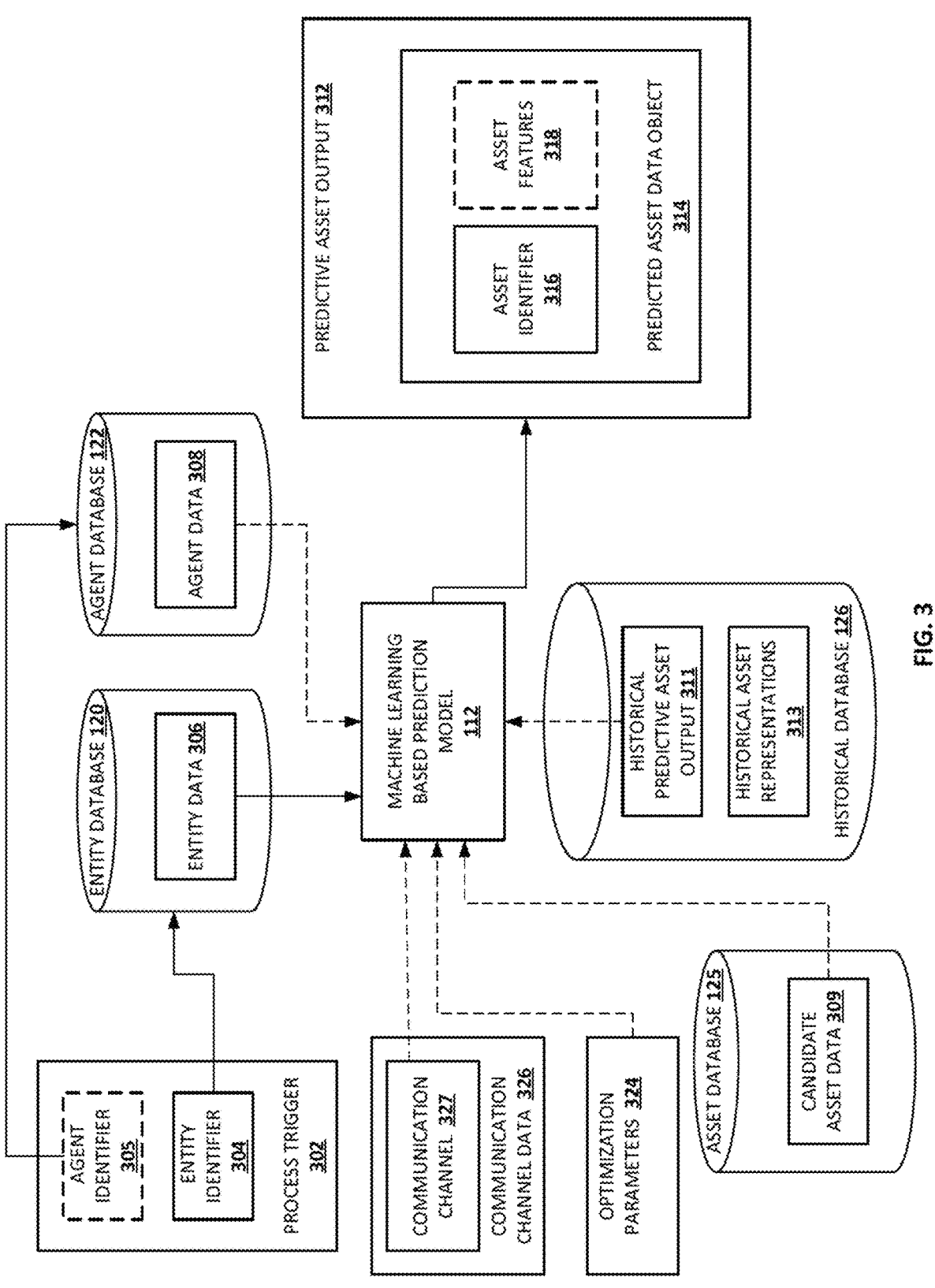
FIG. 3 illustrates an example data flow diagram of a first stage of an example multifactor contextualized prediction process showing example data structures in accordance with at least some embodiments of the present disclosure.

FIG. 3 is an example data flow 300 presented in accordance with one or more embodiments of the present disclosure. In some example embodiments, the data structures and processes shown and described with reference to the data flow diagram of FIG. 3 may be generated, performed, or otherwise facilitated by the various systems and apparatuses shown and described with reference to FIGS. 1-2. Specifically, FIG. 3 represents a first stage of an autonomous multifactor contextualized prediction process in accordance with at least some embodiments of the present disclosure.

In some embodiments, the computing system 101 detects a process trigger 302. The process trigger may be any signal, data, computer readable instructions, messages, occurrences, actions, condition, or request that invokes an autonomous multifactor contextualized prediction process, as described herein. As one non-limiting example, the process trigger 302 may be an API request transmitted from a client computing device to and received by the computing system 101 (e.g., at an API endpoint associated with the computing system 101). Such client computing device may be associated with a user (e.g., target entity or an agent). In this regard, in some embodiments, the operator of an entity client computing device 102 or an agent client computing device 104 may initiate an autonomous multifactor contextualized prediction process configured to generate one or more tailored predictive asset outputs for a target entity at a first stage of the autonomous multifactor contextualized prediction process according to techniques described herein. In this regard, in some embodiments, the predictive asset output may represent an intermediate output of the autonomous multifactor contextualized prediction process.

In some embodiments, the API request (or other forms of process trigger 302) may comprise an entity identifier or one or more datum or indication representative of a request for a multifactor contextualized asset representation for a target entity. For example, in one embodiment where the API request (or other form of process trigger 302) originates from an entity client computing device 102 (e.g., entity component 122 thereof), the API request may comprise at least an entity identifier for the entity associated with the entity client computing device 102. For example, an entity component 122 of the entity client computing device 102 may generate the API request in response to input from a target entity, where the input is representative of a request for a multifactor contextualized asset representation for the target entity. In some examples, the entity component 122 of the entity client computing device 102 may generate the API request in response to certain user interaction (e.g., certain interaction with a mobile application, web application, website, or the like) associated with the computing system 101. Such certain interaction may include, but not limited to, a target entity scrolling through an electronic product catalog associated with an enterprise, browsing a website, or executing a query on a search engine.

In some embodiments, the API request (or other forms of process trigger 302) may additionally comprise an agent identifier or one or more datum or indication representative of a request for a multifactor contextualized asset representation for a target entity. For example, in one embodiment where the API request (or other form of process trigger 302) originates from an agent client computing device 104 (e.g., agent component 124 thereof), the API request may comprise an entity identifier for a target entity and an agent identifier for the agent associated with the agent client computing device 104. For example, an agent component 124 of the agent client computing device 104 may generate the API request in response to input from an agent, where the input is representative of a request for a multifactor contextualized asset representation for the target entity. By way of example, in an example implementation, the agent may provide such input during real-time interaction (e.g., via audio call, video call, email conversation, chat conversation, or the like) with the target entity or at any other time. In some embodiments, where the interaction data includes audio data or video data, the audio data or video data may be converted to a text data. In some embodiments, the API request may comprise the converted text data. For example, in some embodiments, the agent component 124 of the agent client computing device 104 may be leveraged to convert the audio or video data into text data and generate an API request that includes the converted text data.

In some embodiments, the process trigger 302 may be an indication of a recent transaction associated with a target entity. For example, the computing system 101 may detect transactions associated with an entity client computing device 102 (or otherwise with the target entity), and in response to detecting such transactions execute an autonomous multifactor contextualized prediction process, as described herein. By way of example, in an example implementation, the computing system 101 (e.g., predictive computing device 106 thereof) to determine cross-category asset prediction opportunities or complementary or related asset prediction opportunities (e.g., cross-selling opportunities) by detecting or analyzing recent transactions, third-party asset utilization, or the like and executing a multifactor contextualized prediction process based at least in part on the recent transactions (e.g., assets identified in the recent transactions). For example, in response to detecting a transaction by the target entity relating to a first asset category, the computing system 101 may execute an autonomous multifactor contextualized prediction process for the target entity with respect to a second asset category, where the second asset category may be related to the first asset category. As another example, in response to detecting a transaction by the target entity involving a particular agent, the computing system 101 may execute an autonomous multifactor contextualized prediction process for the target entity based at least in part on data (e.g., agent data) associated with the particular agent. In some embodiments, third-party asset utilization may facilitate tailoring of the respective model outputs to tailor the recommendations (e.g., to compare the current third-party asset with the related asset in the multifactor contextualized asset representation).

In some embodiments, in response to detecting the process trigger 302, the computing system 101 may parse the process trigger 302 to identify and extract at least an entity identifier 304. In some embodiments, the computing system 101 leverages the entity identifier 304 to obtain various data, including but not limited to entity data 306, leveraged at one or more steps/operations of the autonomous multifactor contextualized prediction process.

In some embodiments, the entity data 306 comprises a plurality of entity data segments including, but not limited to entity characteristics, operational data, related third-party data, historical transactions data, demographic data, behavioral data, interaction data, or conversion data. In some embodiments, the computing system 101 may generate and apply a query to an entity database 120 or one or more other data sources for the entity data 306. For example, the computing system 101, using one or more data retrieval techniques, may obtain the entity data (e.g., various entity data segments thereof) from one or more data sources including but not limited to, entity database 120 or one or more external data sources.

In some embodiments, the entity data 306 (e.g., various entity data segments thereof) may be previously obtained from one or more external data sources (e.g., via one or more external computing device(s) 108 or other devices/systems) and stored in the entity database 120. In some embodiments, the entity data 306 (or a portion thereof such as one or more segments) may be received in real-time or near real-time relative to execution of the autonomous multifactor contextualized prediction process. For example, in an example implementation, the interaction data (or portion thereof) or other entity data 306 may be received during real-time interaction involving the target entity, such as interaction by the entity client computing device 102 with a mobile application, a web application, an agent client computing device 104, or the predictive computing device 106. In an example, such real-time interaction may include live conversation between the target entity and an agent.

The entity data 306 may be received from the one or more data sources using any of a plurality of techniques. In some embodiments, a portion of the entity data 306 may be obtained from one or more websites via scraping or other data extraction techniques. In some examples, the computing system 101 may receive the entity data 306 (or portion thereof) from one or more external computing devices (such as external computing devices 108) via one or more APIs, webhooks, wired or wireless communication network, or the like. In some examples, the computing system 101 may leverage OCR algorithms, data extraction models, or other techniques to extract the entity data 306 (or portion thereof) from the one or more data sources.

In some embodiments, process trigger 302 may additionally identify an agent. For example, in such some embodiments, the process trigger 302 may comprise an agent identifier 305. In some embodiments, the computing system 101 leverages the agent identifier 305 to obtain certain data that may be utilized at one or more steps/operations of the autonomous multifactor contextualized prediction framework. In some embodiments, such certain data includes, but is not limited to, agent data 308. In some embodiments, the computing system 101 may apply a query (or other data retrieval techniques) to a database such as agent database 123 or one or more other data sources to extract the agent data 308. In some embodiments, the agent data 308 may be previously obtained from one or more external data sources and stored in the agent database 123. In some embodiments, the agent data 308 (or a portion thereof) may be received in real-time or near real-time relative to execution of the multifactor contextualized prediction process.

In some embodiments, the computing system 101 generates, using one or more prediction models 112, a predictive asset output 312 based on input data comprising at least entity data 306 associated with the target entity. For example, the computing system 101 may input the input data to one or more prediction models 112 trained or configured to analyze the input data to generate one or more predictive asset outputs.

In some embodiments, the input data to the one or more prediction models 112 may comprise the entity data 306 (or portion thereof) and at least one or more other data. In some embodiments, such other data may comprise asset data for one or more candidate assets. Alternatively, or additionally, in some embodiments, such other data may comprise agent data 308 for one or more agents. Alternatively, or additionally, in some embodiments, such other data may comprise historical predictive asset outputs 311. For example, historical predictive asset outputs 311, historical asset representations 313, or both may be stored for future querying and retrieval, such as to create a "playbook" by which future users may research predictive assets without running new modeling processes (e.g., either for a returning target entity or for a new target entity, such as one sharing common attributes with a former target entity) or new modeling processes may be trained or otherwise seeded with historical predictive assets. Alternatively, or additionally, in some embodiments, such other data may comprise one or more optimization parameters 324 (e.g., target conversion rate, or other parameters). For example, in some embodiment, the output of a prediction model 112 and/or output of dynamic contextualization model 116 (described further below) may be configured to maximize one or more goals and user experience based on one or more metrics. In some embodiments, the one or more metrics may include, but not limited to, conversation rates (e.g., final conversion rates); engagement rates associated with internal and/or external users, including entity users or agent users; time spent (e.g., by an agent with respect to a relevant task to be facilitated using the output of the prediction model 112 and/or output of dynamic contextualization model 116 such as, for example, a sales task) which may be fed back into the system to optimize the outcomes/outputs (e.g., so as to maximize the one or more goals and user experience). Alternatively, or additionally, in some embodiments, such other data may comprise communication channel data 326 (e.g., selected communication channel 327 for transmitting the final output of the multifactor contextualized prediction process to a client computing device). Alternatively, or additionally, in some embodiments, such other data may comprise an asset identifier or asset category identifier associated with a recent transaction. Alternatively, or additionally, in some embodiments, such other data may comprise one or more relevant asset categories and/or sub-asset categories for the target entity. In some embodiments, the computing system 101 may leverage the entity data 306 (or portion thereof) to determine the other data (or portion thereof). For example, in some embodiments, the computing system 101 may be configured to leverage a portion of the entity data comprising one or more characteristics associated with the target entity to generate to determine the one or more relevant asset categories and/or sub-asset categories for the target entity. In this regard, in some embodiments, the computing system 101 may be configured to input to one or more prediction models input data comprising one or more of entity data 306, agent data 308 for one or more agents, candidate asset data 309 for one or more candidate assets, historical predictive asset outputs 311, optimization parameters 324, or communication channel data 326 (e.g., selected communication channel 327), where the one or more prediction models 112 are configured to analyze the input data to generate one or more predictive asset outputs 312.

As further described herein, in some embodiments, the communication channel data 326 or some of the above-mentioned data may not be input to the prediction model 112 or leveraged by the one or more prediction models 112 at the first stage of the autonomous multifactor contextualized prediction process to generate the one or more predictive asset outputs 312. For example, in some embodiments, the communication channel data 326 may comprise a portion of the output of the first stage of the autonomous multifactor contextualized prediction process. For example, in some embodiments, the computing system 101 may determine the communication channel for transmitting the final output of the autonomous multifactor contextualized prediction process to a client computing device at the first stage of the autonomous multifactor contextualized prediction process using the one or more prediction models 112.

In some embodiments, the computing system 101 may input the entity data 306 to a prediction model 112 via an API associated with the prediction model or via other techniques. For example, in such some embodiments, the prediction engine 110 may autonomously generate an API request comprising the input data and transmit the API request to an API associated with the prediction model 112. In some examples, the computing system 101 (e.g., using the prediction engine 110 thereof) may format the API request according to a predefined schema, using, for example, a standard data interchange format such as JSON, XML, or the like.

In some examples, a prediction model 112 may comprise one or more algorithms such as but not limited to decision tree machine learning algorithms or deep learning neural network algorithms. For example, in some embodiments, a prediction model may comprise a decision tree machine learning model, a deep learning neural network machine learning model, or other types of machine learning models. In some examples, a prediction model 112 may comprise a generative AI model (e.g., a first generative AI model configured to feed into the dynamic contextualization model in some embodiments).

In some embodiments, a predictive asset output 312 comprises data representative of one or more assets selected from one or more candidate assets. For example, the one or more machine learning models may be configured to analyze the input data with respect to a prediction space that comprises the one or more candidate assets to generate the one or more predictive asset outputs 312. In some embodiments, a predictive asset output 312 may comprise one or more predicted assets represented by one or more predicted asset data objects 314. In some embodiments, a predicted asset data objects 314 may comprise an asset identifier 316 for a predicted asset (e.g., a recommended asset) from the one or more candidate assets.

Additionally, in some embodiments, the predictive asset output 312 may comprise other data about the selected asset including but not limited to one or more asset features 318 associated with the selected asset. In some examples, the predicted asset data object 314 may comprise the one or more asset features 318. In some examples, the one or more features may be separate from the predicted asset data object 314. In some embodiments, the predictive asset output 312 may not include the one or more asset features 318.

Alternatively, or additionally, in some embodiments, the predictive asset output 312 may identify a selected communication channel (e.g., mobile interface, web interface, email, chat, audio, or the like) for transmitting the final output of the multifactor contextualized prediction process to a client computing device. For example, the predictive asset output 312 may comprise one or more datum representative of the selected communication channel. In such some embodiments, a prediction model 112 may be trained or configured to analyze the input data (or portion thereof) to determine an optimal communication channel from one or more candidate communication channels for transmitting the final output of the autonomous multifactor contextualized prediction process to a client computing device.

Alternatively, or additionally, in some embodiments, the predictive asset output 312 may identify a selected agent from one or more candidate agents. For example, in some embodiments, the predictive asset output 312 may comprise an agent identifier associated with a selected agent. In such some embodiments, a prediction model 112 may be trained or configured to analyze the input data (or portion thereof) to determine an optimal agent from one or more candidate agents to associate with the target entity or the output(s) of the autonomous multifactor contextualized prediction process. By way of example, in one example implementation a prediction model may be trained or configured to analyze the input data to select an agent from one or more candidate agents to deliver the final output of the autonomous multifactor contextualized prediction process to the target entity.

Figure 4:
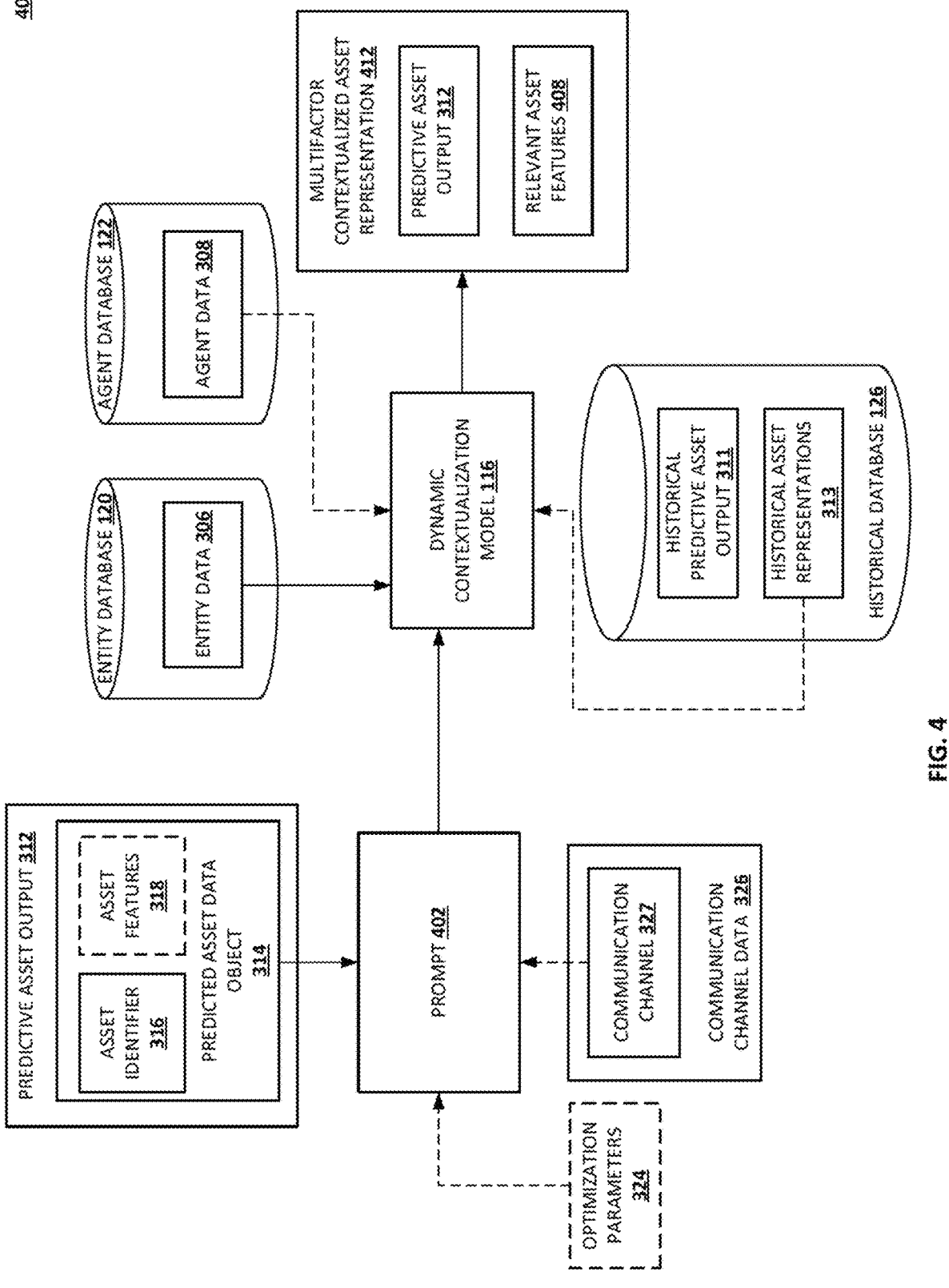
FIG. 4 illustrates an example data flow diagram of a second stage of an example multifactor contextualized prediction process showing example data structures in accordance with at least some embodiments of the present disclosure.

FIG. 4 is an example data flow 400 presented in accordance with one or more embodiments of the present disclosure. In some example embodiments, the data structures and processes shown and described with reference to the data flow diagram of FIG. 4 may be generated, performed, or otherwise facilitated by the various systems and apparatuses shown and described with reference to FIGS. 1-2. Specifically, FIG. 4 represents a second stage of the multifactor contextualized prediction process in accordance with at least some embodiments of the present disclosure. In some embodiments, the second stage of the multifactor contextualized prediction process is configured to generate a final output (e.g., multifactor contextualized asset representation 412) for the target entity.

In various embodiments, the first stage and the second stage of the multifactor contextualized prediction process are integrated stages such that that the output of the first stage is autonomously fed into the second stage of the multifactor contextualized prediction process. For example, the first stage and the second stage may be connected stages, wherein the autonomous multifactor contextualized prediction process may be executed autonomously in response to the process trigger 302. In some embodiments, the second stage autonomous multifactor contextualized prediction process may comprise generating a multifactor contextualized asset representation that is tailored to at least the target entity, and transmitting the multifactor contextualized asset representation 412 to one or more computing devices via one or more selected communication channels. For example, the multifactor contextualized asset representation output may be optimized for the target entity.

In some embodiments, the second stage of the autonomous multifactor contextualized prediction process may comprise generating a multifactor contextualized asset representation 412 that is tailored not only to the target entity but also to an agent associated with the target entity. For example, the second stage of the autonomous multifactor contextualized prediction process may be designed to generate multifactor contextualized asset representation 412 of the predictive asset output (e.g., intermediate output of the first stage of the autonomous multifactor contextualized prediction process) that is tailored to both the target entity and an agent. For example, in some embodiments, the multifactor contextualized asset representation 412 may be tailored to the target entity based at least in part on the entity data 306 associated with the target entity and tailored to the agent based at least in part on the agent data 308 (e.g., agent's performance metrics, agent's configuration data, or other agent data) for the agent associated with the target entity or the particular instance of multifactor contextualized prediction process. By way of example, in one example implementation, the multifactor contextualized asset representation 412 may be tailored to a customer of an enterprise based on the customer data (e.g., where the entity data comprise customer data) and tailored to an agent of the enterprise based on the agent's strengths or weaknesses, the agent's historical performance data, or other data associated with the agent. As further described below, in some embodiments, the second stage of the autonomous multifactor contextualized prediction process may be designed to generate multifactor contextualized asset representation 412 that is tailored to the target entity or agent and that is optimized for the selected communication channel or optimized based on one or more optimization parameters.

As described above, in some embodiments, the contextualization engine 114 of the predictive computing device 106 receives the predictive asset output 312 from the prediction engine 110 of the predictive computing device 106, and generates one or more prompts 402 for one or more dynamic contextualization models 116. For example, the prediction model 112 and the dynamic contextualization model 116 may be connected models, wherein the predictive asset output 312 is autonomously input to a dynamic contextualization model 116 via a prompt. In some examples, the computing system 101 may perform one or more of data extraction, preprocessing (e.g., data cleaning, feature engineering, or dimensionality reduction), or data transformation on the predictive asset output 312 prior to generating the prompt 402 or otherwise in order to generate the prompt 402.

In some embodiments, the prompt 402 comprises prompt instructions configured to guide a dynamic contextualization model 116 to generate a tailored multifactor contextualized asset representation (as described above) of the predictive asset output 312 based on input data comprising at least the entity data 306 (or portion thereof) associated with the target entity. In some embodiments, the entity data (or portion thereof) analyzed by a prediction model 112 at the first stage of the autonomous multifactor contextualized prediction process may comprises a first set of entity data segments from the plurality of entity data segments of the entity data and the entity data (or portion thereof) analyzed by a dynamic contextualization model 116 to generate the multifactor contextualized asset representation 412 at the second stage of the autonomous multifactor contextualized prediction framework may comprise a second set of entity data segments from the plurality of entity data segments. In some embodiments, the first set of entity data segments and the second set of entity data segments may be the same. In some embodiments, the first set of entity data segments and the second set of entity data segments may be different. For example, in such some embodiments, the first set of entity data segments may comprise at least one entity data segment that is different from the second set of entity data segments.

In some embodiments, the input data may comprise other data in addition to the entity data. Such other data may comprise one or more of the predictive asset output 312, asset features 318, agent data 308, historical multifactor contextualized asset representations 313, selected communication channel data 326 (e.g., communication channel 327), or optimization parameters 324. In some embodiments, the prompt 402 may comprise at least a portion of the input data. For example, in some embodiments, the prompt 402 may comprise communication channel data 326 (e.g., selected communication channel) or one or more optimization parameters 324. It will be appreciated that the prompt may comprise more or less of the various portions of the input data. Alternatively, or additionally, at least a portion of the input data may be provided as a separate input to the dynamic contextualization model 116. For example, the prompt 402 may comprise instructions that directs or guides the dynamic contextualization model 116 to leverage the input data to generate the multifactor contextualized asset representation 412. In this regard, in some embodiments, the dynamic contextualization model 116 analyzes the input data and generates a multifactor contextualized asset representation 412 in accordance with the prompt 402.

In some embodiments, the multifactor contextualized asset representation 412 comprises text representative of the predictive asset output (e.g., one or more recommended assets identified in the predictive asset output) and text representative of one or more contextually relevant asset features 408 associated with the predictive asset output 312 (e.g., one or more assets thereof). In some embodiments, a dynamic contextualization model 116 may be configured to predict the one or more contextually relevant asset features 408 associated with the predictive asset output and modify, augment, or transform the predictive asset output 312 to include the one or more contextually relevant asset features 408. For example, the multifactor contextualized asset representation 412 may comprise syntactically and semantically accurate natural language text that integrates one or more datum representative of the recommended asset(s) identified in the predictive asset output 312 with one or more datum representative of the contextually relevant assets features 408 associated with the predictive asset output 312. By way of example, in an example implementation, the multifactor contextualized asset representation 412 may correspond to a sales pitch for a recommended asset for a customer that includes one or more contextually relevant features (e.g., representing selling points) of the recommended asset. In some embodiments, a dynamic contextualization model 116 may be configured to select the one or more contextually relevant assets from a prediction space comprising candidate asset features 318 for the asset. In some embodiments, the input data or prompt 402 for the dynamic contextualization model 116 may comprise the candidate asset features 318. In some embodiments, the prompt instructions may direct the dynamic contextualization model 116 to a database or other data source to obtain the candidate asset features 318. In some embodiments, the predictive asset output 312 may include one or more supplemental assets and/or asset features which may be grouped with the predicted asset (e.g., as part of the predicted asset data object 314 or as an associated data object transmitted from the prediction model 112 with the predicted asset data object). In some embodiments, the supplemental assets and/or asset features may be retrieved (e.g., from a repository) downstream of the prediction model 112. In each embodiment, the dynamic contextualization model 116 may be configured to describe the supplemental assets and/or asset features (e.g., one or more layers of add on services and/or configurations) as part of or associated with (e.g., concurrently with) the multifactor contextualized asset representation 412.

In some embodiments, a dynamic contextualization model 116 may be configured to generate the multifactor contextualized asset representation 412 using RAG techniques or other techniques designed at least in part to reduce or eliminate hallucination by the dynamic contextualization model 116. For example, the prompt 402 may be configured to direct the dynamic contextualization model 116 to one or more databases or knowledge sources to retrieve data/information that may be leveraged by the dynamic contextualization model 116 to improve the accuracy of the multifactor contextualized asset representation 412 generated by the dynamic contextualization model 116. In some embodiments, the dynamic contextualization model 116 may be configured to analyze and modify the retrieved data to generate desired multifactor contextualized asset representation 412 for the particular use case. In some examples, the prompt 402 may be engineered to include instructions that directs the dynamic contextualization model 116 to a historical database 126 to retrieve and leverage historical multifactor contextualized asset representations 313 stored in the historical database 126 in generating the multifactor contextualized asset representation 412. In some examples, the historical database 126 may store the historical multifactor contextualized asset representations along with the historical input data or other data used in generating the historical multifactor contextualized asset representations. Alternatively, or additionally, the prompt 402 may be engineered to include instructions that directs the dynamic contextualization model 116 to external data sources to retrieve other data that may serve as context for the dynamic contextualization model 116.

Alternatively, or additionally, in some embodiments, the prompt 402 may comprise one or more prompt examples configured to provide context for the dynamic contextualization model. In some embodiments, the prompt 402 may be generated using a prompt template that has been previously evaluated (or otherwise tested) and determined to satisfy a prompt reliability threshold. For example, the prompt may be generated in accordance with a prompt template associated with a prompt reliability score that satisfies a prompt reliability threshold. In some embodiments, the prompt template comprises one or more dynamic components to facilitate tailored output. Non-limiting examples of such dynamic components include entity data, agent data, context, or the like.

As described above, in some embodiments, a dynamic contextualization model 116 may be configured to output a multifactor contextualized asset representation 412 based on the communication channel 327 (e.g., mobile interfaces, web interfaces, voice communication, or the like) selected for transmitting or otherwise presenting the multifactor contextualized asset representation 412 to a client computing device or otherwise to a user. For example, the computing system 101, using one or more dynamic contextualization models 116 may optimize the multifactor contextualized asset representation 412 for the particular selected communication channel 327. In particular, in some embodiments, the computing system 101 may be configured to optimize the multifactor contextualized asset representation 412 for the particular physical device (e.g., particular client computing device) and graphical user interface. For example, in some embodiments, the dynamic contextualization model 116 may be designed to configure the multifactor contextualized asset representation 412 based on the selected communication channel 327 such that the multifactor contextualized asset representation 412 may be presented to a user (e.g., entity, agent, or the like) via the communication channel and physical device in a user friendly manner.

In this regard, the autonomous multifactor contextualized prediction process may be configured to dynamically adapt the multifactor contextualized asset representation 412 output to an interface based on the configuration of the interface (e.g., size, or another configuration). For example, a dynamic contextualization model 116 may be trained, configured, or directed (e.g., via prompt 402) to adjust the content length, token length, font size, or other configuration parameters associated with a multifactor contextualized asset representation 412 output by dynamic contextualization model 116 based on the configuration of the selected communication channel 327. For example, the dynamic contextualization model may be trained, configured, or directed (e.g., via prompt 402) to configure the content length for a multifactor contextualized asset representation 412 for a mobile interface, such a smart phone interface, to be shorter relative to the content length for a multifactor contextualized asset representation 412 for a desktop interface. As another example, the dynamic contextualization model 116 may be trained, configured, or directed (e.g., via prompt 402) to configure the multifactor contextualized asset representation 412 for transmission via voice-based communication channels to be more colloquial relative to multifactor contextualized asset representations 412 for text-based communication channels.

In this regard, such optimization as described above may improve the efficacy of the multifactor contextualized asset representation 412 output and allow for scalability and tailored recommendations across various types of communication channels 327. By way of example, an example prompt 402 may include prompt instructions that includes "select 1-3 contextually relevant asset features based on the entity data and the candidate features and draft (a) 10 words or less about each feature if the selected communication channel is a mobile interface or (b) a one paragraph, friendly summary of each feature from the perspective of a [agent] talking to a [target entity]" if the selected communication channel is voice communication."

In some embodiments, computing system 101 may leverage different dynamic contextualization models 116 for different communication channels. For example, the computing system 101 (e.g., contextualization engine 114 thereof) may be configured to select a dynamic contextualization model 116 for generating a multifactor contextualized asset representation 412 from a plurality of dynamic contextualization models 116 based on the selected communication channel 327. For example, a given dynamic contextualization model 116 may be configured for a particular communication channel. In some embodiments, one or more additional pre- or post-processing steps may be added upstream or downstream of the respective models without departing from the present disclosure. For example, the contextualized prediction system may be configured to test multifactor contextualized asset representations for hallucinations, compliance, or the like prior to presenting the representation to a user.

In some embodiments, such as where the prompt 402 comprises the input data (or significant portion thereof), the input data may be parsed into separate inputs (e.g., tokens or chunks of discrete strings) according to different techniques or logic prior to being input to a dynamic contextualization model 116. For example, in some embodiments, the computing system 101 may segment the input data into a plurality of smaller inputs and generate a plurality of prompt slices each comprising a segment (e.g., smaller input). In some embodiments, the computing system may leverage one or more algorithms to generate the prompt slices. Alternatively, in some embodiments all of the input data may be provided to a dynamic contextualization model 116 as a single input. For example, in such some embodiments, the computing system 101 may generate a single prompt that comprises all the input data.

Figure 5A:
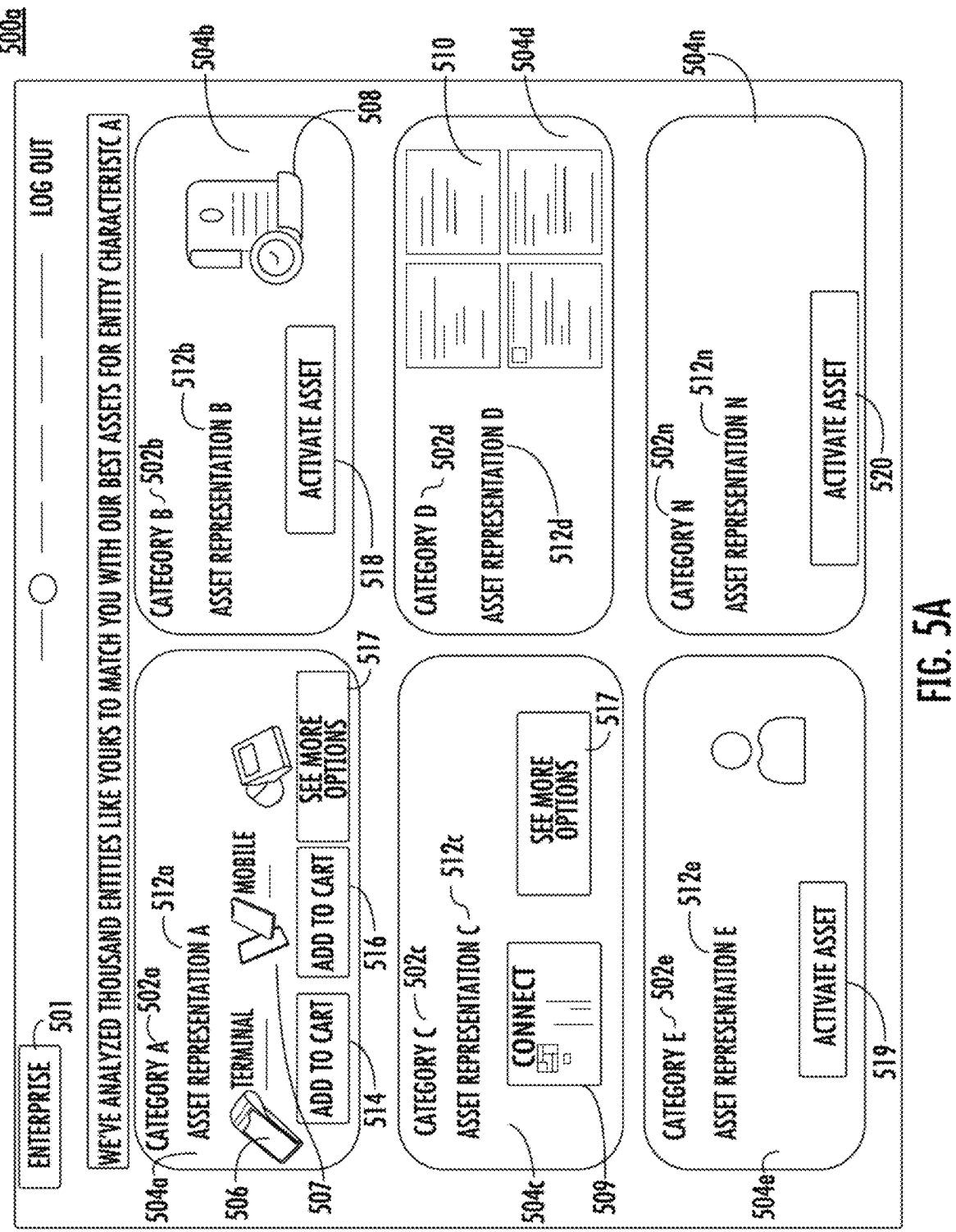
FIG. 5A illustrates an example graphical user interface in accordance with at least some embodiments of the present disclosure.
Figure 5B:
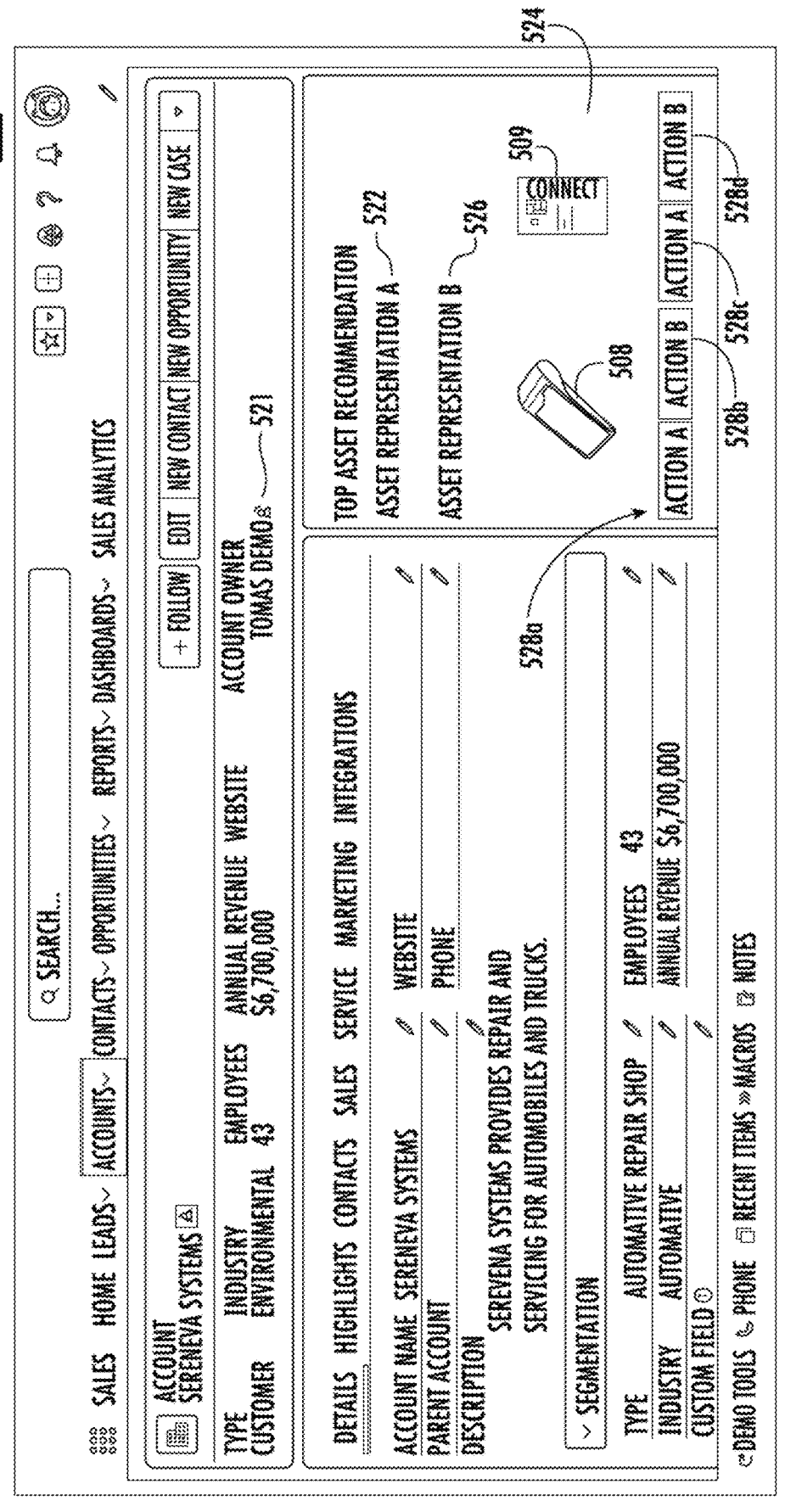
FIG. 5B illustrates another example graphical user interface in accordance with at least some embodiments of the present disclosure.
Figure 5C:
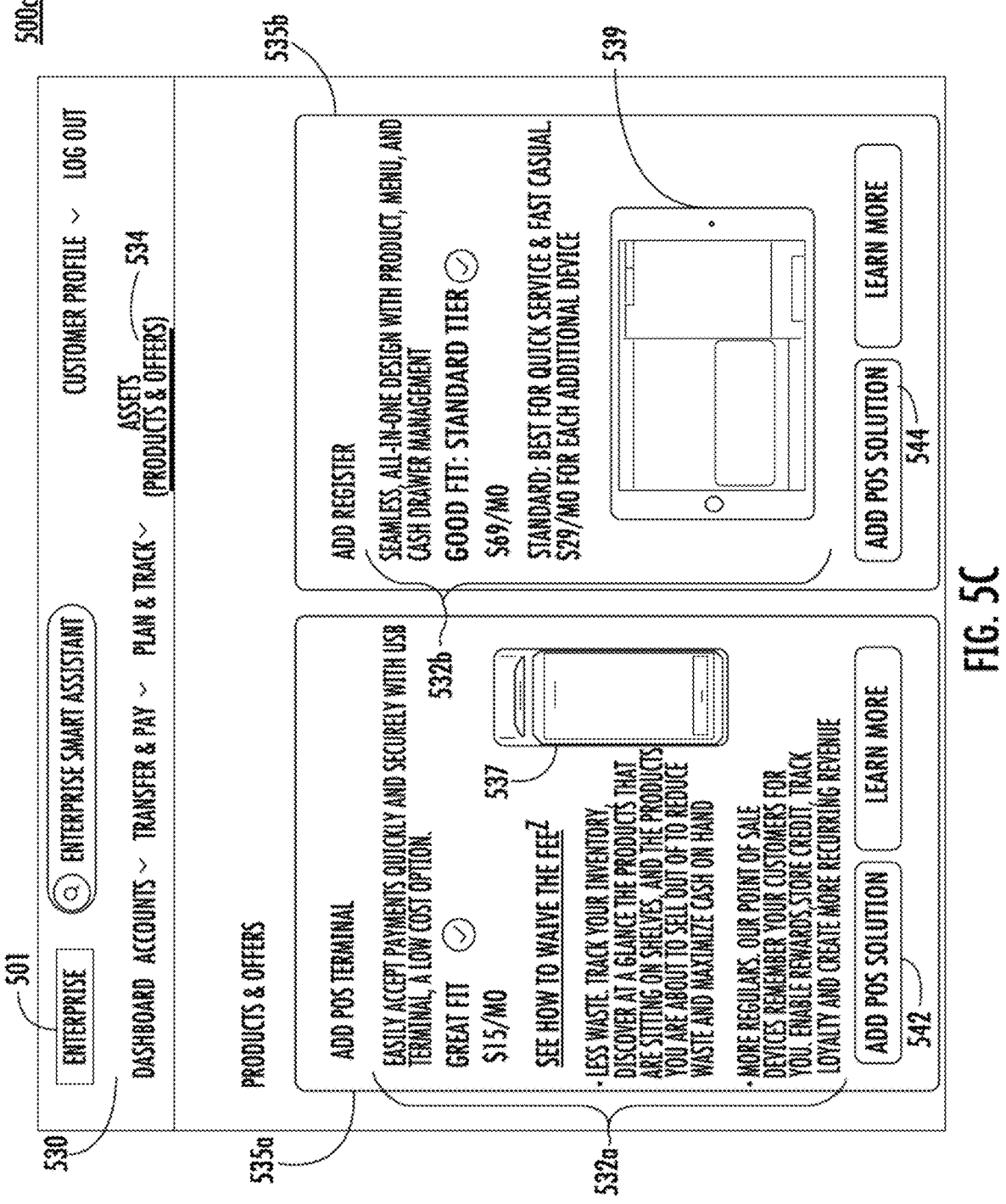
FIG. 5C illustrates another example graphical user interface in accordance with at least some embodiments of the present disclosure.
Figures 5D, 5E, 5F:
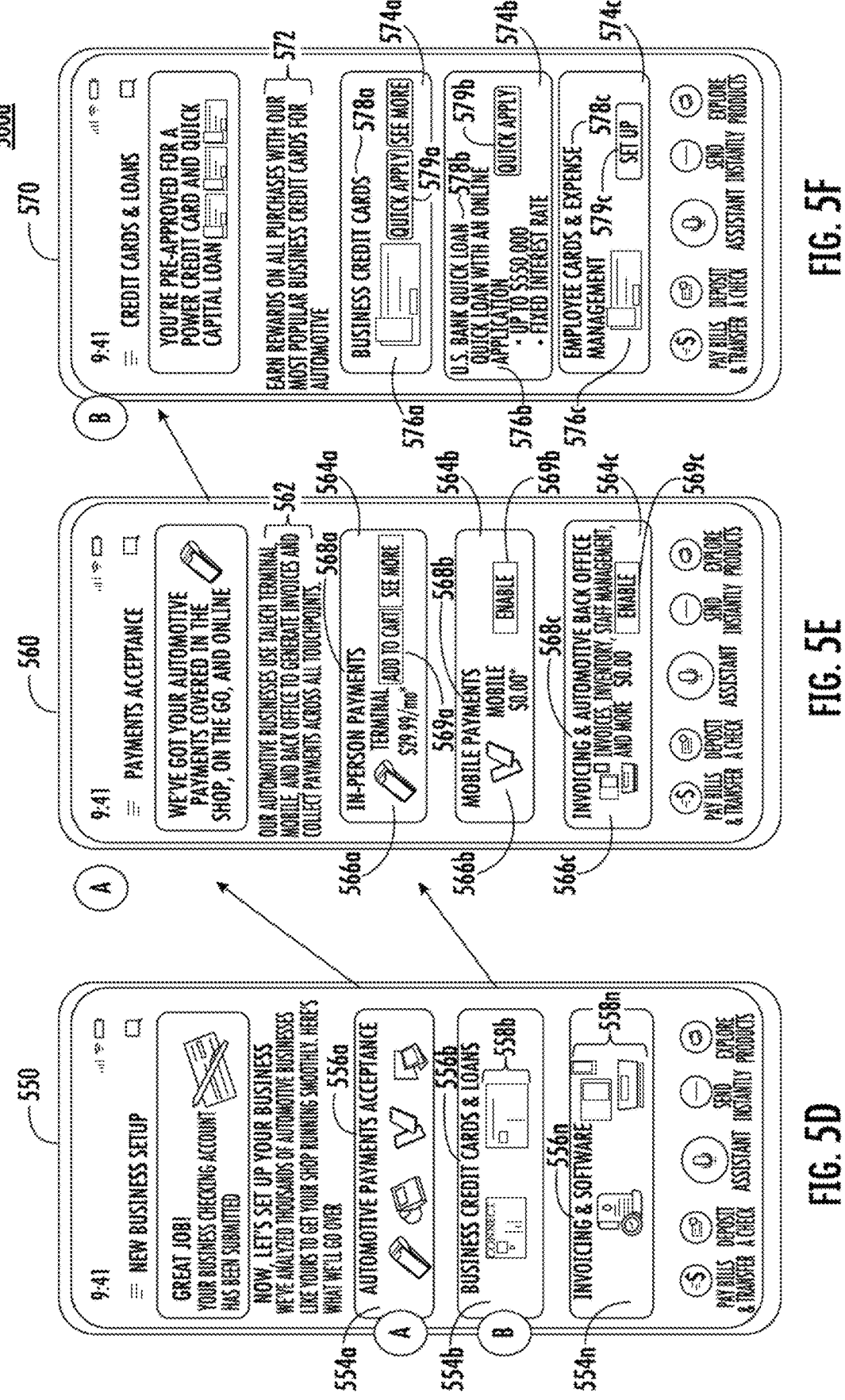
FIGS. 5D-5F illustrate another example graphical user interface in accordance with at least some embodiments of the present disclosure.
Figure 5G:
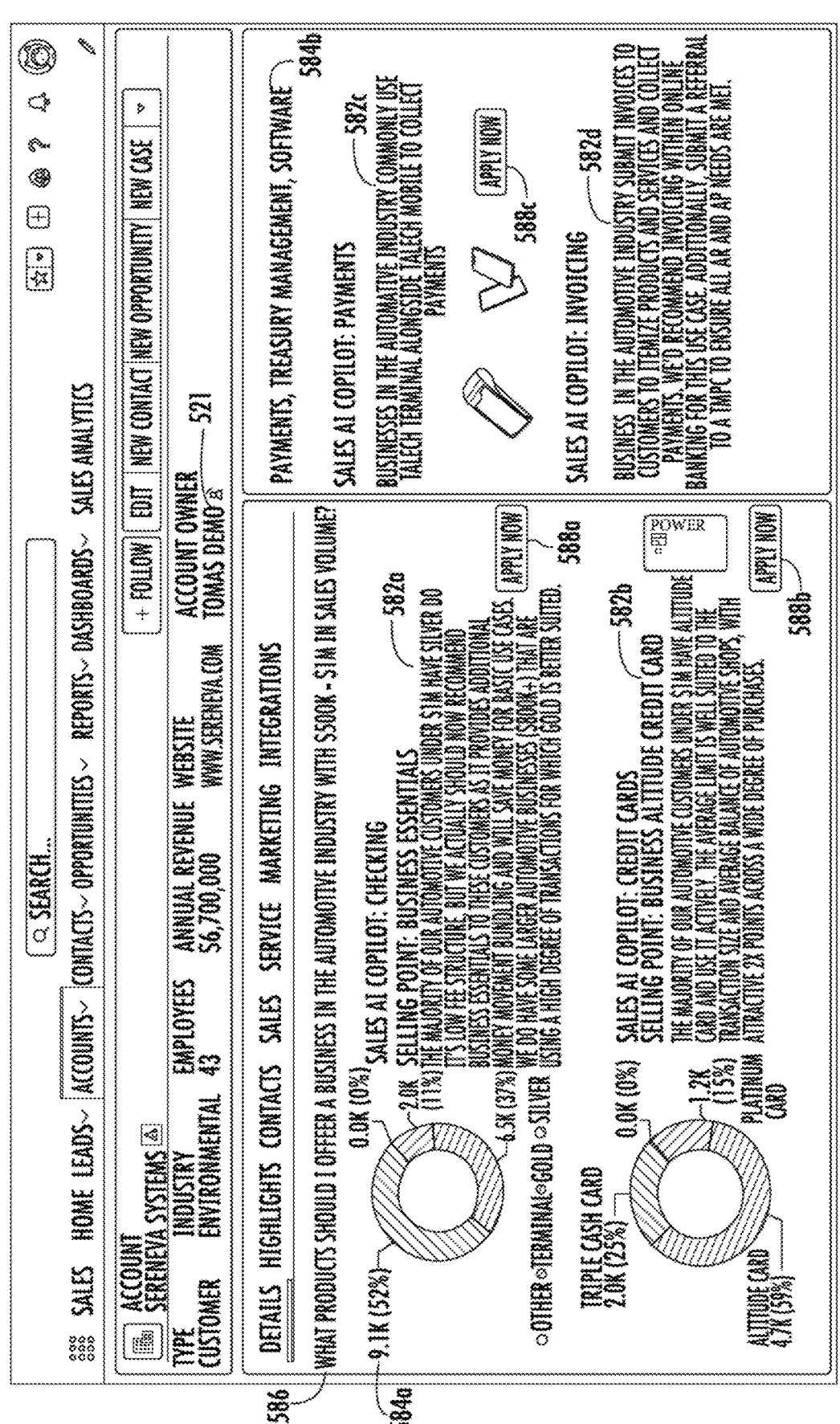
FIG. 5G illustrates another example graphical user interface in accordance with at least some embodiments of the present disclosure.

FIGS. 5A-5G illustrate example graphical user interfaces associated with the systems described herein. Each graphical user interface may include a physical layout and one or more multifactor contextualized asset representations. In some embodiments, either or both of the physical layout and one or more multifactor contextualized asset representations may be determined based on the particular interface or user device associated with the interface. In some embodiments, at least a portion of the physical layout, scale, and other physical attributes of the interface associated with the multifactor contextualized asset representation may be generated by one or more AI models (e.g., the same dynamic contextualization model as the asset representation text or an additional model). For example, in some embodiments, the physical appearance (e.g., layout, scale, and other physical attributes) of the multifactor contextualized asset representation or interface may be configured to ensure the most relevant asset features (including benefits) are highlighted. For example, asset features having a highest relevance score to the entity or agent may be presented on the interface at a highest position (e.g., a top position, a top left position, or the like). This, in turn, provides for fluid and natural real-time interactions/conversations, while also providing for details to be viewed. In some embodiments, a more concise/pithy multi-factor contextualized asset representation may be generated for mobile devices while a more detailed multi-factor contextualized asset representation may be generated for devices with larger displays (e.g., graphical user interfaces or physical screens) relative to mobile devices. In some embodiments, the multifactor contextualized asset representation may be configured for integration with a voice assistant system or otherwise utilized in connection with a voice assistant system, such that the multifactor contextualized asset representation may be understood or spoken by the voice assistant system. In this regard, in some embodiments, the system may be configured to generate multifactor contextualized asset representations that may be used by a user via a voice assistant system. Moreover, in some embodiments, one or more inputs may be received via voice assistant (e.g., prompts from an agent or entity to generate or modify a multifactor contextualized asset representation), which voice inputs may be transformed to text (e.g., via voice-to-text algorithm) and input into the foregoing modeling framework. In some embodiments, at least a portion of the physical layout, scale, and other physical attributes of the interface associated with the multifactor contextualized asset representation may be predetermined (e.g., such that the asset representation is generated based on a predetermined interface configuration) or generated based on one or more non-AI rules engines. In various embodiments, two or more of the depicted interfaces may be concurrently, sequentially, or asynchronously generated as part of the same transaction or series of transactions. For example, an agent-facing interface (e.g., as shown in FIGS. 5B, 5G), target-entity facing interface (e.g., as shown in FIGS. 5D-5F), or other combinations of interfaces may be displayed to multiple users in relation to the same target entity. For example, a support call session may include displaying asset representations to both the target entity and agent via their respective client computing device interfaces.

FIG. 5A is an example graphical user interface 500a in accordance with at least some example embodiments of the present disclosure. The graphical user interface 500a may be, for example, a graphical user interface of an application (e.g., mobile application, web application, or the like) associated with an enterprise 501, such as a bank, and accessible via a client computing device including, but not limited to an entity client computing device 102 or an agent client computing device 104. The graphical user interface 500a may be configured to display a visualization of one or more predicted assets (e.g., output at a first stage of an autonomous multifactor contextualized prediction process, as described herein) such as predicted assets 506-510 (e.g., graphical asset representations in the depicted embodiment, such as an image of the asset associated with the asset identifier) and/or one or more asset representations 512a-n (e.g., multifactor contextualized asset representations output at a second stage of the autonomous multifactor contextualized prediction process) for a target entity. In the illustrated example of FIG. 5A, the target entity may be an automotive entity or otherwise associated with an automative entity category. In the depicted interface, the asset representations may be generated and presented according to the processes described herein.

The example graphical user interface 500a may include one or more interface components 504a-n, which may be embodied as sub-user interfaces, widgets, tiles, a combination thereof, or the like (e.g., boxes, bubbles, or other regions of the interface in which various asset related interface icons and representations are presented). Each of the interface components 504a-n may be associated with a particular asset or asset category of one or more asset categories 502a-n (e.g., Categories A-N in the depicted embodiment, which represent categories of predictions generated by the machine learning based prediction model) and may be configured to display a representation of one or more predicted assets (e.g., predictions generated by the machine learning based prediction model) within the particular asset category, may display corresponding asset representation from the one or more asset representations 512a-n for the target entity, or both. The asset representations 512a-n, as shown, may be representations generated by a dynamic contextualization module (e.g., descriptions of features of an asset within the identified category tailored to the target entity, agent, or both). For example, the asset representations 512a-n may include phrases or sentences related to the predicted asset presented in the interface component. By way of non-limiting examples, which may be used in any combination or arrangement or individually: a first interface component 504a may be associated with a payments asset category 502a and may describe the predicted assets 506, 507 with the asset representation 512a (e.g., "We've got your in-person payments covered in the shop and on the go with talech terminal and mobile"); a second interface component 504b may be associated with an invoicing asset category 502b and may describe the predicted assets 508 with the asset representation 512b (e.g., "Thousands of automotive entities use talech to create, send and manage invoices for free"); a third interface component 504c may be associated with a credit card asset category 502c and may describe the predicted assets 509 with the asset representation 512c (e.g., "Earn points on all your inventory and supply purchases with connect business card"); a fourth interface component 504d may be associated with a loans asset category 502d and may describe the predicted assets 510 with the asset representation 512d (e.g., "Explore your loan options to expand your business"); a fifth interface component 504e may be associated with an automotive software asset category 502e and may describe the predicted assets with the asset representation 512e (e.g., "Our automotive customers use talech for business to manage staff payroll, inventory and more for free!"); or an nth interface component 504n may be associated with an entity copilot automotive AI asset category 502n and may describe the predicted assets with the asset representation 512n (e.g., "Use AI to analyze revenue, expenses, staffing models, marketing strategies and more, a customer AI agent developed for automotive entities"). In the depicted embodiment, the contextualized prediction process may be used, for example, to predict a list of the top categories (e.g., six categories in the depicted image) most relevant to the target entity via substantially the same process as the asset representation generation. For example, the interface may be organized from most relevant to least relevant, such as top left to bottom right. In some embodiments, the components 504a-n may comprise the topmost relevant predicted assets regardless of category or features (e.g., sub-assets or attributes) of a particular asset.

As described above with reference to FIGS. 1-4, the predicted assets and/or the multifactor contextualized asset representations 512a-n may be tuned, or otherwise optimized, for the graphical user interface 500a. For example, visualization of the asset representations 512a-n may be tuned, or otherwise optimized, for the graphical user interface 500a (e.g., spatially, textually, or otherwise optimized), the individual interface components 504a-n, or both. By way of example, the asset representations 512a-n may be tuned, or otherwise optimized, for the size, layout, and/or other features/parameters of the example graphical user interface 500a. The asset representations 512a-n may additionally or alternatively be tuned for the size, layout, or other features or parameters of the individual interface components 504a-n.

As shown in FIG. 5A, an asset representation displayed in the example graphical user interface 500a may include text that describes one or more asset features associated with at least one predicted asset (e.g., asset recommendation), text that describes the predicted asset, or both. The features may be identified and selected using a similar predictive model analysis process or another selection process (e.g., hard coding, rules based engine, etc.). For example, in the illustrated example of FIG. 5A, an interface component 504a may display an asset representation corresponding to a talech terminal asset and a talech mobile asset predicted for the target entity for Category A 502a (e.g., any determined category, such as a payments asset category). As another example, and as shown in the illustrated example of FIG. 5A, an interface component 504c may display an asset representation corresponding to a Connect Business Credit Card asset predicted for the target entity for Category C (e.g., any determined category, such as a credit cards asset category).

In some examples, a visualization of a predicted asset may be shown in addition to the illustrated text based description as part of the multifactor contextualized asset representation. For example, in the illustrated example of FIG. 5A, an interface component 504a may include an image of the talech terminal asset predicted for the target entity and an image of the talech mobile asset predicted for the target entity. As another example, and as shown in the illustrated example of FIG. 5A, an interface component 504c may include an image of the Connect Business Credit Card asset predicted for the target entity. In some examples, the image(s) of the predicted asset may be part of the output of the autonomous multifactor contextualized prediction process at the first stage and/or the second stage of the autonomous multifactor contextualized prediction process. The image(s) may be generated using generative AI (e.g., via the dynamic contextualization model) or retrieved, in whole or in part, from memory. For example, the predicted asset output at the first stage of the autonomous multifactor contextualized prediction process may include an image of a predicted asset or instructions or other information (e.g., an asset identifier) configured to cause the system to retrieve an image of the predicted asset. Alternatively, or additionally, the asset representation output at the second stage of the autonomous multifactor contextualized prediction process may include an image of the predicted asset. In embodiments in which the image is created by generative AI, the prompt engineering process between the prediction model and the dynamic contextualization model may be configured to prompt one or more generative AI models within the dynamic contextualization model to create the image(s).

The graphical user interface 500a may comprise one or more selectable transaction interface elements, such as transaction interface elements 514-520. Such transaction interface elements may be configured to facilitate a transaction associated with a displayed asset representation, to activate a predicted asset (e.g., such that the target entity may have access to the asset or begin to utilize the asset), or otherwise facilitate management of the target entity's access to, use of, or other relationship with such assets (e.g., a combined management and contextualized prediction interface). In the illustrated example graphical user interface 500a, a given transaction interface element may be associated with a particular predicted asset or feature thereof. The transaction interface element (e.g., elements 514, 516, 518, 519, 520) may be positioned within a particular interface component 504a-n, for example, to trigger the system or a transmission to a second system to cause activation of the corresponding asset or otherwise providing or programmatically associating the asset with the entity. In some embodiments, additional interface elements may be provided (e.g., an additional options interface element 517 to present additional selectable elements or explanation to the user). It would be appreciated that the transaction interface element(s) may be positioned in one or more other locations within the graphical user interface 500a, including outside the depicted components, within sub-menus, on additional pages of the interface, or the like. The various example elements and representations described above are for context and illustration of the underlying technical improvements described herein.

FIG. 5B is an example graphical user interface 500b in accordance with at least some example embodiments of the present disclosure. The graphical user interface 500b may be, for example, a graphical user interface of an application (e.g., mobile application, web application, or the like) associated with an enterprise, such as a bank, and accessible (e.g., at least a portion thereof) via a client computing device including, but not limited to an entity client computing device 10 or an agent client computing device 104. The depicted embodiment of FIG. 5B illustrates an agent facing interface with information about the target entity and a graphical interface component 524 (e.g., contextualized prediction interface 524) for generating and displaying multifactor contextualized asset predictions for the target entity.

The graphical user interface 500b may include at least one interface component 524, which may be embodied as a sub-user interface, a widget, a tile, or the like. The interface component 524 may be configured to display a visualization of one or more predicted assets (such as assets 508 and 509 in the illustrated example of FIG. 5B) for a target entity 521 and/or one or more asset representations corresponding to the one or more predicted assets. For example, in the illustrated example of FIG. 5B, the interface component 524 may display one or more asset representations 522, 526 output at a second stage of an autonomous multifactor contextualized prediction process, as described herein. An illustrated asset representation 522 may include text that describes one or more selected (e.g., predicted) asset features associated with at least one top-ranked predicted asset (e.g., a talech terminal asset 508 in the illustrated example of FIG. 5B) that is output at the first stage of the autonomous multifactor contextualized prediction process. Alternatively, or additionally, the illustrated asset representation 522 may include text that describes the predicted assets. For example, the depicted embodiment may include multifactor contextualized asset representations corresponding to an agent interface and generatively created by the dynamic contextualization model for the particular user (e.g., agent). By way of non-limiting example, the asset representation 522 may describe one or more features associated with the predicted asset that contextualize and represent the asset based on one or more other assets (e.g., discussing assets already associated with the entity or recommended in parallel for the entity, such as "Businesses in the automotive industry commonly use talech terminal alongside talech mobile to collect payments"). Similarly, in some embodiments, the interface component 524 may present a second predicted asset 509 representing a related asset prediction based on the top predicted asset 508. In the illustrated example of FIG. 5B, the interface component 524 may display an asset representation 526 (e.g., "Tomas has no credit card with the bank and is pre-approved for the connect business credit card") corresponding to the second predicted asset 509 (e.g., a Connect Business Credit Card asset) predicted to be relevant for the target entity 521 or relevant to the top predicted asset 508. As illustrated, relevant contextual information (e.g., via retrieval augmented generation) may be used to limit the recommendation process (e.g., the predicted asset may be based on entity data) or to contextualize the predicted asset.

The visualization of a multifactor contextualized asset representation (e.g., corresponding to assets 508 and 509) may comprise one or more graphical representations (e.g., images) of the predicted asset(s) in addition to or instead of the text based description 522 (e.g., an image of an asset and textual selling points for the asset). For example, in the illustrated example of FIG. 5B, the interface component 524 may include an image of the talech terminal asset predicted for the target entity and an image of the Connect Business Card asset predicted for the target entity 521.

The graphical user interface 500b may comprise one or more selectable transaction interface elements, such as transaction interface elements 528a-d. Such transaction interface elements (528a, 528b, 528c, 528d) may be configured to facilitate rendering of a transaction user interface designed to enable transactions to be completed via the transaction user interface or a second user interface (e.g., a target entity user interface being viewed by the target entity), including transactions involving the predicted assets. For example, one or more transaction interface elements or other interface elements may be generated for each asset 508, 509. In some examples, the transaction user interface may be rendered within the graphical user interface 500b. In the depicted embodiment, some interface elements (e.g., elements 528a, 528c) may directly execute a transaction associated with the asset(s) (e.g., "purchase" or "purchase new") while other interface elements (e.g., elements 528b, 528d) may trigger a transmission to a target entity device or devices to facilitate initiating the transaction by the target entity itself (e.g., "send to user" or "invite-to-apply").

As described above with reference to FIGS. 1-4, the asset representations displayed within the graphical user interface 500b may be tuned, or otherwise optimized, for the graphical user interface 500b, the particular interface component, or both. For example, the asset representations may be tuned, or otherwise optimized, for the graphical user interface 500b, the interface component 524, or both. As described above with reference to FIG. 5A, in one example, the visualization of the asset representations may be tuned, or otherwise optimized, for the size; layout; or other features or parameters of the example graphical user interface 500b. The visualization of the asset representations may additionally or alternatively be tuned, or otherwise optimized for the size, layout, or other features or parameters of the individual interface component 524.

FIG. 5C is an example graphical user interface 500c in accordance with at least some example embodiments of the present disclosure. The graphical user interface 500c may be, for example, a graphical user interface of an application (e.g., mobile application, web application, or the like) associated with an enterprise 501, such as a bank, and accessible (e.g., at least a portion thereof) via a client computing device including, but not limited to an entity client computing device 102 or an agent client computing device 104. For example, the graphical user interface 500c depicted in FIG. 5C shows an asset offers page of a commercial banking website configured to be displayed directly to the target entity.

The graphical user interface 500c may include a selectable menu 530. In the illustrated example graphical user interface 500c, the menu 530 is positioned at a top portion of the graphical user interface 500c. It would be appreciated that the menu 530 may be positioned somewhere else within the graphical user interface 500c. The menu 530 may be configured to facilitate selection of an asset interface element 534 from the menu 530. For example, the menu 530 may comprise one or more selectable interface elements including an asset interface element 534. The asset interface element 534 may be configured to facilitate rendering of one or more asset interface components such as asset interface components 535a and 535b. Such asset interface components 535a and 535b may be embodied as sub-user interfaces, widgets, tiles, a combination thereof, or the like.

An asset interface component may be configured to display information associated with one or more assets offered by the enterprise 501 to the target entity such as, for example, information associated with one or more products and/or services offered by the enterprise 501. As shown in FIG. 5C, such information may comprise one or more asset representations (such as asset representations 532a or 532b) corresponding to the one or more predicted assets. The asset representations may be an output of an autonomous multifactor contextualized prediction process, as described herein.

The illustrated asset representation 532a and 532b of FIG. 5C may include text that describes one or more selected (e.g., predicted) asset features associated with an asset (such as a POS terminal asset 537 or a register asset 539 in FIG. 5C). Alternatively, or additionally, the asset representation may include text that describes the asset(s). In some examples, the contextualized visualization of a predicted asset may comprise one or more images of the predicted asset such as, for example an image of the POS terminal asset 537 and an image of the register asset 539. In some examples, the asset representation may include a measure of relevance of the asset for the specific entity. For example, as shown in FIG. 5C, the asset representation 532a and/or the asset interface component 535a may include text that indicates the POS terminal asset 537 is a "great fit" for the entity based on, for example, relevance score for the POS terminal asset 537 with respect to the entity. As another example, as shown in FIG. 5C, the asset representation 532b and/or the asset interface component 535b may include text that indicates the register asset 539 is a "good fit: standard tier" for the entity based on, for example, a relevance score for the register asset 539 with respect to the entity. As illustrated the contextualized prediction process may generate additional details (e.g., with the generative AI of the dynamic contextualization model) summarizing why the particular asset is a good fit, which may include emphasizing features of the asset that triggered the prediction (e.g., a most relevant feature to the target entity) or features or descriptions of the asset otherwise tailored (e.g., autonomously via trained generative AI) to be relevant to the target entity.

The graphical user interface 500c may comprise one or more selectable transaction interface elements, such as transaction interface elements 542 and 544. Such transaction interface elements may be configured to facilitate a transaction involving an asset of the enterprise 501, provide access to the predicted asset, or otherwise control a relationship between the asset and the target entity, for example, in substantially the same manner as the interface elements of FIG. 5B. For example, a transaction interface may be rendered in response to selection of a transaction interface element such as the transaction interface elements 542 and 544. In the illustrated example graphical user interface 500*c*, a given transaction interface element may be associated with a particular asset, may be positioned within a particular asset interface component, or otherwise displayed on the interface. It would be appreciated that the transaction interface element(s) may be positioned somewhere else within the graphical user interface 500*c*.

FIGS. 5D-5F provide various views of an example graphical user interface 500*d* in accordance with at least some example embodiments of the present disclosure. The graphical user interface 500*d* may be, for example, a graphical user interface of an application (e.g., mobile application, web application, or the like) associated with an enterprise, such as a bank, and accessible (e.g., at least a portion thereof) via a client computing device including, but not limited to an entity client computing device 102 or an agent client computing device 104. Similar to the embodiment of FIG. 5C, the embodiments of FIGS. 5D-5F may be displayed directly to a target entity.

The graphical user interface 500*d* may be configured to render a graphical user interface view 550 on a client computing device in response to a process trigger (e.g., as described above with reference to FIGS. 1-4). For example, in the illustrated example of FIG. 5D, the graphical user interface view 550 may be rendered in response to a transaction such as, for example, a checking account creation transaction where an entity opens a checking account with a bank. In some embodiments, the illustrated interfaces may be generated based on detecting an activity (e.g., passively monitoring the target entity's bank account for a transaction). Alternatively, or additionally, in some examples, the graphical user interface view 550 may be rendered in response to an output of an autonomous multifactor contextualized prediction process, an indication of acceptance of one or more asset predictions and corresponding multifactor contextualized asset representation output of the autonomous multifactor contextualized prediction process, or another related trigger.

The graphical user interface view 550 may comprise one or more asset category interface components 554*a-n*, which may be embodied as sub-user interfaces, widgets, tiles, a combination thereof, or the like. Each asset category interface component may be associated with a particular asset category of one or more asset categories and may be configured to display text (e.g., such as 556*a-n*) and/or image(s) (e.g., such as 558*a-n*) representative of the respective asset category. For example, in the illustrated example graphical user interface 500*d*, an asset category interface component 554*a* may be configured to a display a visualization (e.g., text 556*a* and/or other forms of visualization) of an automotive payments asset category, a visualization (e.g., one or more images and/or other forms of visualization) of one or more assets within the automotive payments asset category, or the like. As discussed with respect to FIG. 5A, in some embodiments, predicted assets may be displayed and acted on in a similar manner to the depicted categories, and the visualization of the asset representations may include features (e.g., sub-assets, attributes, or the like)

associated with the assets. As another example, in the illustrated example graphical user interface 500*d*, an asset category interface component 554*b* may be configured to display a visualization (e.g., text 556*b* or other forms of visualization) of a business credit cards and loans asset category, a visualization (e.g., one or more images and/or other forms of visualization) of one or more assets within the business credit cards and loans asset category, or the like. As yet another example, in the illustrated example graphical user interface 500*d*, an asset category interface component 554*n* may be configured to display a visualization (e.g., text 556*n* and/or other forms of visualization) of an invoicing and software asset category and/or a visualization (e.g., one or more images and/or other forms of visualization) of one or more assets within the invoicing and software asset category.

In some embodiments, the asset categories, sub-asset categories, or other denominations may be determined based on at least a portion of the entity data (or additionally other data as described herein) and may be leveraged to determine the predicted assets and asset representations for the target entity. For example, the autonomous multifactor contextualized prediction process may include applying at least a portion of the entity data comprising one or more characteristics associated with the target entity to one or more machine learning models, such as one or more machine learning based prediction models 112 described above, to determine the one or more assets or the one or more features of one or more assets. In one example implementation, the one or more characteristics may include, but not limited to industry associated with the entity, entity size, entity establishment date, first transaction with the enterprise, a date of the first transaction), or any of the other data discussed herein. In some examples, the one or more features determined based at least in part on the one or more characteristics may include one or more asset categories (e.g., comprising one or more assets within a respective asset category), one or more sub-asset categories for an asset category (e.g., comprising one or more assets within a respective sub-asset category), relevance data, entity data segment (e.g., entity profile or behavioral data associated with the target entity). In some examples, the one or more features (or portion thereof) may form at least a portion of the input to one or more generative AI models (e.g., dynamic contextualization models) of the autonomous multifactor contextualized prediction framework configured to generate an asset representation as describe above. In some examples, one or more generative AI models may be configured to apply one or more techniques including, but not limited to, natural language processing techniques designed to contextualize an asset representation (e.g., following prediction of the asset with a machine learning model) to the target entity based on communication data (e.g., phone conversation and/or other forms of communication) associated with the target entity, or any other data discussed herein. Alternatively, or additionally, the one or more generative AI models may be configured to determine one or more scores (e.g., quality score, optimization score, or the like) for one or more representations (e.g., promotions) associated with the target entity. Alternatively, or additionally, the contextualized prediction system may be configured to apply one more information retrieval techniques such as website scraping techniques to obtain information associated with the target entity. For example, the system may be configured to scrape a website associated with the target entity to extract relevant information and summarize the relevant information and/or the one or more features to generate an asset representation.

As described above with reference to FIGS. 1-4, the visualization of the asset representations may be tuned, or otherwise optimized, for the graphical user interface 500d. For example, visualization of the asset representations 512a-n may be tuned, or otherwise optimized, for the graphical user interface 500d, the individual interface components, or both. The graphical user interface 500d may be configured to render graphical user interface views such as graphical user interface views 560 and 570 in response to generating one or more asset representations. The depicted interfaces of FIGS. 5D-5F show progressive interfaces generated as a result of selecting various interface elements.

Referencing FIG. 5E, for example, a first downstream graphical user interface view 560 may be shown in response to selecting interface element 554a shown in FIG. 5D. The graphical user interface 500d may render a graphical user interface view 560 on a client computing device in response to an asset representation 562 output at the second stage of an autonomous multifactor contextualized prediction process, as described herein. The graphical user interface view 560 may display the asset representation 562 (e.g., various contextualized visualizations associated with the asset). The example graphical user interface view 560 may include one or more interface components, such as interface components 564a-c, which may be embodied as sub-user interfaces, widgets, tiles, a combination thereof, or the like. As described above with reference to FIGS. 1-4, the asset representations may be tuned, or otherwise optimized, for the graphical user interface 500d. For example, visualization of the asset representations may be tuned, or otherwise optimized, for the graphical user interface 500d, the individual interface components (e.g., 564a, 564b, 564c), or both.

In the illustrated example graphical user interface view 560, each of the interface components 564a-c may be associated with a particular asset category and/or sub-asset category of the asset category. For example, the interface component 564a may display a predictive asset output that includes a first predicted asset 566a (e.g., talech terminal asset as shown in the illustrated example of FIG. 5E) for a first sub-asset category 568a (e.g., an in-person payments asset as shown in the illustrated example of FIG. 5E) of the automotive payments asset category, a second predicted asset 566b (e.g., mobile payments as shown in the illustrated example of FIG. 5E) for a second sub-asset category 568b of the automotive payments asset category, and/or a third predicted asset 566c (e.g., back office as shown in the illustrated example of FIG. 5E) for a third sub-asset category 568c (e.g., invoicing as shown in the illustrated example of FIG. 5E). The predictive asset output may be the output at a first stage of an autonomous multifactor contextualized prediction process (e.g., displaying the machine learning output) or may be the contextualized output of the second stage of the autonomous multifactor contextualized prediction process.

The graphical user interface view 560 may include one or more selectable transaction interface elements, such as transaction interface elements 569a-c. Such transaction interface elements (e.g., 569a, 569b, 569c) may be configured to facilitate a transaction associated with a predicted asset, to activate a predicted asset (e.g., such that the target entity may have access to the predicted asset), or otherwise relate the target entity and predicted asset in a similar manner to various other embodiments described herein. In the illustrated example graphical user interface view 560, a given transaction interface element may be associated with a particular predicted asset and/or may be positioned within a particular interface component. It would be appreciated that the transaction interface element(s) may be positioned somewhere else within the graphical user interface view 560.

Referencing FIG. 5F, as another example, a second downstream graphical user interface view 570 may be shown in response to selecting interface element 554b shown in FIG. 5D. Each downstream view may be generated according to a similar contextualized prediction process prior to or following selection of the parent interface element (e.g., interface components 554a, 554b) by the target entity or another user. The graphical user interface 500d may render a graphical user interface view 570 on a client computing device in response to an asset representation 572 output at the second stage of an autonomous multifactor contextualized prediction process as described herein. The graphical user interface view 570 may display the asset representation 572 and/or a visualization of one or more predicted assets corresponding to the asset representation 572. The example graphical user interface view 570 of the graphical user interface 500d may include one or more interface components, such as interface components 574a-c, which may be embodied as sub-user interfaces, widgets, tiles, a combination thereof, or the like. As described above with reference to FIGS. 1-4, the visualization of the asset representations may be tuned, or otherwise optimized, for the graphical user interface 500d. For example, visualization of the asset representations may be tuned, or otherwise optimized, for the graphical user interface 500d and/or individual interface components (e.g., 574a, 574b, 574c).

In the illustrated example graphical user interface view 570, each of the interface components 574a-c may be associated with a particular asset category and/or sub-asset category of the predicted asset category. For example, the interface component 574a may display a predictive output that includes representations associated with a first predicted (e.g., recommended) asset 576a (e.g., Connect Business Credit Card in the illustrated example of FIG. 5F) for a first sub-asset category 578a (e.g., Business Credit Card in the illustrated example of FIG. 5F) of the Business Credit Cards and Loans asset category (e.g., text 556b in FIG. 5D), a second predicted asset 576b (e.g., Quick Loan in the illustrated example of FIG. 5F) for a second sub-asset category 578b of the Business Credit Cards and Loans asset category, and/or a third predicted asset 576c (e.g., Connect Employee Credit Card in the illustrated example of FIG. 5F) for a third sub-asset category 578c (e.g., Employee Cards and Expense Management in the illustrated example of FIG. 5F). The predictive asset output may be output at a first stage of an autonomous multifactor contextualized prediction process and subsequently used to generate a contextualized asset representation via a dynamic contextualization model, as described above.

The graphical user interface view 570 may comprise one or more selectable transaction interface elements, such as transaction interface elements 579a-c. Such transaction interface elements (e.g., 579a, 579b, 579c) may be configured to facilitate a transaction associated with a predicted asset, to activate a selected asset (e.g., such that the target entity may have access to the predicted asset, begin to utilize the predicted asset, or the like), or otherwise to relate the target entity and the asset. In the illustrated example graphical user interface view 570, a given transaction interface element may be associated with a particular predicted asset, may be positioned within a particular interface component, or both. It would be appreciated that the transaction interface element(s) may be positioned somewhere else within the graphical user interface view 570.

FIG. 5G is an example graphical user interface 500e in accordance with at least some example embodiments of the present disclosure. The graphical user interface 500e may be, for example, a graphical user interface of an application (e.g., mobile application, web application, or the like) associated with an enterprise, such as a bank, and accessible (e.g., at least a portion thereof) via a client computing device including, but not limited to an entity client computing device 102 or an agent client computing device 104. In the depicted embodiment, an agent-facing interface is shown having two interface components 584a and 584b. A first interface component 584a in the depicted embodiment defines the multifactor contextualized asset representations (e.g., two separate representations in the depicted example, and other numbers of representations may be used) that is generated in response to a prompt 586 manually entered by an agent, and a second interface component 584b in the depicted embodiment defines a multifactor contextualized asset representation generated autonomously based on at least the target entity data, agent data, or both. In some embodiments, the agent-facing interface may be configurable based on, for example, the context.

The graphical user interface 500e, for example, may include one or more interface components such as interface components 584a and 584b, which may be embodied as a sub-user interface, a widget, a tile, or the like. The interface components may be configured to display a visualization of one or more predicted assets for a target entity 521 and/or one or more asset representations (such as asset representations 582a-d) corresponding to the one or more predicted assets. For example, in the illustrated example of FIG. 5G, an interface component of the graphical user interface 500e may display a multifactor contextualized asset representation output at a second stage of an autonomous multifactor contextualized prediction process. The asset representations may be generated in response to a process trigger, such as request from an agent (e.g., a typed or spoken natural language input 586). In the illustrated example of FIG. 5G, such request may be a request from a sales agent of the enterprise. As shown in FIG. 5G, the request may include one or more characteristics associated with the target entity such as, for example, automotive industry with $500 k-$1M in sales volume.

As described above with reference to FIGS. 1-4, the visualization of the asset representations may be tuned, or otherwise optimized, for the graphical user interface 500e. For example, visualization of the asset representations may be tuned, or otherwise optimized, for the graphical user interface 500e, for individual interface components, or both.

In the illustrated example of FIG. 5G, an asset representation may include text that describes one or more selected asset features associated with at least one predictive asset outputs (e.g., business essentials asset representation 582a, altitude card asset representation 582b, talech terminal asset representation 582c, or online banking invoicing asset representation 582d) that are output by the machine learning based prediction model and dynamic contextualization model. The illustrated asset representation may include text that describes the predicted asset(s), one or more features of the predicted asset(s), one or more images of the predicted assets(s), or other representations associated with one or more assets.

The graphical user interface 500e may comprise one or more selectable transaction interface elements, such as transaction interface elements 588a-c. Such transaction interface elements (e.g., 588a, 588b, 588c) may be configured to facilitate rendering of a transaction user interface designed to facilitate, support, and otherwise enable transactions, including transactions involving the predicted assets. In each instance, the various selectable interface elements associated with the multifactor contextualized asset representations, when selected, may be configured to trigger a functionality associated with an asset. For example, selecting interface element 569b in FIG. 5E may be configured to activate a mobile payments system functionality associated with the target entity, may modify the target entity application or electronic web interfaces to present a mobile payment option, may link, or may trigger two or more of the foregoing.

Example Methods

FIG. 6 illustrates an example flowchart depicting an example set of operations for generating a predictive asset output in accordance with at least some example embodiments of the present disclosure. The process 600 may be implemented by one or more computing devices, entities, or systems described herein. In some embodiments, the process 600 or any sub-portion thereof, may occur autonomously following an initial trigger that initiates a multifactor contextualized prediction process.

In some embodiments, the process comprises, at operation 602, detecting a process trigger. For example, the computing system 101 may detect a process trigger. In some examples, the process trigger may be an API request transmitted from a client computing device to and received by the computing system 101 (e.g., at an API endpoint associated with the computing system 101). Such client computing device may be associated with a target entity or an agent. In some embodiments, the client computing device transmitting the API request may establish a connection with the predictive computing device 106 via a component (e.g., entity component 122, agent component 124) associated with the transmitting client computing device.

In some examples, the process trigger may be an indication of a recent transaction associated with a target entity. For example, the computing system 101 may monitor or detect transactions associated with an entity client computing device 102 (or otherwise with the target entity). In response to detecting such transaction, the computing system 101, may initiate a multifactor contextualized prediction process, as described herein.

In some embodiments, the process comprises, at operation 604, parsing the process trigger 302 to identify a target entity or other data. For example, the computing system 101 may parse the process trigger to identify an entity identifier, agent identifier, or other relevant data within the process trigger.

In some embodiments, the process comprises, at operation 606, extracting the entity identifier, agent identifier, or other data from the parsed process trigger. For example, the computing system 101 may extract the entity identifier from the parsed process trigger. Alternatively, or additionally, the computing system 101 may extract an agent identifier from the parsed process trigger.

In some embodiments, the process comprises, at operation 608, querying one or more data sources for entity data associated with the target entity based on the entity identifier. For example, the computing system 101 may apply a query to one or more data sources for entity data associated with target entity using the entity identifier. In some embodiments, the entity data comprises a plurality of entity data segments including, but not limited to entity characteristics, operational data, related third-party data, historical transactions data, demographic data, behavioral data, interaction data, or conversion data. In some embodiments, the computing system 101 may query an entity database or one or more other data sources for the entity data. For example, the various entity data segments may be obtained from one or more data sources. In some examples, the various entity data segments may be previously obtained from the one or more data sources and stored in the entity database. In some embodiments, the entity data (or a portion thereof such as one or more segments) may be received in real-time or near real-time relative to execution of the multifactor contextualized prediction process.

In some embodiments, the process comprises, at operation 610 querying one or more data sources for agent data associated with the agent based on the agent identifier. For example, the computing system 101 may apply a query to one or more data sources for agent data associated with the agent using the agent identifier. In some examples, the agent data may be previously obtained from the one or more external data sources and stored in an agent database. In some embodiments, the agent data (or a portion thereof) may be received in real-time or near real-time relative to execution of the autonomous multifactor contextualized prediction process. The entity data may be received from the one or more data sources using any of a plurality of techniques.

In some embodiments, the process comprises, at operation 612, inputting the entity data, agent data, or other data to one or more prediction models. For example, the computing system 101 may input the entity data, agent data, or other data to one or more prediction models configured to generate one or more predictive asset outputs. For example, in some embodiments, the computing system 101 generates, using one or more prediction models 112, a predictive asset output based at least in part on the entity data.

In some embodiments, the other data that may be leveraged by the one or more prediction models to generate the one or more predictive asset outputs may include, but is not limited to, asset data for one or more candidate assets, historical predictive asset outputs, one or more optimization parameters, communication channel data, or related asset identifier. In some embodiments, the computing system 101 may input the entity data or other input data to a prediction model via an API associated with the prediction model. For example, in such some embodiments, the prediction engine 110 may generate an API request comprising the input data and transmit the API request to an API associated with the prediction model.

In some embodiments, the predictive asset output identifies one or more assets selected from one or more candidate assets. For example, the one or more machine learning models may be configured to analyze the input data with respect to a prediction space that comprises the one or more candidate assets to generate the one or more predictive asset outputs. In some embodiments, a predictive asset output may comprise one or more predicted assets, where a predicted asset may comprise an asset identifier for a selected asset. In some embodiments, additionally, the predictive asset output may comprise other data about the selected asset including but not limited to one or more asset features associated with the selected asset. In some examples, the predictive asset output may not include the one or more asset features. Alternatively, or additionally, in some examples, the one or more predictive asset outputs may identify a selected agent from one or more candidate agents or may identify a selected communication channel for transmitting the final output of the multifactor contextualized prediction process to a client computing device.

In some embodiments, the process comprises, at operation 614, transmitting the predictive asset output. For example, the computing system 101 may transmit the one or more outputs for input into one or more dynamic contextualization models.

Figure 7:
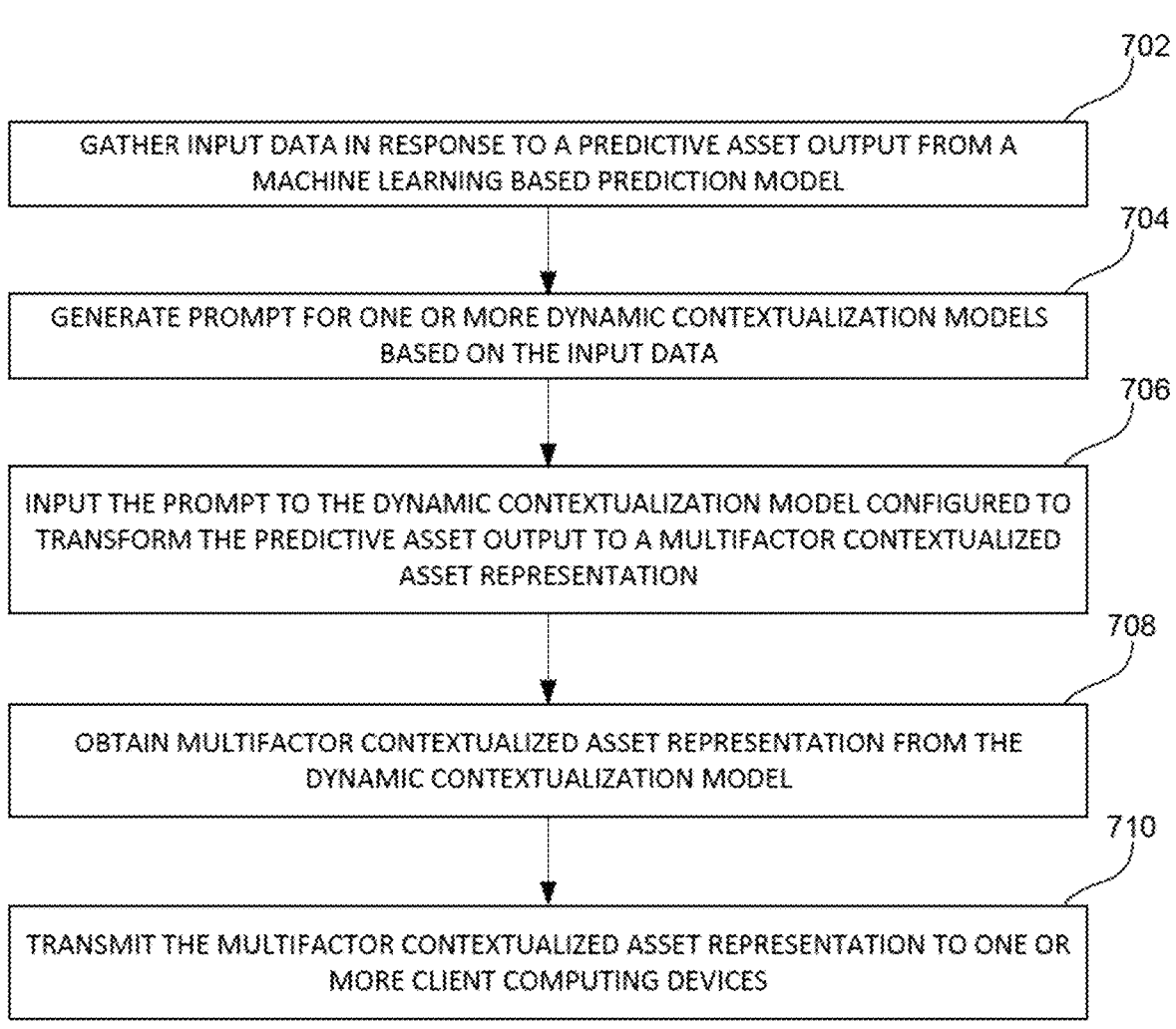
FIG. 7 illustrates an example flowchart depicting operations in accordance with at least some example embodiments of the present disclosure.

FIG. 7 illustrates an example flowchart depicting an example set of operations for generating a predictive asset output in accordance with at least some example embodiments of the present disclosure. The process 700 may be implemented by one or more computing devices, entities, or systems described herein.

In some embodiments, the process comprises, at operation 702, gathering, aggregating, or otherwise generating input data in response to generate a predictive asset output from a machine learning based prediction model. For example, the computing system 101 may gather input data in response to predictive asset output from a prediction model. The computing system 101 may gather the input data from one or more data sources. In some embodiments, the input data includes one or more of the predictive asset output, entity data, agent data, communication channel, historical multifactor contextualized asset representations, optimization data, user input (e.g., agent input including agent preferences with respect to desired output) or asset features (e.g., in embodiments, where the predictive asset output does not include asset features). In example embodiments where the predictive asset output does not include the asset features for the asset identified in the predictive asset output, the computing system 101 may obtain the asset features from an asset database or other data sources.

In some embodiments, the process comprises, at operation 704, generating, a prompt for one or more dynamic contextualization models based on the input data. For example, the computing system 101 may generate a prompt for one or more dynamic contextualization models based on the input data. In some embodiments, the prompt may be adjusted based on user input. For example, in some embodiments, the system may include an admin interface, tool, or other mechanism for receiving user input indicative of adjustments to the prompt to tailor the output of the dynamic contextualization model to a user (e.g., agent user or entity user). In some embodiments, users may have local preferences (e.g., stored on local devices or retrieved remotely from a preference repository) on how the interface should be configured. Some interfaces may include an administrative too allowing for customization of the layout of the interface or other attributes of the interface. In some embodiments, the prompt comprises prompt instructions to guide a dynamic contextualization model to generate a tailored multifactor contextualized asset representation (as described above) based on the input data. In some embodiments, the prompt may comprise the input data. In some examples, the input data may be a separate input to the dynamic contextualization model. In some embodiments, a dynamic contextualization model may be configured to generate a multifactor contextualized asset representation using RAG techniques. For example, the prompt may be configured to direct the dynamic contextualization model to one or more databases or other knowledge sources to retrieve data/information that may be leveraged by the dynamic contextualization model to generate a tailored and contextually relevant multifactor contextualized asset representation. In some embodiments, the prompt 402 may comprise one or more prompt examples configured to provide context for the dynamic contextualization model. In some examples, the one or more prompt examples may comprise past multifactor contextualized asset representation outputs by a dynamic contextualization model or synthetically generated examples.

In some embodiments, the process comprises, at operation 706, inputting, the prompt to one or more dynamic contextualization models configured to modify, augments, or transform the predictive asset output to a multifactor contextualized asset representation. For example, the computing system 101 may input the prompt one or more dynamic contextualization models in accordance with one or more techniques as described above with respect to FIG. 4. The one or more dynamic contextualization models may analyze the input data to generate the multifactor contextualized asset representation corresponding to the predictive asset output.

In some embodiments, the process comprises, at operation 708, obtaining the multifactor contextualized asset representation from the one or more dynamic contextualization models. For example, the computing system 101 (e.g., contextualization engine 114 thereof) may obtain the multifactor contextualized asset representation from the dynamic contextualization model. The multifactor contextualized asset representation may comprise the predictive asset output and one or more contextually relevant asset features of an asset identified in the predictive asset output.

In some embodiments, the process comprises, at operation 710, transmitting the multifactor contextualized asset representation to one or more client computing devices. For example, the computing system 101 may transmit the client computing devices to one or more client computing devices such as an entity client computing device 102 or an agent client computing device 104.

Example Machine Learning Framework

Figure 8:
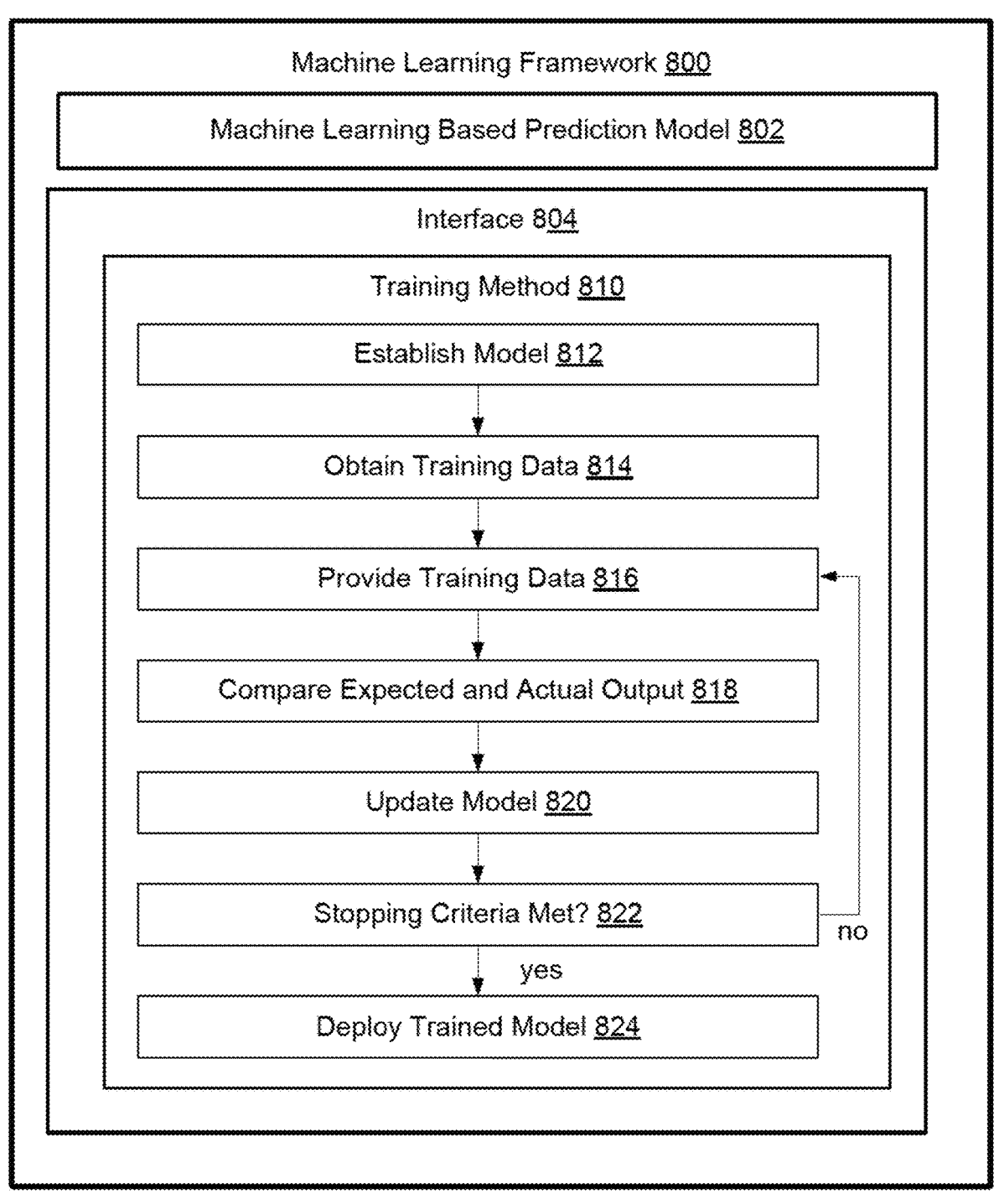
FIG. 8 illustrates an example machine learning framework for use with embodiments of the present disclosure.

FIG. 8 illustrates an example machine learning framework 800 that techniques described herein may benefit from or improve on. In some embodiments, the machine learning framework may be used to train and deploy the machine learning models described herein, including but not limited to the prediction model. A machine learning framework 800 is a collection of software and data that implements machine learning trained to provide output, such as predictive data, based on input. Examples of such machine learning include neural networks (including recurrent neural networks), natural language processing models, adversarial networks, decision trees, Markov models, support vector machines, genetic algorithms, others, or combinations thereof. A person of skill in the art having the benefit of this disclosure will understand that these machine learning implementations need not be equivalent to each other and may instead select from among them based on the context in which they will be used. Machine learning frameworks 800 or elements thereof may be built or refined from existing frameworks, such as TENSORFLOW by GOOGLE, INC. or PYTORCH by the PYTORCH community.

The machine learning framework 800 can include one or more machine learning based prediction models 802 that are the structured representation of learning and an interface 804 that supports use of the prediction model 802.

The prediction model 802 can take any of a variety of forms. In many examples, the prediction model 802 includes representations of nodes (e.g., neural network nodes, decision tree nodes, Markov model nodes, other nodes, or combinations thereof) and connections between nodes (e.g., weighted or unweighted unidirectional or bidirectional connections). In certain implementations, the prediction model 802 can include a representation of memory (e.g., providing long short-term memory functionality). Where the set includes more than one prediction model 802, the models 802 can be linked, cooperate, or compete to provide output.

The interface 804 can include software procedures (e.g., defined in a library) that facilitate the use of the prediction model 802, such as by providing a way to establish and interact with the model 802. For instance, the software procedures can include software for receiving input, preparing input for use (e.g., by performing vector embedding, such as using Word2Vec, BERT, or another technique), processing the input with the model 802, providing output, training the model 802, performing inference with the model 802, fine tuning the model 802, other procedures, or combinations thereof.

In an example implementation, interface 804 can be used to facilitate a training method 810 that can include operation 812. Operation 812 includes establishing a model, such as initializing a prediction model 802. The establishing can include setting up the model 802 for further use (e.g., by training or fine tuning). The prediction model 802 can be initialized with values. In examples, the prediction model 802 can be pretrained. Operation 814 can follow operation 812. Operation 814 includes obtaining training data. In many examples, the training data includes pairs of input and desired output given the input. In supervised or semi-supervised training, the data can be prelabeled, such as by human or automated labelers. In unsupervised learning the training data can be unlabeled. The training data can include validation data used to validate the trained model 802. Operation 816 can follow operation 814. Operation 816 includes providing a portion of the training data to the model 802. This can include providing the training data in a format usable by the model 802. The machine learning framework 800 (e.g., via the interface 804) can cause the model 802 to produce an output based on the input. Operation 818 can follow operation 816. Operation 818 includes comparing the expected output with the actual output. In an example, this can include applying a loss function to determine the difference between expected and actual. This value can be used to determine how training is progressing. Operation 820 can follow operation 818. Operation 820 includes updating the model 802 based on the result of the comparison. This can take any of a variety of forms depending on the nature of the model 802. Where the model 802 includes weights, the weights can be modified to increase the likelihood that the model 802 will produce correct output given an input. Depending on the model 802, backpropagation or other techniques can be used to update the model 802. Operation 822 can follow operation 820. Operation 822 includes determining whether a stopping criterion has been reached, such as based on the output of the loss function (e.g., actual value or change in value over time). In addition or instead, whether the stopping criterion has been reached can be determined based on a number of training epochs that have occurred or an amount of training data that has been used. In some examples, satisfaction of the stopping criterion can include If the stopping criterion has not been satisfied, the flow of the method can return to operation 814. If the stopping criterion has been satisfied, the flow can move to operation 824. Operation 824 includes deploying the trained model 802 for use in production, such as providing the trained model 802 with real-world input data and produce output data used in a real-world process. The model 802 can be stored in memory of at least one computing device (e.g., the predictive computing device shown in FIG. 1, apparatus

Figure 10:
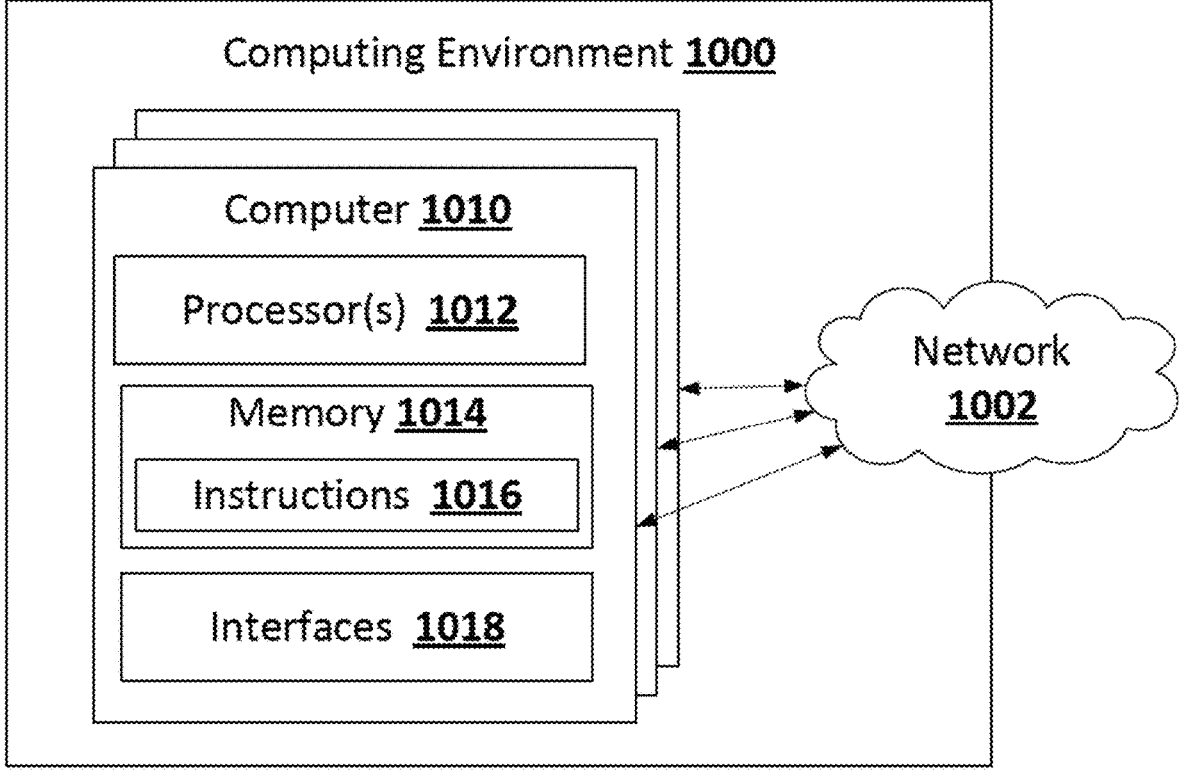
FIG. 10 illustrates an example computing environment for use with embodiments of the present disclosure.

200 shown in FIG. 2, or the computers 1010 shown in FIG. 10), or distributed across memories of two or more such computing devices for production of output data (e.g., predictive data).

Figure 9:
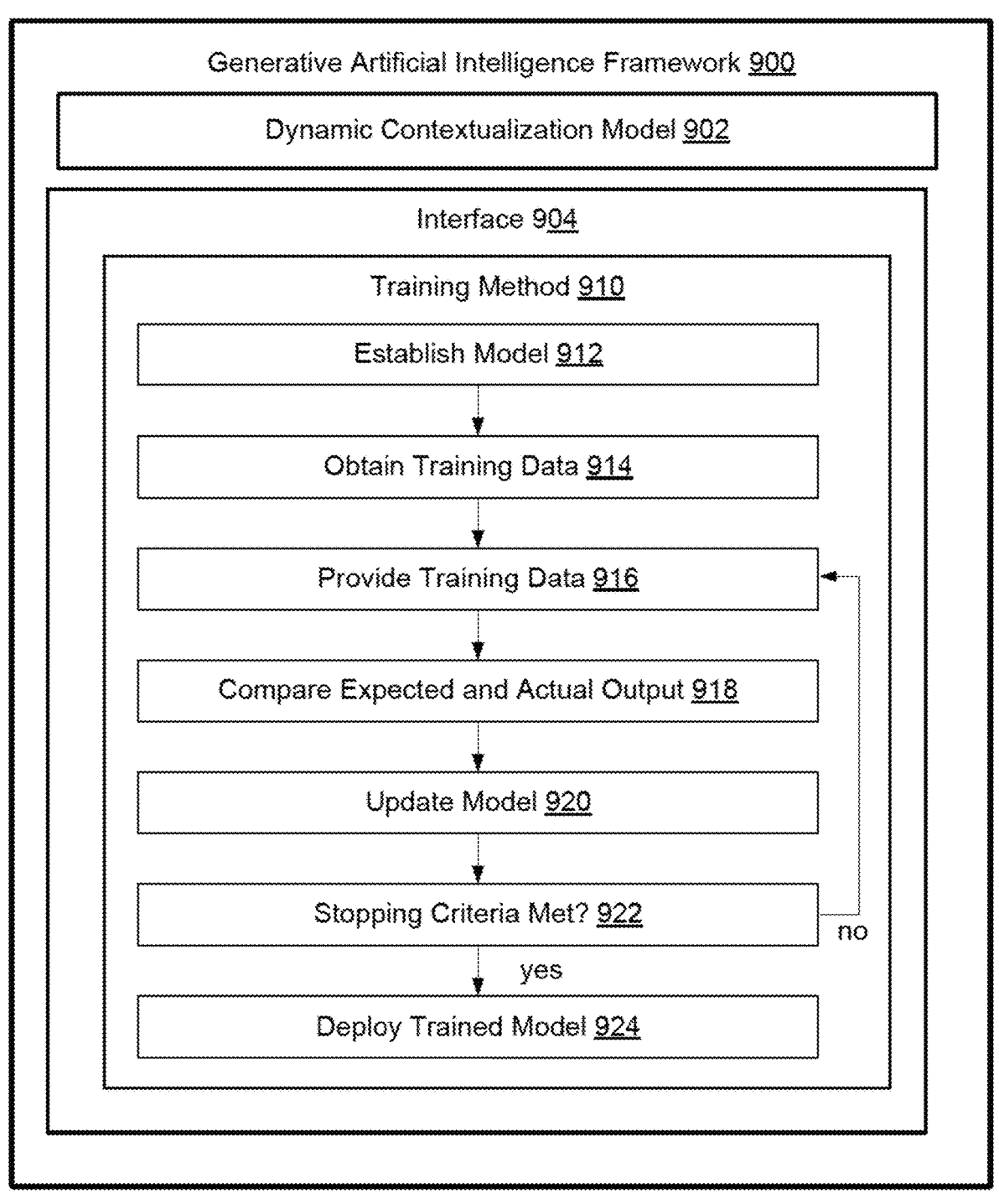
FIG. 9 illustrates an example artificial intelligence framework for use with embodiments of the present disclosure.

FIG. 9 illustrates an example generative AI framework 900 that techniques described herein may benefit from or improve on. In some embodiments, the generative AI framework may be used to train and deploy the artificial intelligence models described herein, including but not limited to the dynamic contextualization models. A generative AI framework 900 is a collection of software and data that implements artificial intelligence trained to provide output, such as predictive data, based on input. Examples of artificial intelligence can be implemented using neural networks (including recurrent neural networks), language models (including so-called "large language models"), generative models, natural language processing models, adversarial networks, decision trees, Markov models, support vector machines, genetic algorithms, others, or combinations thereof. A person of skill in the art having the benefit of this disclosure will understand that these artificial intelligence implementations need not be equivalent to each other and may instead select from among them based on the context in which they will be used.

The generative AI framework 900 can include one or more dynamic contextualization models 902 that are the structured representation of learning and an interface 904 that supports use of the model 902.

The dynamic contextualization model 902 can take any of a variety of forms. In many examples, the model 902 includes representations of nodes (e.g., neural network nodes, Markov model nodes, other nodes, or combinations thereof) and connections between nodes (e.g., weighted or unweighted unidirectional or bidirectional connections). In certain implementations, the model 902 can include a representation of memory (e.g., providing long short-term memory functionality). Where the set includes more than one model 902, the models 902 can be linked, cooperate, or compete to provide output.

The interface 904 can include software procedures (e.g., defined in a library) that facilitate the use of the dynamic contextualization model 902, such as by providing a way to establish and interact with the model 902. For instance, the software procedures can include software for receiving input, preparing input for use (e.g., by performing vector embedding, such as using Word2Vec, BERT, or another technique), processing the input with the model 902, providing output, training the model 902, performing inference with the model 902, fine tuning the model 802, other procedures, or combinations thereof.

In an example implementation, interface 904 can be used to facilitate a training method 910 that can include operation 912. Operation 912 includes establishing a model, such as initializing a dynamic contextualization model 902. The establishing can include setting up the model 902 for further use (e.g., by training or fine tuning). The model 902 can be initialized with values. In examples, the model 802 can be pretrained. Operation 914 can follow operation 912. Operation 914 includes obtaining training data. In many examples, the training data includes pairs of input and desired output given the input. In supervised or semi-supervised training, the data can be prelabeled, such as by human or automated labelers. In unsupervised learning the training data can be unlabeled. The training data can include validation data used to validate the trained model 902. Operation 916 can follow operation 914. Operation 916 includes providing a portion of the training data to the model 902. This can include providing the training data in a format usable by the model 902. The generative AI framework 900 (e.g., via the interface 904) can cause the model 802 to produce an output based on the input. Operation 918 can follow operation 916. Operation 918 includes comparing the expected output with the actual output. In an example, this can include applying a loss function to determine the difference between expected and actual. This value can be used to determine how training is progressing. Operation 920 can follow operation 918. Operation 920 includes updating the model 902 based on the result of the comparison. This can take any of a variety of forms depending on the nature of the model 902. Where the model 902 includes weights, the weights can be modified to increase the likelihood that the model 902 will produce correct output given an input. Depending on the model 902, backpropagation or other techniques can be used to update the model 902. Operation 922 can follow operation 920. Operation 922 includes determining whether a stopping criterion has been reached, such as based on the output of the loss function (e.g., actual value or change in value over time). In addition, or instead, whether the stopping criterion has been reached can be determined based on a number of training epochs that have occurred or an amount of training data that has been used. In some examples, satisfaction of the stopping criterion can include If the stopping criterion has not been satisfied, the flow of the method can return to operation 914. If the stopping criterion has been satisfied, the flow can move to operation 924. Operation 924 includes deploying the trained model 802 for use in production, such as providing the trained model 902 with real-world input data and produce output data used in a real-world process. The model 902 can be stored in memory of at least one computing device (e.g., the predictive computing device shown in FIG. 1, apparatus 200 shown in FIG. 2, or the computers 1010 shown in FIG. 10), or distributed across memories of two or more such computing devices for production of output data (e.g., predictive data).

Example Computing Environment

FIG. 10 discloses a computing environment 1000 in which aspects of the present disclosure may be implemented. A computing environment 1000 is a set of one or more virtual or physical computers 1010 that individually or in cooperation achieve tasks, such as implementing one or more aspects described herein. For example, the computers 1010 may represent the client computing devices 102, 104 or the computing system 101 shown in FIG. 1 deployed in a computing environment 1000 connected by at least one network 1002). The computers 1010 have elements that cooperate to cause output based on input. Example computers 1010 include desktops, servers, mobile devices (e.g., smart phones and laptops), wearables, virtual reality devices, augmented reality devices, expanded reality devices, spatial computing devices, virtualized devices, other computers, or combinations thereof. In particular example implementations, the computing environment 1000 includes at least one physical computer.

The computing environment 1000 may specifically be used to implement one or more aspects described herein. In some examples, one or more of the computers 1010 may be implemented as a user device, such as either or both of the client computing devices 102, 104 and others of the computers 1010 may be used to implement aspects of a predictive computing device (e.g., computing system 101 shown in FIG. 1 and the apparatus 200 shown in FIG. 2), which may include, in some embodiments, a machine learning framework useable to train and deploy models exposed to the mobile device or provide other functionality, such as through exposed application programming interfaces.

The computing environment 1000 can be arranged in any of a variety of ways, including the layout illustrated in FIG. 1. The computers 1010 can be local to or remote from other computers 1010 of the computing environment 1000. The computing environment 1000 can include computers 1010 arranged according to client-server models, peer-to-peer models, edge computing models, other models, or combinations thereof.

In many examples, the computers 1010 are communicatively coupled with devices internal or external to the computing environment 1000 via a network 1002. The network 1002 is a set of devices that facilitate communication from a sender to a destination, such as by implementing communication protocols. Example networks 1002 include local area networks, wide area networks, intranets, or the Internet.

In some implementations, computers 1010 can be general-purpose computing devices (e.g., consumer computing devices). In some instances, via hardware or software configuration, computers 1010 can be special purpose computing devices, such as servers able to practically handle large amounts of client traffic, machine learning devices able to practically train machine learning models, data stores able to practically store and respond to requests for large amounts of data, other special purposes computers, or combinations thereof. The relative differences in capabilities of different kinds of computing devices can result in certain devices specializing in certain tasks. For instance, a machine learning model may be trained on a powerful computing device and then stored on a relatively lower powered device for use.

Many example computers 1010 include one or more processors 1012, memory 1014, and one or more interfaces 1018. Such elements can be virtual, physical, or combinations thereof.

The one or more processors 1012 are elements that execute instructions, such as instructions that obtain data, process the data, and provide output based on the processing. The one or more processors 1012 often obtain instructions and data stored in the memory 1014. The one or more processors 1012 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the one or more processors 1012 include at least one physical processor implemented as an electrical circuit. Example providers of processors 1012 include INTEL, AMD, QUALCOMM, TEXAS INSTRUMENTS, and APPLE.

The memory 1014 is a collection of elements configured to store instructions 1016 and data for later retrieval and use. The instructions 1016 can, when executed by the one or more processors 1012, cause execution of one or more operations that implement aspects described herein. In many examples, the memory 1014 is a non-transitory computer readable medium, such as random-access memory, read only memory, cache memory, registers, portable memory (e.g., enclosed drives or optical disks), mass storage devices, hard drives, solid state drives, other kinds of memory, or combinations thereof. In certain circumstances, transitory memory 1014 can store information encoded in transient signals.

The one or more interfaces 1018 are elements that facilitate receiving input from and providing output to something external to the computer 1010, such as visual output elements (e.g., displays or lights), audio output elements (e.g., speakers), haptic output elements (e.g., vibratory elements), visual input elements (e.g., cameras), auditory input elements (e.g., microphones), haptic input elements (e.g., touch or vibration sensitive elements), motion input elements (e.g., mice, gesture controllers, finger trackers, eye trackers, or movement sensors), buttons (e.g., keyboards or mouse buttons), position sensors (e.g., terrestrial or satellite-based position sensors such as those using the Global Positioning System), other input elements, or combinations thereof (e.g., a touch sensitive display). The one or more interfaces 1018 can include elements for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via elements configured to communicate via radiofrequency signals, such as according to WI-FI, cellular, BLUETOOTH, ZIGBEE, or other protocols). One or more of the one or more interfaces 1018 can facilitate connection of the computing environment 1000 to a network 1002.

The computers 1010 can include any of a variety of other elements to facilitate performance of operations described herein. Example elements include one or more power units (e.g., batteries, capacitors, power harvesters, or power supplies) that provide operational power, one or more busses to provide intra-device communication, one or more cases or housings to encase one or more elements, other elements, or combinations thereof.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage training of a machine learning model with a diverse set of training data. Further, the policy can encourage testing for and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system elements in the embodiments described above should not be understood as requiring such separation in all embodiments, and it should be understood that the described program elements and systems can generally be integrated together in a single software product or packaged into multiple software products.

Thus, embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
detecting, by one or more processors, a process trigger that identifies a target entity;
identifying, by the one or more processors, entity data associated with the target entity;
generating, by the one or more processors and using a machine learning based prediction model, a predictive asset output based at least in part on the entity data, wherein the predictive asset output comprises at least one predicted asset;
generating, by the one or more processors and using a dynamic contextualization model, a multifactor contextualized asset representation for the at least one predicted asset based at least in part on the at least one predicted asset, the entity data, and communication channel data, wherein the multifactor contextualized asset representation comprises natural language generative output that integrates one or more datum representative of the at least one predicted asset with one or more datum representative of contextually relevant asset features selected from asset features associated with the at least one predicted asset; and transmitting, by the one or more processors, the multifactor contextualized asset representation to one or more computing devices via one or more communication channels.

2. The computer-implemented method of claim 1, wherein generating a predictive asset output comprises inputting the entity data to the machine learning based prediction model to cause the machine learning based prediction model to analyze the entity data and generate the predictive asset output based on the analysis of the entity data.

3. The computer-implemented method of claim 1, wherein the machine learning based prediction model is configured to generate the predictive asset output further based at least in part on one or more optimization parameters, and wherein the one or more optimization parameters comprise one or more predefined configuration metrics.

4. The computer-implemented method of claim 1, wherein the machine learning based prediction model is configured to generate the predictive asset output further by analyzing agent data for an agent associated with the target entity.

5. The computer-implemented method of claim 1, wherein the process trigger comprises an API request transmitted from a client computing device.

6. The computer-implemented method of claim 1, wherein generating the multifactor contextualized asset representation comprises:
predicting one or more contextually relevant asset features associated with the at least one predicted asset; and
modifying the predictive asset output to include the one or more contextually relevant asset features.

7. The computer-implemented method of claim 1, wherein the entity data comprises a plurality of entity data segments that comprise one or more of: (i) historical transactions data, (ii) demographic data, (iii) behavioral data, or (iv) interaction data.

8. The computer-implemented method of claim 7, wherein the interaction data comprises one or more of text data, audio data, or video data associated with the target entity.

9. The computer-implemented method of claim 7, wherein generating the predictive asset output based on the entity data comprises analyzing at least a first set of entity data segments from the plurality of entity data segments and generating the multifactor contextualized asset representation comprises analyzing a second set of entity data segments from the plurality of entity data segments.

10. The computer-implemented method of claim 9, wherein the first set of entity data segments and the second set of entity data segments are same.

11. The computer-implemented method of claim 9, wherein the first set of entity data segments comprise at least one entity data segment that is different from the second set of entity data segments.

12. The computer-implemented method of claim 1, wherein generating the multifactor contextualized asset representation comprises:
generating a prompt for the dynamic contextualization model; and
autonomously inputting the prompt to the dynamic contextualization model.

13. The computer-implemented method of claim 1, wherein generating the multifactor contextualized asset representation using the dynamic contextualization model further comprises generating the multifactor contextualized asset representation based at least in part by analyzing agent data for an agent associated with the target entity.

14. The computer-implemented method of claim 1, wherein the dynamic contextualization model is a large language model.

15. The computer-implemented method of claim 1, wherein the machine learning based prediction model comprises one or more of: (i) a decision tree machine learning or (ii) a deep learning neural network machine learning model.

16. The computer-implemented method of claim 1, further comprising storing the multifactor contextualized asset representation.

17. The computer-implemented method of claim 1, further comprising:

receiving, via a user interface, feedback data associated with the multifactor contextualized asset representation; and providing the feedback data to the dynamic contextualization model.

18. The computer-implemented method of claim 1, wherein the machine learning based prediction model and the dynamic contextualization model are connected models, and wherein the predictive asset output is autonomously input to the dynamic contextualization model via a prompt.

19. A system comprising one or more processors and at least one non-transitory memory comprising instructions that, with the one or more processors, cause the system to:

detect a process trigger that identifies a target entity;

identify, entity data associated with the target entity;

generate, using a machine learning based prediction model, a predictive asset output based at least in part on the entity data, wherein the predictive asset output comprises at least one predicted asset;

generate, using a dynamic contextualization model, a multifactor contextualized asset representation for the at least one predicted asset based at least in part on the at least one predicted asset, the entity data, and communication channel data, wherein the multifactor contextualized asset representation comprises natural language generative output that integrates one or more datum representative of the at least one predicted asset with one or more datum representative of contextually relevant asset features selected from asset features associated with the at least one predicted asset; and transmit the multifactor contextualized asset representation to one or more computing devices via one or more communication channels.

20. One or more non-transitory computer-readable media storing processor-executable instructions that, when executed by one or more processors, cause the one or more processors to perform operations comprising:

detecting a process trigger that identifies a target entity;

identifying entity data associated with the target entity;

generating, using a machine learning based prediction model, a predictive asset output based at least in part on the entity data, wherein the predictive asset output comprises at least one predicted asset;

generating, using a dynamic contextualization model, a multifactor contextualized asset representation for the at least one predicted asset based at least in part on the at least one predicted asset, the entity data, and communication channel data, wherein the multifactor contextualized asset representation comprises natural language generative output that integrates one or more datum representative of the at least one predicted asset with one or more datum representative of contextually relevant asset features selected from asset features associated with the at least one predicted asset; and transmitting the multifactor contextualized asset representation to one or more computing devices via one or more communication channels.

* * * * *